United States Patent
Yokoyama et al.

(10) Patent No.: US 6,380,996 B1
(45) Date of Patent: Apr. 30, 2002

(54) OPTICAL COMPENSATORY SHEET AND LIQUID CRYSTAL DISPLAY

(75) Inventors: Shigeki Yokoyama; Ken Kawata; Hideyuki Nishikawa; Koshin Matsuoka; Eiichiro Aminaka; Yoji Ito, all of Kanagawa (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 09/616,365

(22) Filed: Jul. 13, 2000

Related U.S. Application Data

(63) Continuation-in-part of application No. 09/226,172, filed on Jan. 7, 1999, now abandoned.

(30) Foreign Application Priority Data

| Jan. 7, 1998 | (JP) | 10-001931 |
| Apr. 9, 1998 | (JP) | 10-114168 |
| Jul. 13, 1999 | (JP) | 11-199442 |
| Jan. 14, 2000 | (JP) | 2000-006772 |

(51) Int. Cl.$^7$ .......... G02F 1/1335; C09K 19/00
(52) U.S. Cl. .......... 349/117; 428/1
(58) Field of Search .......... 349/117; 428/1; 359/63, 73

(56) References Cited

U.S. PATENT DOCUMENTS

| 5,583,679 A | * 12/1996 | Ito et al. ............... 349/118 |
| 5,855,971 A | * 1/1999 | Kobori et al. ........... 349/117 |
| 6,034,755 A | * 3/2000 | Watanabe .............. 349/118 |
| 6,064,457 A | * 5/2000 | Aminaka ............... 349/117 |
| 6,081,312 A | * 6/2000 | Aminaka et al. ........ 349/117 |

FOREIGN PATENT DOCUMENTS

JP 07-325221 A * 12/1995

* cited by examiner

Primary Examiner—William L. Sikes
Assistant Examiner—Tarifur R. Chowdhury
(74) Attorney, Agent, or Firm—Burns, Doane, Swecker & Mathis, LLP

(57) ABSTRACT

An optical compensatory sheet comprises an optically anisotropic layer formed of discotic liquid crystal molecules provided on a transparent substrate. The liquid crystal molecules are horizontally aligned in the optically anisotropic layer. An average inclined angle between discotic planes of the discotic liquid crystal molecules and a surface of the transparent substrate is less than 5°. The discotic liquid crystal molecules are fixed in the optically anisotropic layer while keeping the horizontal alignment.

14 Claims, 1 Drawing Sheet

US 6,380,996 B1

OPTICAL COMPENSATORY SHEET AND LIQUID CRYSTAL DISPLAY

CROSS-REFERENCE TO RELATED APPLICATION

This is a continuation-in-part application of U.S. patent application Ser. No. 09/226,172 filed on Jan. 7, 1999 now abandoned.

FIELD OF THE INVENTION

The present invention relates to an optical compensatory sheet comprising an optically anisotropic layer formed of discotic liquid crystal molecules provided on a transparent substrate. The invention also relates to a liquid crystal display using the optical compensatory sheet.

BACKGROUND OF THE INVENTION

A liquid crystal display comprises a liquid crystal cell, two polarizing elements arranged on each side of the liquid crystal cell, and one or two optical compensatory sheets (phase retarders) arranged between the liquid crystal cell and the polarizing element.

The liquid crystal cell comprises a pair of substrates, rod-like liquid crystal molecules and an electrode layer. The rod-like liquid crystal molecules are provided between the substrates. The electrode layer has a function of applying a voltage to the rod-like liquid crystal molecule. Each of the substrates has an orientation layer, which has a function of aligning the rod-like liquid crystal molecule.

The optical compensatory sheet is used to remove color from an image displayed on the liquid crystal cell. The optical compensatory sheet can also be used to enlarge a viewing angle of a liquid crystal cell. A stretched birefringent film has usually been used as the optical compensatory sheet.

An optical compensatory sheet comprising an optically anisotropic layer on a transparent substrate has been proposed to be used in place of the stretched birefringent film. The optically anisotropic layer is formed by fixing aligned discotic liquid crystal molecules. The discotic liquid crystal molecules have various alignment forms. Accordingly, an optical compensatory sheet obtained by using the discotic liquid crystal molecule has a specific optical characteristic that cannot be obtained by the conventional stretched birefringent film. The optical compensatory sheet using the discotic liquid crystal molecule is described in Japanese Patent Provisional Publication No. 6(1994)-214116, U.S. Pat. Nos. 5,583,679, 5,646,703 and German Patent Publication No. 3,911,620A1.

SUMMERY OF THE INVENTION

Japanese Patent Provisional Publication No. 2(1990)-176625 discloses a liquid crystal display using a liquid crystal cell of a vertical alignment (VA) mode, in which rod-like liquid crystal molecules are essentially vertically aligned while not applying voltage to the cell, and are essentially horizontally aligned while applying voltage to the cell. The vertical alignment mode is characterized in a wide viewing angle and a fast response, compared with the conventional liquid crystal modes. A prototype of the liquid crystal display of a vertical alignment mode has been exhibited (Nikkei Microdevice (written in Japanese), No. 136, page 147, 1996).

U.S. Pat. Nos. 4,583,825 and 5,410,422 disclose a liquid crystal display of a bend alignment mode having a liquid crystal cell in which rod-like liquid crystal compounds are aligned symmetrically. The alignment of an upper liquid crystal compound is essentially antiparallel to the alignment of a lower liquid crystal compound. The liquid crystal cell of the bend alignment mode has a self-optical compensatory function because of the symmetrical alignment. Therefore, the bend alignment mode is also referred to as an optical compensatory bend (OCB) mode. The liquid crystal display of the bend alignment mode has an advantage of a rapid response.

The liquid crystal display of a vertical alignment mode or a bend alignment mode is characterized in a wide viewing angle and a rapid response compared with the conventional liquid crystal modes (TN mode, STN mode). However, a further improvement is necessary to be comparable with CRT.

It might be considered that an optical compensatory sheet is used to improve the liquid crystal display of a vertical alignment mode or a bend alignment mode in the same manner as in the conventional liquid crystal displays. However, the known optical compensatory sheets used in the conventional liquid crystal displays are not effective in the liquid crystal display of the vertical alignment mode or the bend alignment mode.

In the liquid crystal cell of the vertical alignment mode or the bend alignment mode, most of rod-like liquid crystal molecules are essentially vertically aligned. An optical compensatory sheet should have a specific optical anisotropy to optically compensate the optical anisotropy of the essentially vertically aligned rod-like liquid crystal molecules. The required specific optical anisotropy is a large negative optical anisotropy in which an optical axis is not inclined. A stretched birefringent film such as a biaxially stretched polycarbonate film can satisfy the requirement. However, the stretched birefringent film has a problem with dimensional stability and production cost.

An optical compensatory sheet comprising an optically anisotropic layer containing discotic liquid crystal molecules has been proposed to be used in place of the stretched birefringent film. However, the optically anisotropic layer of the known optical compensatory sheet does not have a large negative optical anisotropy in which an optical axis is not inclined.

The present inventors have tried to prepare an optical compensatory sheet having the required specific large negative optical anisotropy by using discotic liquid crystal molecules. However, it is very difficult to prepare a specific optically anisotropic layer in which an optical axis is essentially not inclined (less than 5°) where the layer is prepared according to prior art.

An object of the present invention is to provide an optical compensatory sheet having a large negative optical anisotropy in which an optical axis is essentially not incined.

Another object of the invention is to provide an optical compensatory sheet suitable for a liquid crystal display of a vertical alignment mode or a bend alignment mode.

A further object of the invention is to further improve a viewing angle of a liquid crystal display of a vertical alignment mode or a bend alignment mode.

The present invention provides an optical compensatory sheet comprising an optically anisotropic layer formed of discotic liquid crystal molecules provided on a transparent substrate, wherein the discotic liquid crystal molecules are horizontally aligned in the optically anisotropic layer, an average inclined angle between discotic planes of said discotic liquid crystal molecules and a surface of said transparent substrate being less than 5°, and said discotic liquid crystal molecules being fixed in the optically anisotropic layer while keeping the horizontal alignment.

The invention also provides a liquid crystal display comprising a liquid crystal cell of a vertical alignment mode, two polarizing elements and one or two optical compensatory sheets, each of said polarizing elements being arranged on each side of the liquid crystal cell, each of said optical compensatory sheets being arranged between the liquid crystal cell and each polarizing element, wherein the optical compensatory sheet comprises an optically anisotropic layer formed of discotic liquid crystal molecules provided on a transparent substrate, said discotic liquid crystal molecules being horizontally aligned in the optically anisotropic layer, and wherein an average inclined angle between discotic planes of the discotic liquid crystal molecules and a surface of the transparent substrate is less than 50°, said discotic liquid crystal molecules being fixed in the optically anisotropic layer while keeping the horizontal alignment.

The invention further provides a liquid crystal display comprising a liquid crystal cell of a bend alignment mode, two polarizing elements and one or two optical compensatory sheets, each of said polarizing elements being arranged on each side of the liquid crystal cell, each of said optical compensatory sheets being arranged between the liquid crystal cell and each polarizing element, wherein the optical compensatory sheet comprises an optically anisotropic layer formed of discotic liquid crystal molecules provided on a transparent substrate, said discotic liquid crystal molecules being horizontally aligned in the optically anisotropic layer, and wherein an average inclined angle between discotic planes of the discotic liquid crystal molecules and a surface of the transparent substrate is less than 5°, said discotic liquid crystal molecules being fixed in the optically anisotropic layer while keeping the horizontal alignment.

The present inventors have found that an optical compensatory sheet having a large negative optical anisotropy in which an optical axis is essentially not inclined can be obtained by adjusting an average inclined angle between discotic planes of discotic liquid crystal molecules and a surface of the transparent substrate to be less than 5°. However, it is difficult according prior art to align discotic liquid crystal molecules in such manner (homeotropic alignment). The present inventors have further studied the alignment of the discotic liquid crystal molecules, and have finally succeeded in aligning the discotic liquid crystal molecules having an average inclined angle of less than 5°. The homeotropic alignment of the discotic liquid crystal molecule is obtained by using a specific coating amount of a cellulose ester of a lower fatty acid, a fluorine containing surface active agent or 1,3,5-triazine compound.

Therefore, the optical compensatory sheet of the present invention has a large negative optical anisotropy in which an optical axis is essentially not inclined. The optical compensatory sheet of the invention is particularly effective in a liquid crystal display of a vertical alignment mode or a bend alignment mode, in which most of rod-like liquid crystal molecules are essentially vertically aligned.

For the reasons mentioned above, the excellent characteristics (a wide viewing angle and a rapid response) of a liquid crystal display of a vertical alignment mode or a bend alignment mode are further improved by using optical compensatory sheet of the present invention.

DETAILED DESCRIPTION OF THE INVENTION

Figure 1:
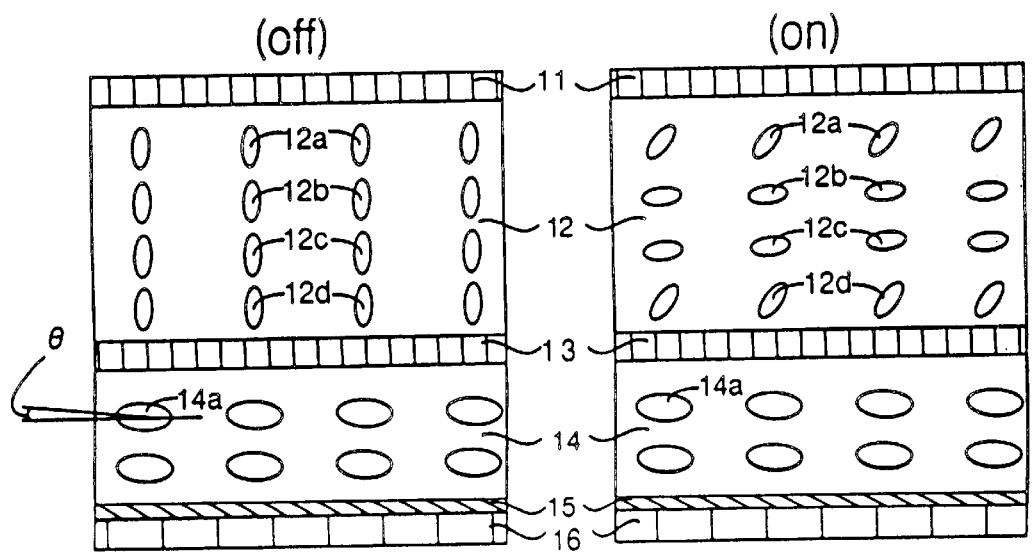
FIG. 1 is a sectional view schematically illustrating alignment of rod-like liquid crystal molecules in a liquid crystal cell of a vertical alignment mode and discotic liquid crystal molecules in an optically anisotropic layer when voltage is not applied (off) or is applied (on) to the cell.

A liquid crystal display is described by referring to the drawings.

FIG. 1 is a sectional view schematically illustrating alignment of rod-like liquid crystal molecules in a liquid crystal cell of a vertical alignment mode and discotic liquid crystal molecules in an optically anisotropic layer when voltage is not applied (off) or-is applied (on) to the cell.

As is shown in FIG. 1, a liquid crystal cell (11 to 13) comprises an upper substrate (11), a lower substrate (13) and liquid crystal (12) comprising rod-like liquid crystal molecules (12a to 12d) sealed between the substrates.

Each of the upper substrate (11) and the lower substrate (13) has an orientation layer and en electrode (not shown in FIG. 1). The orientation layer has a function of aligning the rod-like liquid crystal molecules (12a to 12d). The electrode has a function of applying voltage to the rod-like liquid crystal molecules (12a to 12d).

When voltage is not applied to the liquid crystal cell of a vertical alignment mode, the rod-like liquid crystal molecules (12a to 12d) are essentially vertically aligned as is shown in (off) of FIG. 1. The rod-like liquid crystal molecules (12a to 12d) are slightly slanted (pretilted) to a direction (rightward in FIG. 1). The slanted molecules can be aligned to the pretilted direction when voltage is applied to the cell, as is shown in (on) of FIG. 2.

An optical compensatory sheet (14 to 16) is provided under the liquid crystal cell (11 to 13). The optical compensatory sheet shown in FIG. 1 comprises a transparent substrate (16), an orientation layer (15) and an optically anisotropic layer (14) in this order. The optically anisotropic layer (14) is formed by aligning discotic liquid crystal molecules (14a) and fixing the molecules while keeping the alignment.

According to the present invention, an average inclined angle (θ) between discotic planes of the discotic liquid crystal molecules (14a) and a surface of the transparent substrate (16) is less than 5°. The average inclined angle (θ) preferably is less than 4°, more preferably is less than 3°, further preferably is less than 2°, and most preferably is less than 1°. The average inclined angle (θ) can be 0° (completely not inclined).

When voltage is applied to the liquid crystal cell of a vertical alignment mode, the rod-like liquid crystal molecules (12b, 12c) placed in the middle of the cell are essentially horizontally aligned. On the other hand, the rod-like liquid crystal molecules (12a, 12d) neighboring the substrates (11, 13) are obliquely aligned along the pretilted direction.

Figure 2:
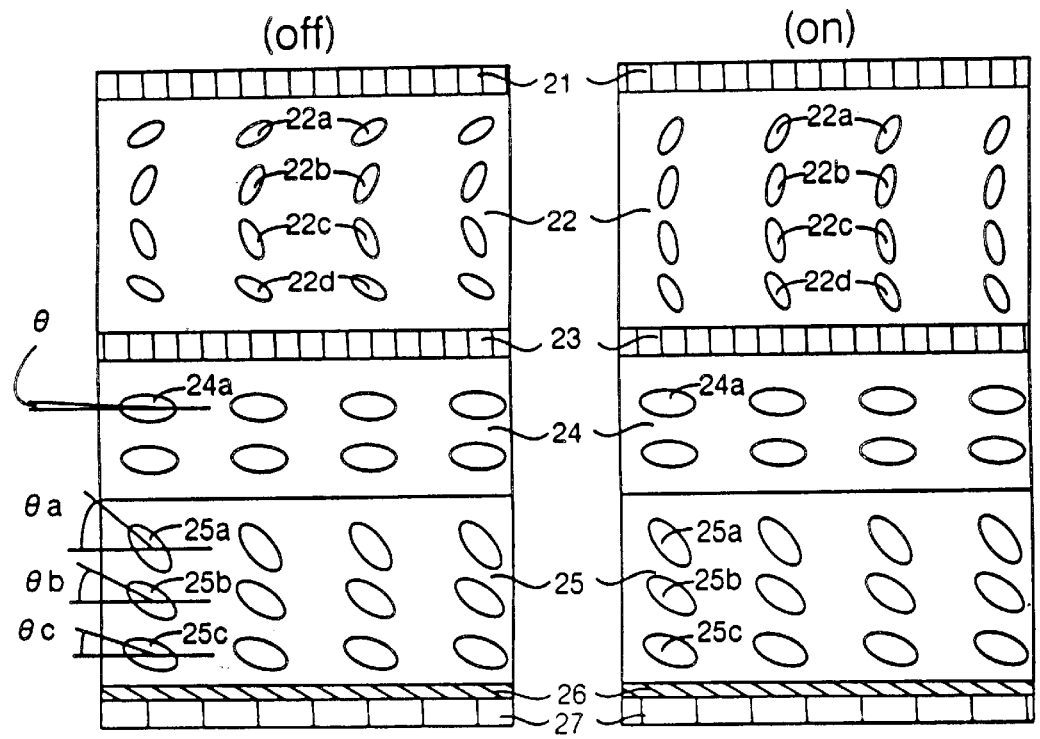
FIG. 2 is a sectional view schematically illustrating alignment of rod-like liquid crystal molecules in a liquid crystal cell of a bend alignment mode and discotic liquid crystal molecules in an optically anisotropic layer and a second optically anisotropic layer when voltage is not applied (off) or is applied (on) to the cell.

FIG. 2 is a sectional view schematically illustrating alignment of rod-like liquid crystal molecules in a liquid crystal cell of a bend alignment mode and discotic liquid crystal molecules in an optically anisotropic layer and a second optically anisotropic layer when lower voltage is applied (off) or when higher voltage is applied (on) to the cell.

As is shown in FIG. 2, a liquid crystal cell (21 to 23) comprises an upper substrate (21), a lower substrate (23) and liquid crystal (22) comprising rod-like liquid crystal molecules (22a to 22d) sealed between the substrates.

Each of the upper substrate (21) and the lower substrate (23) has an orientation layer and en electrode (not shown in FIG. 2). The orientation layer has a function of aligning the rod-like liquid crystal molecules (22a to 22d). The electrode has a function of applying voltage to the rod-like liquid crystal molecules (22a to 22d).

When lower voltage is applied to the liquid crystal cell of a bend alignment mode, the alignment of the rod-like liquid crystal molecules (22a, 22b) near the upper substrate (21) is essentially antiparallel (symmetrical) to the alignment of the molecules (22c, 22d) near the lower substrate (23), as is shown in (off) of FIG. 2. The rod-like liquid crystal molecules (22a, 22d) neighboring the substrates (21, 23) are essentially horizontally aligned. On the other hand, the rod-like liquid crystal molecules (22b, 22c) placed in the middle of the cell are obliquely aligned.

An optical compensatory sheet (24 to 27) is provided under the liquid crystal cell (21 to 23). The optical compensatory sheet shown in FIG. 2 comprises a transparent substrate (27), an orientation layer (26), a second optically anisotropic layer (25) and an optically anisotropic layer (24) in this order. The second optically anisotropic layer (25) and the optically anisotropic layer (24) are formed by aligning discotic liquid crystal molecules (25a to 25c and 24a) and fixing the molecules while keeping the alignment.

In the second optically anisotropic layer (25), an average inclined angle between discotic planes of the discotic liquid crystal molecules (25a to 25c) and a surface of the transparent substrate (27) is not less than 5°. The inclined angle increases or decreases with increase of a distance from the surface of the transparent substrate to the discotic plane of the discotic liquid crystal molecules. In the optical compensatory sheet shown in FIG. 2, the inclined angle (θa to θc) increases with increase of a distance from the surface of the transparent substrate (27) to the discotic plane of the discotic liquid crystal molecules (25a to 25c).

The average inclined angle (θ) between discotic planes of the discotic liquid crystal molecules (24a) and a surface of the transparent substrate (27) is the same as the angle described in FIG. 1.

When higher voltage is applied to the liquid crystal cell of a bend alignment mode, the alignment of the rod-like liquid crystal molecules (22a to 22d) is rather vertical compared with before applying higher voltage (off), as is shown in (on) of FIG. 2. However, the alignment of the rod-like liquid crystal molecules (22a, 22b) near the upper substrate (21) is still essentially antiparallel (symmetrical) to the alignment of the molecules (22c, 22d) near the lower substrate (23). The rod-like liquid crystal molecules (22a, 22d) neighboring the substrates (21, 23) are essentially horizontally aligned. On the other hand, the rod-like liquid crystal molecules (22b, 22c) placed in the middle of the cell are vertically aligned.

As is described above, most of rod-like liquid crystal molecules are essentially vertically aligned in a liquid crystal cell of a vertical alignment mode (FIG. 1) or a bend alignment mode (FIG. 2). The optical anisotropy of the essentially vertically aligned rod-like liquid crystal molecules can be optically compensated by discotic liquid crystal molecules having an inclined angle (θ) of less than 5°.

In the present specification, the term "essentially vertically (or horizontally)" and the term "essentially parallel (or perpendicular)" mean that a margin for error based on the exactly vertical, horizontal, parallel or perpendicular angle is in the range of ±20°. The margin for error is preferably in the range of ±15°, more preferably in the range of ±10°, and most preferably in the range of ±5°.

In the specification, alignment of liquid crystal molecules means that the average aligned angle of the compounds is included in the above-mentioned range, even if aligned angles of some molecules are outside the range. In practice, all the liquid crystal molecules are not always aligned along a single direction.

[Optically anisotropic layer]

The optically anisotropic layer is formed by aligning discotic liquid crystal molecules and fixing the molecules while keeping the alignment. The discotic liquid crystal molecules are preferably fixed by a polymerization reaction, though the molecules can be fixed with a binder.

The discotic liquid crystal molecule is described in various documents (C. Destrade et al., Mol. Crysr. Liq. Cryst., vol. 71, page 111 (1981); Japan Chemical Society, Quarterly Chemical Review (written in Japanese), chapter 5 and chapter 10, section 2 (1994); B. Kohne et al., Angew. Chem. Soc. Chem. Comm., page 1794 (1985); and J. Zhang et al., J. Am. Chem. Soc., vol. 116, page 2655 (1994)). The polymerization reaction of the discotic liquid crystal molecule is described in Japanese Patent Provisional Publication No. 8(1996)-27284.

A polymerizable group should be bound to a discotic core of the discotic liquid crystal molecule to cause the polymerization reaction of the compound. However, if the polymerizable group is directly bound to the discotic core, it is difficult to keep the alignment at the polymerization reaction. Therefore, a linking group is introduced between the discotic core and the polymerizable group. Accordingly, the discotic liquid crystal molecule having a polymerizable group preferably is a compound represented by the following formula (I).

$$D(-L-P)_n \qquad (I)$$

in which D is a discotic core; L is a divalent linking group; P is a polymerizable group; and n is an integer of 4 to 12.

Examples of the discotic cores (D) are shown below. In the examples, LP (or PL) means the combination of the divalent linking group (L) and the polymerizable group (P).

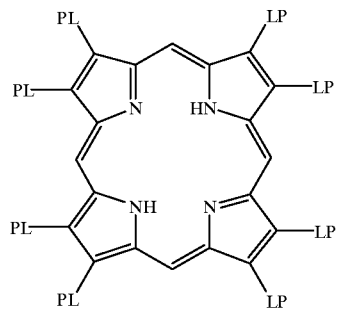

(D1)

-continued
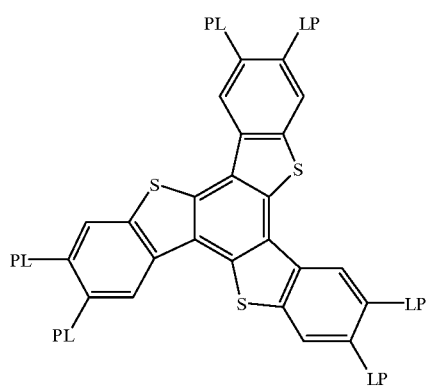
(D2)
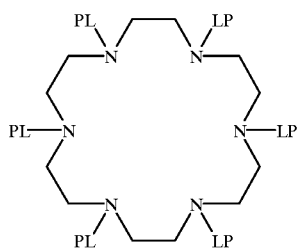
(D3)
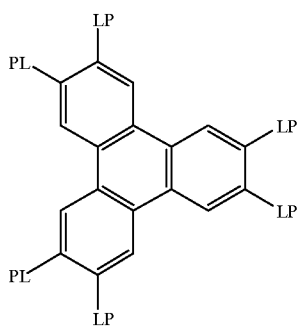
(D4)
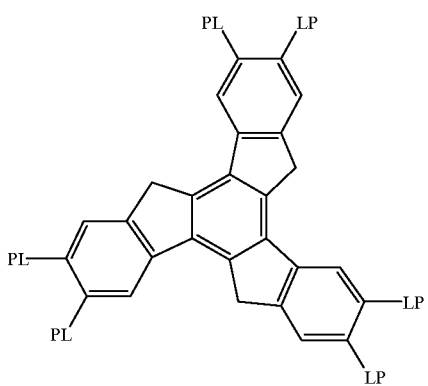
(D5)
-continued
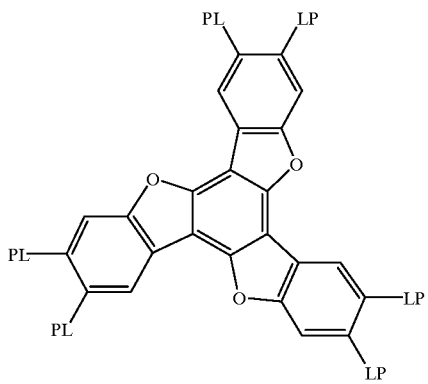
(D6)
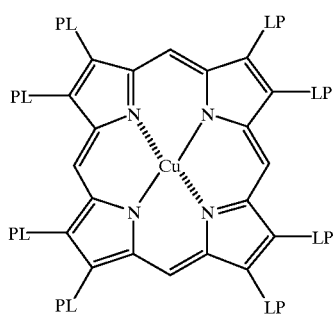
(D7)
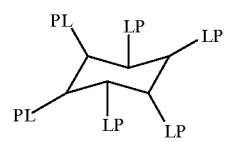
(D8)
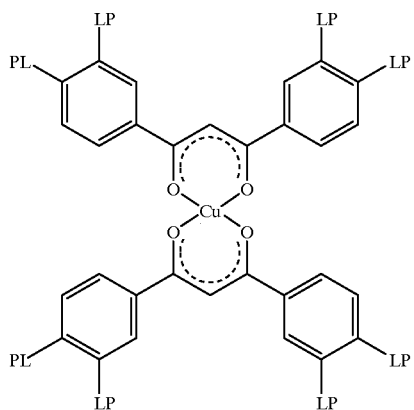
(D9)
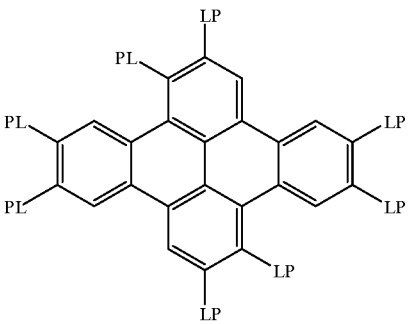
(D10)

(D11)
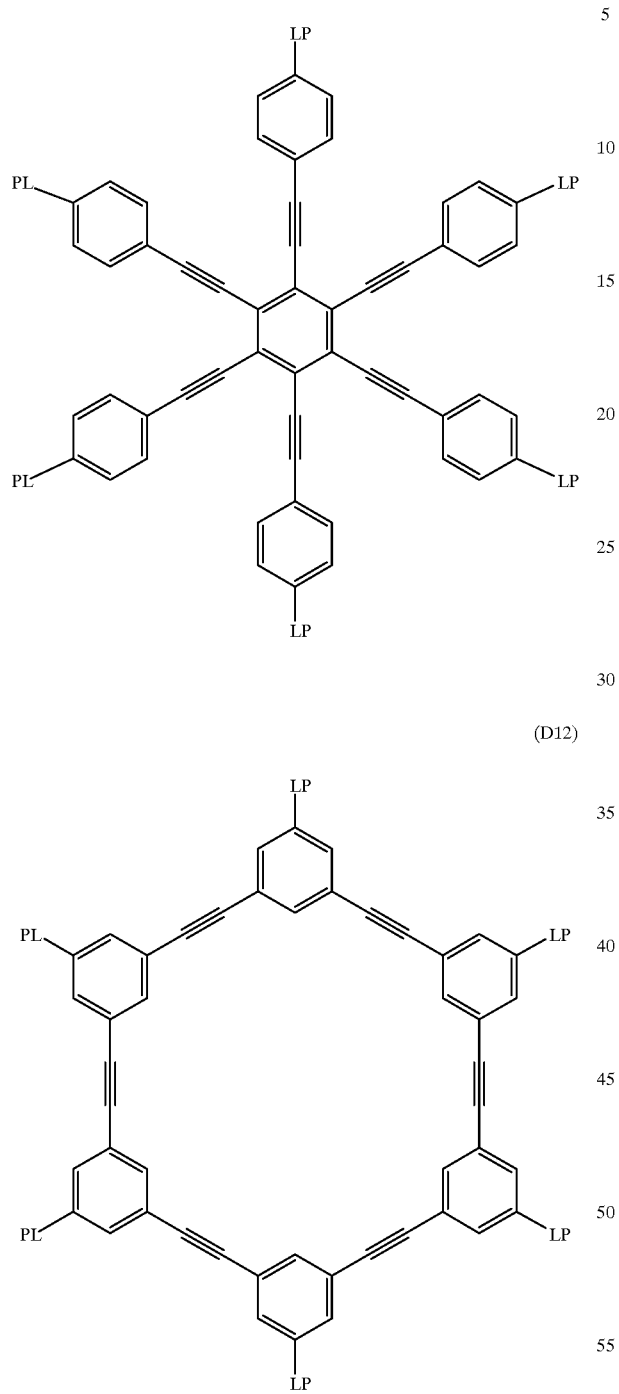
(D12)
(D13)
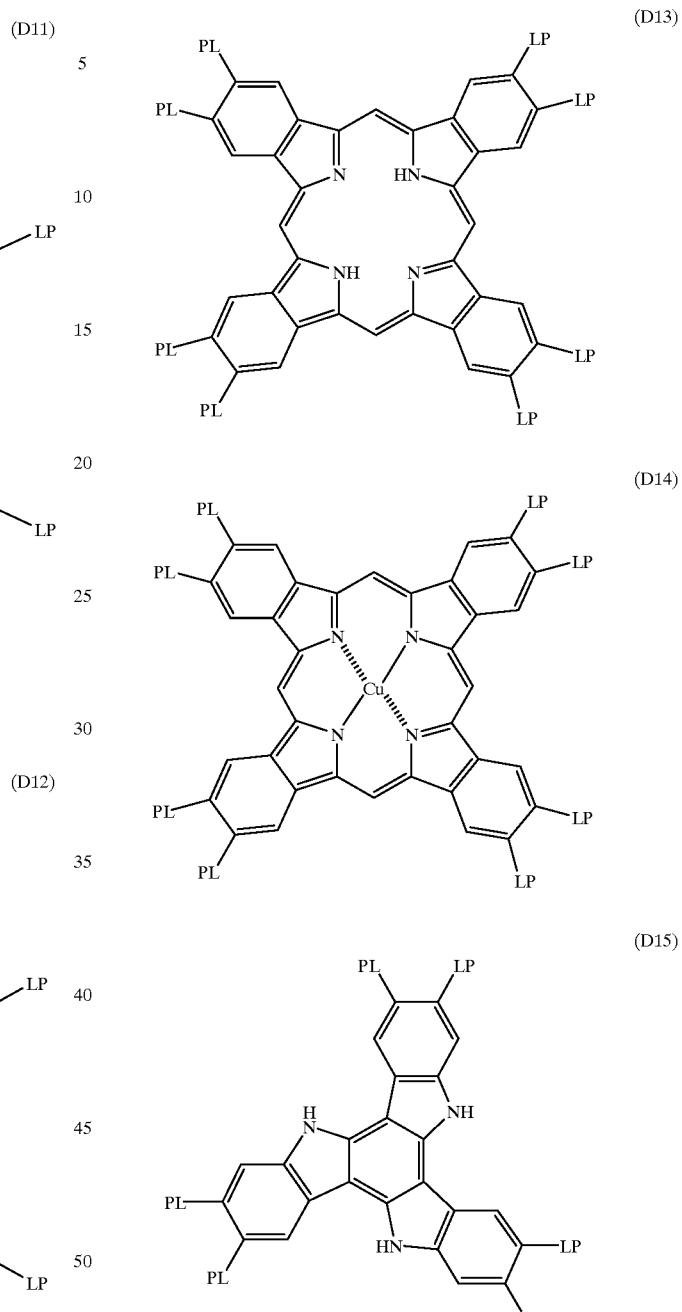
(D14)
(D15)
In the formula (I), the divalent linking group (L) preferably is selected from the group consisting of an alkylene group, an alkenylene group, an arylene group, —CO—, —NH—, —O—, —S— and combinations thereof. L more preferably is a divalent linking group comprising at least two divalent groups selected from the group consisting of an alkylene group, an arylene group, —CO—, —NH—, —O— and —S—. L more preferably is a divalent linking group comprising at least two divalent groups selected from the group consisting of an alkylene group, an arylene group, —CO— and —O—. The alkylene group preferably has 1 to 12 carbon atoms. The alkenylene group preferably has 2 to 12 carbon atoms. The arylene group preferably has 6 to 10 carbon atoms.

Examples of the divalent linking groups (L) are shown below. In the examples, the left side is attached to the discotic core (D), and the right side is attached to the polymerizable group (P). The AL means an alkylene group or an alkenylene group. The AR means an arylene group. The alkylene group, the alkenylene group and the arylene group may have a substituent group (e.g., an alkyl group).

L1: —AL—CO—O—AL—O—CO—
L2: —AL—CO—O—AL—O—
L3: —AL—CO—O—AL—O—AL—
L4: —AL—CO—O—AL—O—CO—
L5: —CO—AR—O—AL—
L6: —CO—AR—O—AL—O—
L7: —CO—AR—O—AL—O—CO—
L8: —CO—NH—AL—
L9: —NH—AL—O—
L10: —NH—AL—O—CO—
L11: —O—AL—
L12: —O—AL—O—
L13: —O—AL—O—CO—
L14: —O—AL—O—CO—NH—AL—
L15: —O—AL—S—AL—
L16: —O—CO—AL—AR—O—AL—O—CO—
L17: —O—CO—AR—O—AL—CO—
L18: —O—CO—AR—O—AL—O—CO—
L19: —O—CO—AR—O—AL—O—AL—O—CO—
L20: —O—CO—AR—O—AL—O—AL—O—AL—O—CO—
L21: —S—AL—
L22: —S—AL—O—
L23: —S—AL—O—CO—
L24: —S—AL—S—AL—
L25: —S—AR—AL—

The polymerizable group (P) is determined by the polymerization reaction. Examples of the polymerizable groups (P) are shown below.

—CH═CH₂ (P1)

—CH≡CH (P2)

—CH₂—C≡CH (P3)

—NH₂ (P4)

—SO₃H (P5)

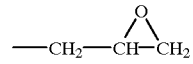
(P6)

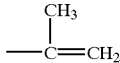
(P7)

—CH═CH—CH₃ (P8)

—N═C═S (P9)

—SH (P10)

—CHO (P11)

—OH (P12)

—CO₂H (P13)

—N═C═O (P14)

—CH═CH—C₂H₅ (P15)

—CH═CH—n—C₃H₇ (P16)

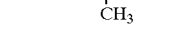
(P17)

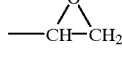
(P18)

The polymerizable group (P) preferably is an unsaturated polymerizable group (P1, P2, P3, P7, P8, P15, P16, P17) or an epoxy group (P6, P18), more preferably is an unsaturated polymerizable group, and most preferably is an ethylenically unsaturated group (P1, P7, P8, P15, P16, P17).

In the formula (I), n is an integer of 4 to 12, which is determined by the chemical structure of the discotic core (D). The 4 to 12 combinations of L and P can be different from each other. However, the combinations are preferably identical.

In the present invention, the discotic liquid crystal molecules are so aligned that an average inclined angle between discotic planes of the discotic liquid crystal molecules and a surface of the transparent substrate is less than 5°. To obtain the above-mentioned alignment of the discotic liquid crystal molecules, a specific amount of a specific compound is preferably used to cause a phase separation between the compound and the discotic liquid crystal molecules. Examples of the compounds causing the phase separation include a cellulose ester of a lower fatty acid, a fluorine containing surface active agent and a 1,3,5-triazine compound.

The term "lower fatty acid" of the cellulose ester means a fatty acid having 1 to 6 carbon atoms. The lower fatty acid preferably has 2 to 5 carbon atoms, and more preferably has 2 to 4 carbon atoms. The fatty acid may have a substituent group (e.g., hydroxyl). Two or more fatty acids may form an ester with cellulose acetate. Examples of the cellulose esters of the lower fatty acids include cellulose acetate, cellulose propionate, cellulose butyrate, cellulose hydroxypropionate, cellulose acetate propionate and cellulose acetate butyrate. Cellulose acetate butyrate is particularly preferred. Butyric acid content of the cellulose acetate butyrate is preferably not less than 30%, more preferably in the range of 30 to 80%. Acetic acid content of the cellulose acetate butyrate is preferably less than 30%, and more preferably in the range of 1 to 30%.

The amount of the cellulose ester of the lower fatty acid is in the range of 1 to 500 mg/m², preferably in the range of 3 to 300 mg/m², and most preferably in the range of 5 to 200 mg/m².

The amount of the cellulose ester of the lower fatty acid is also preferably in the range of 0.01 to 1 wt. % based on the amount of the discotic liquid crystal molecule. The amount is more preferably in the range of 0.1 to 1 wt. %, and most preferably in the range of 0.3 to 0.9 wt. %.

The fluorine containing surface active agent comprises a hydrophobic group containing fluorine, a nonionic, anionic, cationic or amphoteric hydrophilic group and an optional linking group.

The fluorine containing surface active agent comprising one hydrophobic group and one hydrophilic group is represented by the following formula (II).

$$Rf\text{—}L^3\text{—}Hy \qquad (II)$$

in which Rf is a monovalent hydrocarbon group substituted with fluorine; $L^3$ is a single bond or divalent linking group; and Hy is a hydrophobic group.

Rf in the formula (II) functions as a hydrophobic group. The hydrocarbon group preferably is an alkyl group or an aryl group. The alkyl group preferably has 3 to 30 carbon atoms. The aryl group preferably has 6 to 30 carbon atoms.

All or a part of hydrogen atoms contained in the hydrocarbon group is substituted with fluorine. At least 50% of hydrogen atomss are preferably substituted with fluorine. More preferably at least 60%, further preferably at least 70%, and most preferably at least 80% of hydrogen atoms are substituted with fluorine.

The other hydrogens may be substituted with other halogen atoms (e.g., chlorine, bromine).

Examples of Rf are shown below.

Rf1: n—$C_8F_{17}$—
Rf2: n—$C_6F_{13}$—
Rf3: Cl—$(CF_2$—$CFCl)_3$—$CF_2$—
Rf4: H—$(CF_2)_8$—
Rf5: H—$(CF_2)_{10}$—
Rf6: n—$C_9F_{19}$—
Rf7: Pentafluorophenyl
Rf8: n—$C_7F_{15}$—
Rf9: Cl—$(CF_2$—$CFCl)_2$—$CF_2$—
Rf10: H—$(CF_2)_4$—
Rf11: H—$(CF_2)_6$—
Rf12:. Cl—$(CF_2)_6$—
Rf13: $C_3F_7$—

In the formula (II), the divalent linking group is preferably selected from the group consisting of an alkylene group, an arylene group, a divalent heterocyclic group, —CO—, —NR— (in which R is hydrogen or an alkyl group having 1 to 5 carbon atoms), —O—, —$SO_2$— and a combination thereof.

Examples of $R^3$ in the formula (II) are shown below. In the following examples, the left side is attached to a hydrophobic group (Rf) and the right side is attached to a hydrophilic group (Hy). AL means an alkylene group, AR means an arylene group, and Hc means a heterocyclic group. The alkylene group, the arylene group and the heterocyclic group may have a substituent group (e.g., an alkyl group).

L0: a single bond
L31: —$SO_2$—NR—
L32: —AL—O—
L33: —CO—NR—
L34: —AR—O—
L35: —$SO_2$—NR—AL—CO—O—
L36: —CO—O—
L37: —$SO_2$—NR—AL—O—
L38: —$SO_2$—NR—AL—
L39: —CO—NR—AL—
L40: —$AL^1$—O—$AL^2$—
L41: —Hc—AL—
L42: —$SO_2$—NR—$AL^1$—O—$AL^2$—
L43: —AR—
L44: —O—AR—$SO_2$—NR—AL—
L45: —O—AR—$SO_2$—NR—
L46: —O—AR—O—

Hy in the formula (II) is a nonionic hydrophilic group, an anionic hydrophilic group, a cationic hydrophilic group or a combination thereof (an amphoteric hydrophilic group). A nonionic hydrophilic group is particularly preferred.

Examples of Hy in the formula (II) are shown below.

Hy1: —$(CH_2CH_2O)_n$—H (n: an integer of 5 to 30)
Hy2: —$(CH_2CH_2O)_n$—$R^1$ (n: an integer of 5 to 30, $R^1$: an alkyl group having 1 to 6 carbon atoms)
Hy3: —$(CH_2CHOHCH_2)_n$—H (n: an integer of 5 to 30)
Hy4: —COOM (M: hydrogen, an alkali metal atom or dissociated)
Hy5: —$SO_3M$ (M: hydrogen, an alkali metal atom or dissociated)
Hy6: —$(CH_2CH_2O)_n$—$CH_2CH_2CH_2$—$SO_3M$ (n: an integer of 5 to 30, M; hydrogen or an alkali metal atom)
Hy7: —$OPO(OH)_2$
Hy8: —$N^+(CH_3)_3.X^-$ (X: a halogen atom)
Hy9: —$COONH_4$ The nonionic hydrophilic groups (Hy1, Hy2, Hy3) are preferred, and the hydrophilic group consisting of polyethylene oxide (Hy1) is particularly preferred.

Examples of the fluorine containing surface active agents represented by the formula (II) are shown below by referring to the examples Rf, $L^3$ and Hy.

FS-1: Rf1-L31(R=$C_3H_7$)—Hy1(n=6)
FS-2: Rf1-L31(R=$C_3H_7$)—Hy1(n=11)
FS-3: Rf1-L31(R=$C_3H_7$)—Hy1(n=16)
FS-4: Rf1-L31(R=$C_3H_7$)—Hy1(n=21)
FS-5: Rf1-L31(R=$C_2H_5$)—Hy1(n=6)
FS-6: Rf1-L31(R=$C_2H_5$)—Hy1(n=11)
FS-7: Rf1-L31(R=$C_2H_5$)—Hy1(n=16)
FS-8: Rf1-L31(R=$C_2H_5$)—Hy1(n=21)
FS-9: Rf2-L31(R=$C_3H_7$)—Hy1(n=6)
FS-10: Rf2-L31(R=$C_3H_7$)—Hy1(n=11)
FS-11: Rf2-L31(R=$C_3H_7$)—Hy1(n=16)
FS-12: Rf2-L31(R=$C_3H_7$)—Hy1(n=21)
FS-13: Rf3-L32(AL=$CH_2$)—Hy1(n=5)
FS-14: Rf3-L32(AL=$CH_2$)—Hy1(n=10)
FS-15: Rf3-L32(AL=$CH_2$)—Hy1(n=15)
FS-16: Rf3-L32(AL=$CH_2$)—Hy1(n=20)
FS-17: Rf4-L31(R=$C_3H_7$)—Hy1(n=7)
FS-18: Rf4-L31(R=$C_3H_7$)—Hy1(n=13)

FS-19: Rf4-L31(R=C₃H₇)—Hy1(n=19)
FS-20: Rf4-L31(R=C₃H₇)—Hy1(n=25)
FS-21: Rf5-L32(AL=CH₂)—Hy1(n=11)
FS-22: Rf5-L32(AL=CH₂)—Hy1(n=15)
FS-23: Rf5-L32(AL=CH₂)—Hy1(n=20)
FS-24: Rf5-L32(AL=CH₂)—Hy1(n=30)
FS-25: Rf6-L34(AR=p-phenylene)—Hy1(n=11)
FS-26: Rf6-L34(AR=p-phenylene)—Hy1(n=17)
FS-27: Rf6-L34(AR=p-phenylene)—Hy1(n=23)
FS-28: Rf6-L34(AR=p-phenylene)—Hy1(n=29)
FS-29: Rf1-L35(R=C₃H₇, AL=CH₂)—Hy1(n=20)
FS-30: Rf1-L35(R=C₃H₇, AL=CH₂)—Hy1(n=30)
FS-31: Rf1-L35(R=C₃H₇, AL=CH₂)—Hy1(n=40)
FS-32: Rf1-L36-Hy1(n=5)
FS-33: Rf1-L36-Hy1(n=10)
FS-34: Rf1-L36-Hy1(n=15)
FS-35: Rf1-L36-Hy1(n=20)
FS-36: Rf7-L36-Hy1(n=8)
FS-37: Rf7-L36-Hy1(n=13)
FS-38: Rf7-L36-Hy1(n=18)
FS-39: Rf7-L36-Hy1(n=25)
FS-40: Rf1-L0-Hy1(n=6)
FS-41: Rf1-L0-Hy1(n=25)
FS-42: Rf1-L0-Hy1(n=16)
FS-43: Rf1-L0-Hy1(n=21)
FS-44: Rf1-L31(R=C₃H₇)—Hy2(n=7, R¹=C₂H₅)
FS-45: Rf1-L31(R=C₃H₇)—Hy2(n=13, R¹=C₂H₅)
FS-46: Rf1-L31(R=C₃H₇)—Hy2(n=20, R¹=C₂H₅)
FS-47: Rf1-L31(R=C₃H₇)—Hy2(n=28, R¹=C₂H₅)
FS-48: Rf8-L32(AL=CH₂)—Hy1(n=5)
FS-49: Rf8-L32(AL=CH₂)—Hy1(n=10)
FS-50: Rf8-L32(AL=CH₂)—Hy1(n=15)
FS-51: Rf8-L32(AL=CH₂)—Hy1(n=20)
FS-52: Rf1-L37(R=C₃H₇, AL=CH₂CH₂)—Hy3(n=5)
FS-53: Rf1-L37(R=C₃H₇, AL=CH₂CH₂)—Hy3(n=7)
FS-54: Rf1-L37(R=C₃H₇, AL=CH₂CH₂)—Hy3(n=9)
FS-55: Rf1-L37(R=C₃H₁, AL=CH₂CH₂)—Hy3(n=12)
FS-56: Rf9-L0-Hy4(M=H)
FS-57: Rf3-L0-Hy4(M=H)
FS-58: Rf1-L38(R=C₃H₇, AL=CH₂)—Hy4(M=K)
FS-59: Rf4-L39(R=C₃H₇, AL=CH₂)—Hy4(M=Na)

FS-60: Rf1-L0-Hy5(M=K)
FS-61: Rf10-L40(AL¹=CH₂, AL²=CH₂CH₂)—Hy5 (M=Na)
FS-62: Rf11-L40(AL¹=CH₂, AL²=CH₂CH₂)—Hy5 (M=Na)
FS-63: Rf5-L40(AL¹=CH₂, AL²=CH₂CH₂)—Hy5 (M=Na)
FS-64: Rf1-L38(R=C₃H₇, AL=CH₂CH₂CH₂)—Hy5 (M=Na)
FS-65: Rf1-L31(R=C₃H₇)—Hy6(n=5, M=Na)
FS-66: Rf1-L31(R=C₃H₇)—Hy6(n=10, M=Na)
FS-67: Rf1-L31(R=C₃H₇)—Hy6(n=15, M=Na)
FS-68: Rf1-L31(R=C₃H₇)—Hy6(n=20, M=Na)
FS-69: Rf1-L38(R=C₂H₅, AL=CH₂CH₂)—Hy7

FS-70: Rf1-L38(R=H, AL=CH₂CH₂CH₂)—Hy8(X=I)
FS-71: Rf11-L41(Hc=shown below, AL=CH₂CH₂CH₂)—Hy6(M=dissociated)

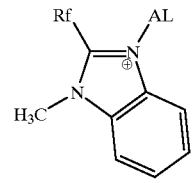

(Hc of FS-71)

FS-72: Rf1-L42(R=C₃H₇, AL¹=CH₂CH₂, AL²=CH₂CH₂CH₂)—Hy6(M=Na)
FS-73: Rf12-L0-Hy5(M=Na).
FS-74: Rf13-L43(AR=o-phenylene)—Hy6(M=K)
FS-75: Rf13-L43(AR=m-phenylene)—Hy6(M=K)
FS-76: Rf13-L43(AR=p-phenylene)—Hy6(M=K)
FS-77: Rf6-L44(R=C₂H₅, AL=CH₂CH₂)—Hy5(M=H)
FS-78: Rf6-L45(AR=p-phenylene, R=C₂H₅)—Hy1(n=9)
FS-79: Rf6-L45(AR=p-phenylene, R=C₂H₅)—Hy1(n=14)
FS-80: Rf6-L45(AR=p-phenylene, R=C₂H₅)—Hy1(n=19)
FS-81: Rf6-L45(AR=p-phenylene, R=C₂H₅)—Hy1(n=28)
FS-82: Rf6-L46(AR=p-phenylene)—Hy1(n=5)
FS-83: Rf6-L46(AR=p-phenylene)—Hy1(n=10)
FS-84: Rf6-L46(AR=p-phenylene)—Hy1(n=15)
FS-85: Rf6-L46(AR=p-phenylene)—Hy1(n=20)

The fluorine containing surface active agent may have two or more hydrophobic groups containing fluorine or two or more hydrophilic groups. Examples of the fluorine containing surface active agents containing two or more hydrophobic or hydrophilic groups are shown below.

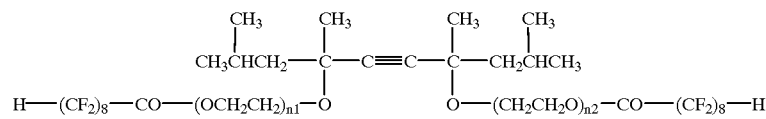

(FS-86 to FS-88)

FS-86: n1+n2=12
FS-87: n1+n2=18
FS-88: n1+n2=24
FS-88: n1+n2=24

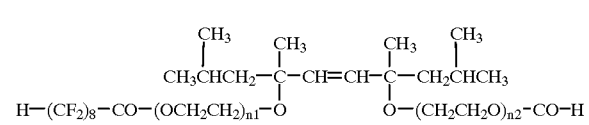

(FS-89 to FS-91)

FS-89: n1+n2=20
FS-90: n1+n2=30

FS-91: n1+n2=40

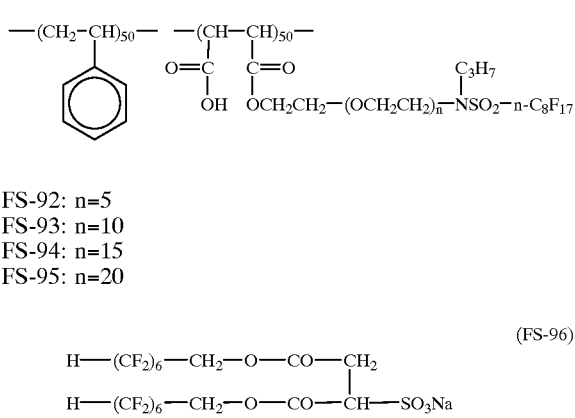

FS-92: n=5
FS-93: n=10
FS-94: n=15
FS-95: n=20

(FS-96)

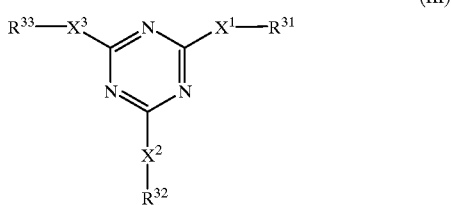

Two or more fluorine containing surface active agents can be used in combination.

The surface active agents are described in various documents, such as Hiroshi Horiguchi, New Surface Active Agents, Sankyo Shuppan, 1975 (written in Japanese), M. J. Schick, Nonionic Surfactants, Marcell Dekker Inc., New York, 1967 and Japanese Patent Provisional Publication No. 7(1995)-13293.

The fluorine containing surface active agent is used in an amount of 25 to 1,000 mg/m², preferably in the range of 30 to 500 mg/m²₁ and more preferably in the range of 35 to 200 mg/m².

The fluorine containing surface active agent is also preferably used in an amount of 2 to 30 wt. % based on the amount of the discotic liquid crystal molecules. The amount is more preferably in the range of 3 to 25 wt. %, and most preferably in the range of 5 to 10 wt. %.

The 1,3,5-triazine compound is preferably represented by the following formula (III).

$$R^{33}-X^3 \underset{\underset{R^{32}}{X^2}}{\overset{N}{\underset{N}{\bigtriangleup}}} X^1-R^{31}$$ (III)

in which each of $X^1$, $X^2$ and $X^3$ independently is a single bond, —NR— (wherein R is hydrogen or an alkyl group having 1 to 30 carbon atoms), —O— or —S—; and each of $R^{31}$, $R^{32}$ and $R^{33}$ independently is an alkyl group, an alkenyl group, an aryl group or a heterocyclic group.

The compound represented by the formula (III) preferably is a melamine compound. The melamine compound means that each of $X^1$, $X^2$ and $X^3$ is —NR— or that each of $X^1$, $X^2$ and $X^3$ is a single bond and each of $R^{31}$, $R^{32}$ and $R^{33}$ independently is a heterocyclic group having a free valence at nitrogen atom. The melamine compound is described below by referring to the formula (IV).

R of —NR— preferably is hydrogen.

Each of $R^{31}$, $R^{32}$ and $R^{33}$ preferably is an aryl group.

The alkyl group preferably has a chain structure rather than a cyclic structure. An alkyl group of a straight chain structure is preferred to an alkyl group of a branched chain structure. The alkyl group preferably has 1 to 30 carbon atom, more preferably has 2 to 30 carbon atoms, further preferably has 4 to 30 carbon atoms, and most preferably has 6 to 30 carbon atoms. The alkyl group may have a substituent group. Examples of the substituent groups include a halogen atom, an alkoxy group (e.g., methoxy, ethoxy, epoxyethyloxy) and an acyloxy group (e.g., acryloyloxy, methacryloyloxy).

The alkenyl group preferably has a chain structure rather than a cyclic structure. An alkenyl group of a straight chain structure is preferred to an alkenyl group of a branched chain structure. The alkenyl group preferably has 2 to 30 carbon atom, more preferably has 3 to 30 carbon atoms, further preferably has 4 to 30 carbon atoms, and most preferably has 6 to 30 carbon atoms. The alkenyl group may have a substituent group. Examples of the substituent groups include a halogen atom, an alkoxy group (e.g., methoxy, ethoxy, epoxyethyloxy) and an acyloxy group (e.g., acryloyloxy, methacryloyloxy).

The aryl group preferably is phenyl or naphthyl, and more preferably is phenyl. The aryl group may have a substituent group. Examples of the substituent groups include a halogen atom, hydroxyl, cyano, nitro, carboxyl, an alkyl group, an alkenyl group, an aryl group, an alkoxy group, an alkenyloxy group, an aryloxy group, an acyloxy group, an alkoxycarbonyl group, an alkenyloxycarbonyl group, an aryloxycarbonyl group, sulfamoyl, an alkyl substituted sulfamoyl group, an alkenyl substituted sulfamoyl group, an aryl substituted sulfamoyl group, a sulfonamido group, carbamoyl, an alkyl substituted carbamoyl group, an alkenyl substituted carbamoyl group, an aryl substituted carbamoyl group, an amido group, an alkylthio group, an alkenylthio group, an arylthio group and an acyl group.

The alkyl group has the same meanings as is described above. The alkyl moieties of the alkoxy group, the acyloxy group, the alkoxycarbonyl group, the alkyl substituted sulfamoyl group, the sulfonamido group, the alkyl substituted carbamoyl group, the amido group, the alkylthio group and the acyl group also have the same meanings as is described above.

The alkenyl group has the same meanings as is described above. The alkenyl moieties of the alkenyloxy group, the acyloxy group, the alkenyloxycarbonyl group, the alkenyl substituted sulfamoyl group, the sulfonamido group, the alkenyl substituted carbamoyl group, the amido group, the alkenylthio group and the acyl group also have the same meanings as is described above.

Examples of the aryl groups include phenyl, a-naphthyl, b-naphthyl, 4-methoxyphenyl, 3,4-diethoxyphenyl, 4-octyloxyphenyl and 4-dodecyloxyphenyl. Examples of the phenyl moieties of the aryloxy group, the acyloxy group, the aryloxycarbonyl group, the aryl substituted sulfamoyl group, the sulfonamido group, the aryl substituted carbamoyl group, the amido group, the arylthio group and the acyl group are the same as the examples of the phenyl group.

Where $X^1$, $X^2$ or $X^3$ is —NR—, —O— or —S—, the heterocyclic group preferably has aromaticity. An aromatic heterocyclic ring generally is an unsaturated heterocyclic ring, and preferably is a heterocyclic ring having the maximum number of double bonds. The heterocyclic ring preferably is a five-membered, six-membered or seven-membered ring, more preferably is a five-membered or six-membered ring, and most preferably is a six-membered ring. The hetero atom of the ring preferably is N, S or O, and more preferably is N. The aromatic heterocyclic ring most preferably is pyridine ring. The heterocyclic group preferably is 2-pyridyl or 4-pyridyl. The heterocyclic group may have a substituent group. Examples of the substituent groups are the same as those of the substituent groups of the aryl group.

Where $X^1$, $X^2$ or $X^3$ is a single bond, the heterocyclic group preferably has a free valence at nitrogen atom. The heterocyclic ring preferably is a five-membered, six-membered or seven-membered ring, more preferably is a five-membered or six-membered ring, and most preferably is a five-membered ring. The heterocyclic ring may contain two or more nitrogen atoms. The heterocyclic ring may contain another hetero atom (e.g., O, S). The heterocyclic ring may have a substituent group. Examples of the substituent groups are the same as those of the substituent groups of the aryl group. Examples of the heterocyclic groups having a free valence at nitrogen atom are shown below.

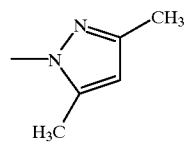
(Hc-1)

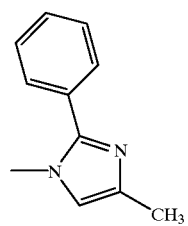
(Hc-2)

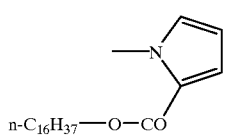
(Hc-3)

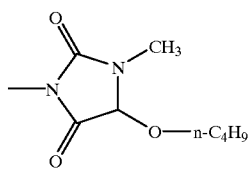
(Hc-4)

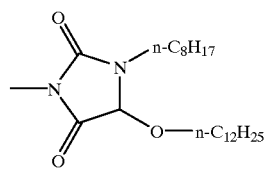
(Hc-5)

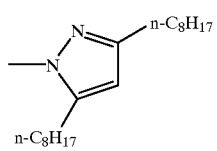
(Hc-6)

-continued

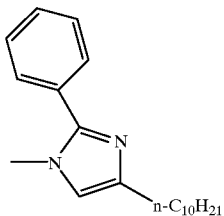
(Hc-7)

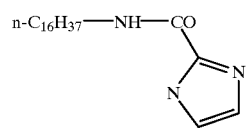
(Hc-8)

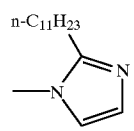
(Hc-9)

(Hc-10)

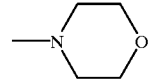

(Hc-11)

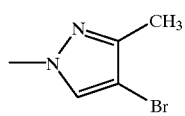

(Hc-12)

At least one of $R^{31}$, $R^{32}$ and $R^{33}$ preferably contains an alkylene moiety having 9 to 30 carbon atoms or an alkenylene moiety having 9 to 30 carbon atoms. The alkylene moiety or the alkenylene moiety preferably has a straight chain structure. The alkylene moiety or the alkenylene moiety is preferably contained in a substituent group of an aryl group.

At least one of $R^{31}$, $R^{32}$ and $R^{33}$ preferably contains a polymerizable group as a substituent group. The 1,3,5-triazine compound preferably hap at least two polymerizable groups. The polymerizable group is preferably positioned at the end of $R^{31}$, $R^{32}$ or $R^{33}$.

Where the polymerizable group is introduced into the 1,3,5-triazine compound, the discotic liquid crystal molecules and the 1,3,5-triazine compound can be polymerized in the optically anisotropic layer.

Examples of $R^{31}$, $R^{32}$ or $R^{33}$ having a polymerizable group as a substituent group are represented by the formula (Rp).

—$L^5$(—P)n    (Rp)

in which $L^5$ is a (n+1) valent linking group; P is a polymerizable group; and n is an integer of 1 to 5.

In the formula (Rp), $L^5$ preferably is a linking group consisting of at least two of an alkylene group, an alkenylene group, a (n+1) valent aromatic group, a divalent heterocyclic group, —CO—, —NR— (wherein R is hydrogen or an alkyl group having 1 to 30 carbon atoms), —O—, —S— and —SO$_2$—. The alkylene group preferably has 1 to 12 carbon atoms. The alkenylene group preferably has 2 to 12 carbon atoms. The aromatic group preferably has 6 to 10 carbon atoms.

Examples of L$^5$ of the formula (Rp) are shown below. The left side is attached to X$^1$, X$^2$ or X$^3$ (or directly attached to 1,3,5-triazine ring where X$^1$, X$^2$ or X$^3$ is a single bond) in the formula (III). The right side is attached to a polymerizable group (P). AL means an alkylene group or alkenylene group, Hc means a divalent heterocyclic group, and AR means an aromatic group. The alkylene group, the alkenylene group, the heterocyclic group and the aromatic group may have a substituent group (e.g., an alkyl group, a halogen atom).

L51: —AL—O—CO—
L52: —AL—O—
L53: —AR(—O—AL—O—CO—)$_n$
L54: —AR(—O—AL—O—)$_n$
L55: —AR(—O—CO—AL—O—CO—)$_n$
L56: —AR(—CO—O—AL—O—CO—)$_n$
L57: —AR(—O—CO—AR—O—AL—O—CO—)$_n$
L58: —AR(—NR—SO$_2$—AL—O—CO—)$_n$
L59: —AR(—SO$_2$—NR—AL—O—CO—)$_n$

Examples of the polymerizable groups (P) in the formula (Rp) are the same as those of the polymerizable groups (P1 to P18) of the discotic liquid crystal molecule. The polymerizable group is used to polymerize the 1,3,5-triazine compound and the discotic liquid crystal molecule. Accordingly, the polymerizable group of the 1,3,5-triazine compound is preferably similar to the polymerizable group of the discotic liquid crystal molecule. Therefore, the polymerizable group (P) of the 1,3,5-triazine compound preferably is an unsaturated polymerizable group (P1, P2, P3, P7, P8, P15, P16, P17) or an epoxy group (P6, P18), more preferably is an unsaturated polymerizable group, and most preferably is an ethylenically unsaturated group (P1, P7, P8, P15, P16, P17) in the same manner as in the discotic liquid crystal compound.

Where n is an integer of 2 to 5, the linking group (L5) preferably contains a (n+1) valent aromatic group. In other words, the formula (Rp) is preferably branched at the (n+1) valent aromatic group. In the formula (Rp), n preferably is an integer of 1 to 3.

Examples of the 1,3,5-triazine compounds (except for melamine compounds) are shown below.

(TR-1 to TR-13)

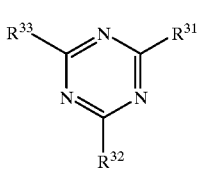

TR-1: R$^{31}$, R$^{32}$, R$^{33}$: —(CH$_2$)$_9$—O—CO—CH=CH$_2$
TR-2: R$^{31}$, R$^{32}$, R$^{33}$: —(CH$_2$)$_4$—CH=CH—(CH$_2$)$_4$—O—CO—CH=CH$_2$
TR-3: R$^{31}$, R$^{32}$: —(CH$_2$)$_9$—O—CO—CH=CH$_2$; R$^{33}$: —(CH$_2$)$_{12}$—CH$_3$
TR-4: R$^{31}$, R$^{32}$: —(CH$_2$)$_4$—CH=CH—(CH$_2$)$_4$—O—CO—CH=CH$_2$; R$^{33}$: —(CH$_2$)$_{12}$—CH$_3$
TR-5: R$^{31}$: —(CH$_2$)$_9$—O—CO—CH=CH$_2$; R$^{32}$, R$^{33}$: —(CH$_2$)$_{12}$—CH$_3$
TR-6: R$^{31}$: —(CH$_2$)$_4$—CH=CH—(CH$_2$)$_4$—O—CO—CH=CH$_2$; R$^{32}$, R$^{33}$: —(CH$_2$)$_{12}$—CH$_3$
TR-7: R$^{31}$, R$^{32}$: —(CH$_2$)$_4$—O—CO—CH=CH$_2$; R$^{33}$: —(CH$_2$)$_{12}$—CH$_3$
TR-8: R$^{31}$: —(CH$_2$)$_4$—O—CO—CH=CH$_2$; R$^{32}$, R$^{33}$: —(CH$_2$)$_{12}$—CH$_3$
TR-9: R$^{31}$, R$^{32}$, R$^{33}$: —(CH$_2$)$_9$-EpEt
TR-10: R$^{31}$, R$^{32}$, R$^{33}$: —(CH$_2$)$_4$—CH=CH—(CH$_2$)$_4$—O-EpEt
TR-11: R$^{31}$, R$^{32}$: —(CH$_2$)$_9$—O-EpEt; R$^{33}$: —(CH$_2$)$_{12}$—CH$_3$
TR-12: R$^{31}$, R$^{32}$, R$^{33}$: —(CH$_2$)$_9$—O—CH=CH$_2$
TR-13: R$^{31}$, R$^{32}$: —(CH$_2$)$_9$—O—CH=CH$_2$; R$^{33}$: —(CH$_2$)$_{12}$—CH$_3$
(Remark)
EpEt: Epoxyethyl (TR-14 to TR-65)

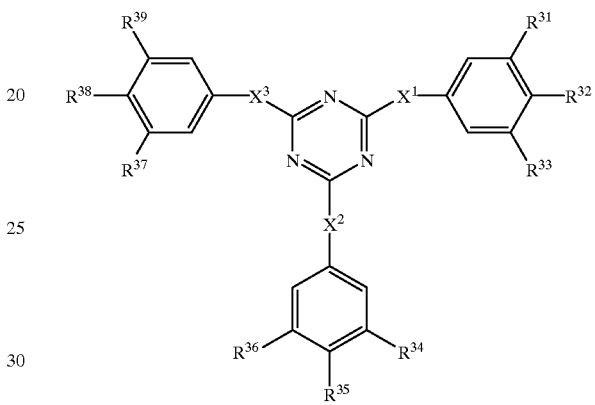

TR-14: X$^1$, X$^2$, X$^3$: —O—; R$^{32}$, R$^{35}$, R$^{38}$: —O—(CH$_2$)$_9$—O—CO—CH=CH$_2$
TR-15: X$^1$, X$^2$, X$^3$: —O—; R$^{31}$, R$^{32}$, R$^{34}$, R$^{35}$, R$^{37}$, R$^{38}$: —O—(CH$_2$)$_9$—O—CO—CH=CH$_2$
TR-16: X$^1$, X$^2$, X$^3$: —O—; R$^{32}$, R$^{35}$, R$^{38}$: —O—(CH$_2$)$_4$—CH=CH—(CH$_2$)$_4$—O—CO—CH=CH$_2$
TR-17: X$^1$, X$^2$, X$^3$: —O—; R$^{31}$, R$^{32}$, R$^{34}$, R$^{35}$, R$^{37}$, R$^{38}$: —O—(CH$_2$)$_4$—CH=CH—(CH$_2$)$_4$—O—CO—CH=CH$_2$
TR-18: X$^1$, X$^2$, X$^3$: —O—; R$^{31}$, R$^{33}$, R$^{34}$, R$^{36}$, R$^{37}$, R$^{39}$: —O—(CH$_2$)$_9$—O—CO—CH=CH$_2$
TR-19: X$^1$, X$^2$, X$^3$: —O—; R$^{31}$, R$^{32}$, R$^{33}$, R$^{34}$, R$^{35}$, R$^{36}$, R$^{37}$, R$^{38}$, R$^{39}$: —O—(CH$_2$)$_9$—O—CO—CH=CH$_2$
TR-20: X$^1$, X$^2$: —O—; X$^3$: —NH—; R$^{32}$, R$^{35}$, R$^{38}$: —O—(CH$_2$)$_9$—O—CO—CH=CH$_2$
TR-21: X$^1$, X$^2$: —O—; X$^3$: —NH—; R$^{32}$, R$^{35}$: —O—(CH$_2$)$_4$—O—CO—CH=CH$_2$; R$^{38}$: —O—(CH$_2$)$_{12}$—CH$_3$
TR-22: X$^1$, X$^2$: —O—; X$^3$: —NH—; R$^{32}$, R$^{35}$: —O—(CH$_2$)$_4$—O—CO—CH=CH$_2$; R$^{37}$, R$^{38}$: —O—(CH$_2$)$_{12}$—CH$_3$
TR-23: X$^1$, X$^2$: —O—; X$^3$: —NH—; R$^{32}$, R$^{35}$: —O—(CH$_2$)$_4$—O—CO—CH=CH$_2$; R$^{38}$: —O—CO—(CH$_2$)$_{11}$—CH$_3$
TR-24: X$^1$: —O—; X$^2$, X$^3$: —NH—; R$^{31}$, R$^{33}$: —O—(CH$_2$)$_{12}$—CH$_3$; R$^{35}$, R$^{38}$: —O—(CH$_2$)$_9$—O—CO—CH=CH$_2$
TR-25: X$^1$: —O—; X$^2$, X$^3$: —NH—; R$^{31}$, R$^{32}$: —O—(CH$_2$)$_6$—O—CO—CH=CH$_2$; R$^{35}$, R$^{38}$: —O—(CH$_2$)$_{11}$—CH$_3$
TR-26: X$^1$: —O—; X$^2$, X$^3$: —NH—; R$^{31}$, R$^{32}$, R$^{33}$: —O—(CH$_2$)$_6$—O—CO—CH=CH$_2$; R$^{35}$, R$^{38}$: —O—(CH$_2$)$_{11}$—CH$_3$
TR-27: X$^1$, X$^2$: —NH—; X$^3$: —S—; R$^{32}$, R$^{35}$: —O—(CH$_2$)$_9$—O—CO—CH=CH$_2$; R$^{38}$: —O—CO—(CH$_2$)$_{11}$—CH$_3$

TR-28: $X^1$, $X^2$: —NH—; $X^3$: —S—; $R^{31}$, $R^{32}$, $R^{34}$, $R^{35}$: —O—(CH$_2$)$_9$—O—CO—CH=CH$_2$; $R^{38}$: —O—CO—(CH$_2$)$_{11}$—CH$_3$

TR-29: $X^1$, $X^2$: —NH—; $X^3$: —S—; $R^{32}$, $R^{35}$: —O—(CH$_2$)$_4$—CH=CH—(CH$_2$)$_4$—O—CO—CH=CH$_2$; $R^{38}$: —O—CO—(CH$_2$)$_{11}$—CH$_3$

TR-30: $X^1$, $X^2$: —NH—; $X^3$: —S—; $R^{31}$, $R^{32}$, $R^{34}$, $R^{35}$: —O—(CH$_2$)$_4$—CH=CH—(CH$_2$)$_4$—O—CO—CH=CH$_2$; $R^{38}$: —O—CO—(CH$_2$)$_{11}$—CH$_3$

TR-31: $X^1$, $X^2$: —NH—; $X^3$: —S—; $R^{31}$, $R^{33}$, $R^{34}$, $R^{36}$: —O—(CH$_2$)$_9$—O—CO—CH=CH$_2$; $R^{38}$: —O—CO—(CH$_2$)$_{11}$—CH$_3$

TR-32: $X^1$, $X^2$: —NH—; $X^3$: —S—; $R^{31}$, $R^{32}$, $R^{33}$, $R^{34}$, $R^{35}$, $R^{36}$: —O—(CH$_2$)$_9$—O—CO—CH=CH$_2$; $R^{38}$: —O—CO—(CH$_2$)$_{11}$—CH$_3$

TR-33: $X^1$, $X^2$: —O—; $X^3$: —S—; $R^{32}$, $R^{35}$, $R^{38}$: —O—(CH$_2$)$_9$—O—CO—CH=CH$_2$

TR-34: $X^1$, $X^2$: —O—; $X^3$: —S—; $R^{32}$, $R^{35}$: —O—(CH$_2$)$_4$—O—CO—CH=CH$_2$; $R^{38}$: —O—(CH$_2$)$_{12}$—CH$_3$

TR-35: $X^1$, $X^2$: —O—; $X^3$: —S—; $R^{32}$, $R^{35}$: —O—(CH$_2$)$_4$—O—CO—CH=CH$_2$; $R^{37}$, $R^{38}$: —O—(CH$_2$)$_{12}$—CH$_3$

TR-36: $X^1$, $X^2$: —O—; $X^3$: —S—; $R^{32}$, $R^{35}$: —O—(CH$_2$)$_4$—O—CO—CH=CH$_2$; $R^{38}$: —O—CO—(CH$_2$)$_{11}$—CH$_3$

TR-37: $X^1$: —O—; $X^2$, $X^3$: —S—; $R^{31}$, $R^{33}$: —O—(CH$_2$)$_{12}$—CH$_3$; $R^{35}$, $R^{38}$: —O—(CH$_2$)$_9$—O—CO—CH=CH$_2$

TR-38: $X^1$: —O—; $X^2$, $X^3$: —S—; $R^{31}$, $R^{32}$: —O—(CH$_2$)$_6$—O—CO—CH=CH$_2$; $R^{35}$, $R^{38}$: —O—(CH$_2$)$_{11}$—CH$_3$

TR-39: $X^1$: —O—; $X^2$, $X^3$: —S—; $R^{31}$, $R^{32}$, $R^{33}$: —O—(CH$_2$)$_6$—O—CO—CH=CH$_2$; $R^{35}$, $R^{38}$: —O—(CH$_2$)$_{11}$—CH$_3$

TR-40: $X^1$, $X^2$, $X^3$: —S—; $R^{32}$, $R^{35}$, $R^{38}$: —O—(CH$_2$)$_9$—O—CO—CH=CH$_2$

TR-41: $X^1$, $X^2$, $X^3$: —S—; $R^{31}$, $R^{32}$, $R^{34}$, $R^{35}$, $R^{37}$, $R^{38}$: —O—(CH$_2$)$_9$—O—CO—CH=CH$_2$

TR-42: $X^1$, $X^2$, $X^3$: —S—; $R^{32}$, $R^{35}$, $R^{38}$: —O—(CH$_2$)$_4$—CH=CH—(CH$_2$)$_4$—O—CO—CH=CH$_2$

TR-43: $X^1$, $X^2$, $X^3$: —S—; $R^{31}$, $R^{32}$, $R^{34}$, $R^{35}$, $R^{37}$, $R^{38}$: —O—(CH$_2$)$_4$—CH=CH—(CH$_2$)$_4$—O—CO—CH=CH$_2$

TR-44: $X^1$, $X^2$, $X^3$: —S—; $R^{31}$, $R^{33}$, $R^{34}$, $R^{36}$, $R^{37}$, $R^{39}$: —O—(CH$_2$)$_9$—O—CO—CH=CH$_2$

TR-45: $X^1$, $X^2$, $X^3$: —S—; $R^{31}$, $R^{32}$, $R^{33}$, $R^{34}$, $R^{35}$, $R^{36}$, $R^{37}$, $R^{38}$, $R^{39}$: —O—(CH$_2$)$_9$—O—CO—CH=CH$_2$

TR-46: $X^1$, $X^2$: —S—; $X^3$: —NH—; $R^{32}$, $R^{35}$, $R^{38}$: —O—(CH$_2$)$_9$—O—CO—CH=CH$_2$

TR-47: $X^1$, $X^2$: —S—; $X^3$: —NH—; $R^{32}$, $R^{35}$: —O—(CH$_2$)$_4$—O—CO—CH=CH$_2$; $R^{38}$: —O—(CH$_2$)$_{12}$—CH$_3$

TR-48: $X^1_1$, $X^2$: —S—; $X^3$: —NH—; $R^{32}$, $R^{35}$: —O—(CH$_2$)$_4$—O—CO—CH=CH$_2$; $R^{37}$, $R^{38}$: —O—(CH$_2$)$_{12}$—CH$_3$

TR-49: $X^1$, $X^2$: —S—; $X^3$: —NH—; $R^{32}$, $R^{35}$: —O—(CH$_2$)$_4$—O—CO—CH=CH$_2$; $R^{38}$: —O—CO—(CH$_2$)$_{11}$—CH$_3$

TR-50: $X^1$: —O—; $X^2$: —NH—; $X^3$: —S—; $R^{31}$, $R^{33}$: —O—(CH$_2$)$_{12}$—CH$_3$; $R^{35}$: —O—(CH$_2$)$_9$—O—CO—CH=CH$_2$; $R^{38}$: —O—CO—(CH$_2$)$_{11}$—CH$_3$

TR-51: $X^1$: —O—; $X^2$: —NH—; $X^3$: —S—; $R^{31}$, $R^{32}$: —O—(CH$_2$)$_6$—O—CO—CH=CH$_2$; $R^{35}$: —O—(CH$_2$)$_{11}$—CH$_3$; $R^{38}$: —O—CO—(CH$_2$)$_{11}$—CH$_3$

TR-52: $X^1$: —O—; $X^2$: —NH—; $X^3$: —S—; $R^{31}$, $R^{32}$, $R^{33}$: —O—(CH$_2$)$_6$—O—CO—CH=CH$_2$; $R^{35}$: —O—(CH$_2$)$_{11}$—CH$_3$; $R^{38}$: —O—CO—(CH$_2$)$_{11}$—CH$_3$

TR-53: $X^1$, $X^2$, $X^3$: —O—; $R^{32}$, $R^{35}$, $R^{38}$: —O—(CH$_2$)$_9$—O-EpEt

TR-54: $X^1$, $X^2$, $X^3$: —O—; $R^{31}$, $R^{32}$, $R^{34}$, $R^{35}$, $R^{37}$, $R^{38}$: —O—(CH$_2$)$_9$-EpEt

TR-55: $X^1$, $X^2$, $X^3$: —O—; $R^{32}$, $R^{35}$, $R^{38}$: —O—(CH$_2$)$_4$—CH=CH—(CH$_2$)$_4$—O-EpEt

TR-56: $X^1$, $X^2$, $X^3$: —O—; $R^{31}$, $R^{32}$, $R^{34}$, $R^{35}$, $R^{37}$, $R^{38}$: —O—(CH$_2$)$_4$—CH=CH—(CH$_2$)$_4$—O-EpEt

TR-57: $X^1$, $X^2$, $X^3$: —O—; $R^{31}$, $R^{33}$, $R^{34}$, $R^{36}$, $R^{37}$, $R^{39}$: —O—(CH$_2$)$_9$—O-EpEt

TR-58: $X^1$, $X^2$, $X^3$: —O—; $R^{32}$, $R^{35}$, $R^{38}$: —O—(CH$_2$)$_9$—O—CH=CH$_2$

TR-59: $X^1$, $X^2$: —O—; $X^3$: —NH—; $R^{32}$, $R^{35}$, $R^{38}$: —O—(CH$_2$)$_9$—O-EpEt

TR-60: $X^1$, $X^2$: —O—; $X^3$: —NH—; $R^{32}$, $R^{35}$: —O—(CH$_2$)$_4$—O-EpEt; $R^{38}$: —O—(CH$_2$)$_{12}$—CH$_3$

TR-61: $X^1$, $X^2$: —O—; $X^3$: —NH—; $R^{32}$, $R^{35}$: —O—(CH$_2$)$_4$—O-EpEt; $R^{37}$, $R^{38}$: —O—(CH$_2$)$_{12}$—CH$_3$

TR-62: $X^1$, $X^2$: —O—; $X^3$: —NH—; $R^{32}$, $R^{35}$: —O—(CH$_2$)$_4$—O-EpEt; $R^{38}$: —O—CO—(CH$_2$)$_{11}$—CH$_3$

TR-63: $X^1$: —O—; $X^2$, $X^3$: —NH—; $R^{31}$, $R^{33}$: —O—(CH$_2$)$_{12}$—CH$_3$; $R^{35}$, $R^{38}$: —O—(CH$_2$)$_9$—O-EpEt

TR-64: $X^1$: —O—; $X^2$, $X^3$: —NH—; $R^{31}$, $R^{32}$: —O—(CH$_2$)$_6$—O-EpEt; $R^{35}$, $R^{38}$: —O—(CH$_2$)$_{11}$—CH$_3$

TR-65: $X^1$: —O—; $X^2$, $X^3$: —NH—; $R^{32}$, $R^{35}$, $R^{38}$: —O—(CH$_2$)$^9$—O—CH=CH$_2$ (Remark)
Not defined R: Hydrogen
EpEt: Epoxyethyl The 1,3,5-triazine compound preferably is a melamine compound represented by the formula (IV).

(IV)

in which each of $R^{41}$, $R^{43}$ and $R^{45}$ independently is hydrogen or an alkyl group having 1 to 30 carbon atoms; and each of $R^{42}$, $R^{44}$ and $R^{46}$ independently is an alkyl group, an alkenyl group, an aryl group or a heterocyclic group; or $R^{41}$ and $R^{42}$, $R^{43}$ and $R^{44}$ or $R^{45}$ and $R^{46}$ are combined to form a heterocyclic ring.

Each of $R^{41}$, $R^{43}$ and $R^{45}$ preferably is hydrogen or an alkyl group having 1 to 20 carbon atoms, more preferably is hydrogen or an alkyl group having 1 to 10 carbon atoms, further-preferably is hydrogen or an alkyl group having 1 to 6 carbon atoms, and most preferably is hydrogen.

Each of $R^{42}$, $R^{44}$ and $R^{46}$ preferably is an aryl group.

The definitions and the substituent groups of the alkyl group, the alkenyl group, the aryl group and the heterocyclic group are the same as those described in the formula (III).

The heterocyclic ring formed by $R^{41}$ and $R^{42}$, $R^{43}$ and $R^{44}$ or $R^{45}$ and $R^{46}$ is the same as the heterocyclic group having a free valence at nitrogen atom described in the formula (III).

At least one of $R^{42}$, $R^{44}$ and $R^{46}$ preferably contains an alkylene moiety having 9 to 30 carbon atoms or an alkenylene moiety having 9 to 30 carbon atoms. The alkylene moiety or the alkenylene moiety preferably has a straight chain structure. The alkylene moiety or the alkenylene moiety is preferably contained in a substituent group of an aryl group.

At least one of $R^{42}$, $R^{43}$ and $R^{44}$ preferably contains a polymerizable group as a substituent group. The melamine compound preferably has at least two polymerizable groups. The polymerizable group is preferably positioned at the end of $R^{42}$, $R^{44}$ or $R^{46}$.

Where the polymerizable group is introduced into the melamine compound, the discotic liquid crystal molecules and the melamine compound can be polymerized in the optical anisotropic layer.

Examples of $R^{42}$, $R^{44}$ or $R^{46}$ having a polymerizable group as a substituent group are the same as the groups represented by the formula (Rp).

Examples of the melamine compounds are shown below.

(MM-1 to MM-46)

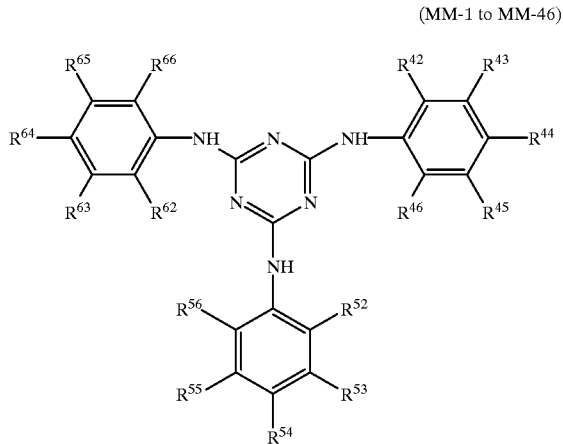

MM-1: $R^{43}$, $R^{44}$, $R^{53}$, $R^{54}$, $R^{63}$, $R^{64}$: —O—$(CH_2)_9$—$CH_3$
MM-2: $R^{43}$, $R^{44}$, $R^{53}$, $R^{54}$, $R^{63}$, $R^{64}$: —O—$(CH_2)_{11}$—$CH_3$
MM-3: $R^{43}$, $R^{44}$, $R^{53}$, $R^{54}$, $R^{63}$, $R^{64}$: —O—$(CH_2)_{15}$—$CH_3$
MM-4: $R^{44}$, $R^{54}$, $R^{64}$: —O—$(CH_2)_9$—$CH_3$
MM-5: $R^{44}$, $R^{54}$, $R^{64}$: —O—$(CH_2)_{15}$—$CH_3$
MM-6: $R^{43}$, $R^{53}$, $R^{63}$: —O—$CH_3$; $R^{44}$, $R^{54}$, $R^{64}$: —O—$(CH_2)_{17}$—$CH_3$
MM-7: $R^{44}$, $R^{54}$, $R^{64}$: —CO—O—$(CH_2)_{11}$—$CH_3$
MM-8: $R^{44}$, $R^{54}$, $R^{64}$: —$SO_2$—NH—$(CH_2)_{17}$—$CH_3$
MM-9: $R^{43}$, $R^{53}$, $R^{63}$: —O—CO—$(CH_2)_{15}$—$CH_3$
MM-10: $R^{42}$, $R^{52}$, $R^{62}$: —O—$(CH_2)_{17}$—$CH_3$
MM-11: $R^{42}$, $R^{52}$, $R^{62}$: —O—$CH_3$; $R^{43}$, $R^{53}$, $R^{63}$: —CO—O—$(CH_2)_{11}$—$CH_3$
MM-12: $R^{42}$, $R^{52}$, $R^{62}$: —Cl; $R^{43}$, $R^{53}$, $R^{63}$: —CO—O—$(CH_2)_{11}$—$CH_3$
MM-13: $R^{42}$, $R^{52}$, $R^{62}$: —CO—O—$(CH_2)_{11}$—$CH_3$; $R^{45}$, $R^{55}$, $R^{65}$: —$SO_2$—NH-iso-$C_3H_7$
MM-14: $R^{42}$, $R^{52}$, $R^{62}$—Cl; $R^{45}$, $R^{55}$, $R^{65}$: —$SO_2$—NH—$(CH_2)_{15}$—$CH_3$
MM-15: $R^{42}$, $R^{46}$, $R^{52}$, $R^{56}$, $R^{62}$, $R^{66}$: —Cl; $R^{45}$, $R^{55}$, $R^{65}$: —$SO_2$—NH—$(CH_2)_{19}$—$CH_3$
MM-16: $R^{43}$, $R^{54}$: —O—$(CH_2)_9$—$CH_3$; $R^{44}$, $R^{53}$, $R^{63}$, $R^{64}$: —O—$(CH_2)_{11}$—$CH_3$
MM-17: $R^{44}$: —O—$(CH_2)_{11}$—$CH_3$; $R^{54}$: —O—$(CH_2)_{15}$—$CH_3$; $R^{64}$: —O—$(CH_2)_{17}$—$CH_3$;
MM-18: $R^{42}$, $R^{45}$, $R^{52}$, $R^{55}$, $R^{62}$, $R^{65}$: —O—$CH_3$; $R^{44}$, $R^{54}$, $R^{64}$: —NH—CO—$(CH_2)_{14}$—$CH_3$
MM-19: $R^{42}$, $R^{45}$, $R^{52}$, $R^{55}$, $R^{62}$, $R^{65}$: —O—$(CH_2)_3$—$CH_3$; $R^{44}$, $R^{54}$, $R^{64}$: —O—$(CH_2)_{15}$—$CH_3$
MM-20: $R^{42}$, $R^{52}$, $R^{62}$: —NH—$SO_2$—$(CH_2)_{15}$—$CH_3$; $R^{44}$, $R^{45}$, $R^{54}$, $R^{55}$, $R^{64}$, $R^{65}$: —Cl
MM-21: $R^{42}$, $R^{43}$, $R^{52}$, $R^{53}$, $R^{62}$, $R^{63}$: —F; $R^{44}$, $R^{54}$, $R^{64}$: —CO—NH—$(CH_2)_{15}$—$CH_3$; $R^{45}$, $R^{46}$, $R^{55}$, $R^{56}$, $R^{65}$, $R^{66}$: —Cl
MM-22: $R^{42}$, $R^{52}$, $R^{62}$: —Cl; $R^{44}$, $R^{54}$, $R^{64}$: —$CH_3$; $R^{45}$, $R^{55}$, $R^{65}$: —NH—CO—$(CH_2)_{12}$—$CH_3$
MM-23: $R^{42}$, $R^{52}$, $R^{62}$: —OH; $R^{44}$, $R^{54}$, $R^{64}$: —$CH_3$; $R^{45}$, $R^{55}$, $R^{65}$: —O—$(CH_2)_{15}$—$CH_3$
MM-24: $R^{42}$, $R^{45}$, $R^{52}$, $R^{55}$, $R^{62}$, $R^{65}$: —O—$CH_3$; $R^{44}$, $R^{54}$, $R^{64}$: —$(CH_2)_{11}$—$CH_3$
MM-25: $R^{42}$, $R^{52}$, $R^{62}$: —NH—$SO_2$—$CH_3$; $R^{45}$, $R^{55}$, $R^{65}$: —CO—O—$(CH_2)_{11}$—$CH_3$
MM-26: $R^{42}$, $R^{52}$, $R^{62}$: —S—$(CH_2)_{11}$—$CH_3$; $R^{45}$, $R^{55}$, $R^{65}$: —$SO_2$—$NH_2$
MM-27: $R^{43}$, $R^{44}$, $R^{53}$, $R^{54}$, $R^{63}$, $R^{64}$: —O—$(CH_2)_{12}$—O—CO—CH=$CH_2$
MM-28: $R^{43}$, $R^{44}$, $R^{53}$, $R^{54}$, $R^{63}$, $R^{64}$: —O—$(CH_2)_8$—O—CO—CH=$CH_2$
MM-29: $R^{43}$, $R^{44}$, $R^{53}$, $R^{54}$, $R^{63}$, $R^{64}$: —O—CO—$(CH_2)_7$—O—CO—CH=$CH_2$
MM-30: $R^{44}$, $R^{54}$, $R^{64}$: —CO—O—$(CH_2)_{12}$—O—CO—C$(CH_3)$=$CH_2$
MM-31: $R^{43}$, $R^{44}$, $R^{53}$, $R^{54}$, $R^{63}$, $R^{64}$: —O—CO—p—Ph—$(CH_2)_4$—O—CO—CH=$CH_2$
MM-32: $R^{42}$, $R^{44}$, $R^{52}$, $R^{54}$, $R^{62}$, $R^{64}$: —NH—$SO_2$—$(CH_2)_8$—O—CO—CH=$CH_2$; $R^{45}$, $R^{55}$, $R^{65}$: —Cl
MM-33: $R^{42}$, $R^{52}$, $R^{62}$: —NH—$SO_2$—$CH_3$; $R^{45}$, $R^{55}$, $R^{65}$: —CO—O—$(CH_2)_{12}$—O—CO—CH=$CH_2$
MM-34: $R^{44}$, $R^{54}$, $R^{64}$: —O—$(CH_2)_9$—O—CO—CH=$CH_2$
MM-35: $R^{43}$, $R^{44}$, $R^{53}$, $R^{54}$, $R^{63}$, $R^{64}$: —O—$(CH_2)_9$—O—CO—CH=$CH_2$
MM-36: $R^{44}$, $R^{54}$, $R^{64}$: —O—$(CH_2)_4$—CH=CH—$(CH_2)_4$—O—CO—CH=$CH_2$
MM-37: $R^{43}$, $R^{44}$, $R^{53}$, $R^{54}$, $R^{63}$, $R^{64}$: —O—$(CH_2)_4$—CH=CH—$(CH_2)_4$—O—CO—CH=$CH_2$
MM-38: $R^{43}$, $R^{45}$, $R^{53}$, $R^{55}$, $R^{63}$, $R^{65}$: —O—$(CH_2)_9$—O—CO—CH=$CH_2$
MM-39: $R^{43}$, $R^{44}$, $R^{45}$, $R^{53}$, $R^{54}$, $R^{55}$, $R^{63}$, $R^{64}$, $R^{65}$: —O—$(CH_2)_9$—O—CO—CH=$CH_2$
MM-40: $R^{44}$, $R^{54}$: —O—$(CH_2)_4$—O—CO—CH=$CH_2$; $R^{64}$: —O—$(CH_2)_9$—CO—CH=$CH_2$
MM-41: $R^{44}$, $R^{54}$: —O—$(CH_2)_4$—O—CO—CH=$CH_2$; $R^{64}$: —O—$(CH_2)_{12}$—$CH_3$
MM-42: $R^{44}$, $R^{54}$: —O—$(CH_2)_4$—O—CO—CH=$CH_2$; $R^{63}$, $R^{64}$: —O—$(CH_2)_{12}$—$CH_3$
MM-43: $R^{44}$, $R^{54}$: —O—$(CH_2)_4$—O—CO—CH=$CH_2$; $R^{63}$, $R^{64}$: —O—$(CH_2)_{11}$—$CH_3$
MM-44: $R^{43}$, $R^{45}$: —O—$(CH_2)_{12}$—$CH_3$; $R^{54}$, $R^{64}$: —O—$(CH_2)_9$—O—OCH=$CH_2$
MM-45: $R^{43}$, $R^{44}$: —O—$(CH_2)_6$—O—CO—CH=$CH_2$; $R^{54}$, $R^{64}$: —O—$(CH_2)_{11}$—$CH_3$
MM-46: $R^{43}$, $R^{44}$, $R^{45}$: —O—$(CH_2)_6$—O—CO—CH=$CH_2$; $R^{54}$, $R^{64}$: —O—$(CH_2)_{11}$—$CH_3$ (Remark)
Not defined R: Hydrogen
p-Ph: p-Phenylene (MM-47 to MM-59)

MM-47: $R^{46}$, $R^{56}$, $R^{66}$: —$SO_2$—NH—$(CH_2)_{15}$—$CH_3$; $R^{48}$, $R^{58}$, $R^{68}$: —O—$(CH_2)_{11}$—$CH_3$

MM-48: $R^{45}, R^{55}, R^{65}$: —SO$_2$—NH—(CH$_2$)$_{17}$—CH$_3$
MM-49: $R^{46}, R^{56}, R^{66}$: —SO$_2$—NH—(CH$_2$)$_{15}$—CH$_3$
MM-50: $R^{45}, R^{55}, R^{65}$: —O—(CH$_2$)$_{17}$—CH$_3$; $R^{47}, R^{57}, R^{67}$: —SO$_2$—NH—CH$_3$
MM-51: $R^{43}, R^{53}, R^{63}$: —O—(CH$_2$)$_{15}$—CH$_3$
MM-52: $R^{41}, R^{51}, R^{61}$: —O—(CH$_2$)$_{17}$—CH$_3$
MM-53: $R^{46}, R^{56}, R^{66}$: —SO$_2$—NH—Ph; $R^{48}, R^{58}, R^{68}$: —O—(CH$_2$)$_{11}$—CH$_3$
MM-54: $R^{45}, R^{55}, R^{65}$: —O—(CH$_2$)$_{21}$—CH$_3$; $R^{47}, R^{57}, R^{67}$: —SO$_2$—NH—Ph
MM-55: $R^{41}, R^{51}, R^{61}$: —p—Ph—(CH$_2$)$_{11}$—CH$_3$
MM-56: $R^{46}, R^{48}, R^{56}, R^{58}, R^{66}, R^{68}$: —SO$_2$—NH—(CH$_2$)$_7$—CH$_3$
MM-57: $R^{46}, R^{56}, R^{66}$: —SO$_2$—NH—(CH$_2$)$_{10}$—O—CO—CH=CH$_2$; $R^{48}, R^{58}, R^{68}$: —O—(CH$_2$)$_{12}$—CH$_3$
MM-58: $R^{45}, R^{55}, R^{65}$: —O—(CH$_2$)$_{12}$—O—CO—CH=CH$_2$; $R^{47}, R^{57}, R^{67}$: —SO$_2$—NH—Ph
MM-59: $R^{43}, R^{53}, R^{63}$: —O—(CH$_2$)$_{16}$—O—CO—CH=CH$_2$ (Remark)

Not defined R: Hydrogen

Ph: Phenyl p-Ph: p-Phenylene (MM-60 to MM-71)

MM-60: $R^{45}, R^{55}, R^{65}$: —NH—CO—(CH$_2$)$_{14}$—CH$_3$
MM-61: $R^{42}, R^{52}, R^{62}$: —O—(CH$_2$)$_{17}$—CH$_3$
MM-62: $R^{44}, R^{54}, R^{64}$: —O—(CH$_2$)$_{15}$—CH$_3$
MM-63: $R^{45}, R^{55}, R^{65}$: —SO$_2$—NH—(CH$_2$)$_{15}$—CH$_3$
MM-64: $R^{43}, R^{53}, R^{63}$: —CO—NH—(CH$_2$)$_{17}$—CH$_3$; $R^{44}, R^{54}, R^{64}$: —OH
MM-65: $R^{45}, R^{55}, R^{65}$: —O—(CH$_2$)$_{15}$—CH$_3$; $R^{46}, R^{56}, R^{66}$: —SO$_2$—NH—(CH$_2$)$_{11}$—CH$_3$
MM-66: $R^{47}, R^{57}, R^{67}$: —O—(CH$_2$)$_{21}$—CH$_3$
MM-67: $R^{44}, R^{54}, R^{64}$: —O—p—Ph—(CH$_2$)$_{11}$—CH$_3$
MM-68: $R^{46}, R^{56}, R^{66}$: —SO$_2$—NH—(CH$_2$)$_{15}$—CH$_3$
MM-69: $R^{43}, R^{53}, R^{63}$: —CO—NH—(CH$_2$)$_{17}$—CH$_3$; $R^{44}, R^{54}, R^{64}$: —O—(CH$_2$)$_{12}$—O—CO—CH=CH$_2$
MM-70: $R^{45}, R^{55}, R^{65}$: —O—(CH$_2$)$_8$—O—CO—CH=CH$_2$; $R^{46}, R^{56}, R^{66}$: —SO$_2$—NH—(CH$_2$)$_{11}$—CH$_3$
MM-71: $R^{43}, R^{46}, R^{53}, R^{56}, R^{63}, R^{66}$: —SO$_2$—NH—(CH$_2$)$_8$—O—CO—CH=CH$_2$ (Remark)

Not defined R: Hydrogen p-Ph: p-Phenylene (MM-72 to MM-75)

MM-72: $R^{41}, R^{43}, R^{45}$: —CH$_3$
MM-73: $R^{41}, R^{43}, R^{45}$: —C$_2$H$_5$
MM-74: $R^{41}, R^{43}$: —C$_2$H$_5$; $R^{45}$: —CH$_3$
MM-75: $R^{41}, R^{43}, R^{45}$: —(CH$_2$)$_3$—CH$_3$ (MM-76 to MM-88)

MM-76: $R^{42}, R^{44}, R^{46}$: —(CH$_2$)$_9$—O—CO—CH=CH$_2$
MM-77: $R^{42}, R^{44}, R^{46}$: —(CH$_2$)$_4$—CH=CH—(CH$_2$)$_4$—O—CO—CH=CH$_2$
MM-78: $R^{42}, R^{44}$: —(CH$_2$)$_9$—O—CO—CH=CH$_2$; $R^{46}$: —(CH$_2$)$_{12}$—CH$_3$
MM-79: $R^{42}, R^{44}$: —(CH$_2$)$_4$—CH=CH—(CH$_2$)$_4$—O—CO—CH=CH$_2$; $R^{46}$: —(CH$_2$)$_{12}$—CH$_3$
MM-80: $R^{42}$: —(CH$_2$)$_9$—O—CO—CH=CH$_2$; $R^{44}, R^{46}$: —(CH$_2$)$_{12}$—CH$_3$
MM-81: $R^{42}$: —(CH$_2$)$_4$—CH=CH—(CH$_2$)$_4$—O—CO—CH=CH$_2$; $R^{44}, R^{46}$: —(CH$_2$)$_{12}$—CH$_3$
MM-82: $R^{42}, R^{44}$: —(CH$_2$)$_4$—O—CO—CH=CH$_2$; $R^{46}$: —(CH$_2$)$_{12}$—CH$_3$
MM-83: $R^{42}$: —(CH$_2$)$_4$—O—CO—CH=CH$_2$; $R^{44}, R^{46}$: —(CH$_2$)$_{12}$—CH$_3$
MM-84: $R^{42}, R^{44}, R^{46}$: —(CH$_2$)$_9$-EpEt
MM-85: $R^{42}, R^{44}, R^{46}$: —(CH$_2$)$_4$—CH=CH—(CH$_2$)$_4$—O-EpEt
MM-86: $R^{42}, R^{44}$: —(CH$_2$)$_9$—O-EpEt; $R^{46}$: —(CH$_2$)$_{12}$—CH$_3$
MM-87: $R^{42}, R^{44}, R^{46}$: —(CH$_2$)$_9$—O—CH=CH$_2$
MM-88: $R^{42}, R^{44}$: —(CH$_2$)$_9$—O—CH=CH$_2$; $R^{46}$: —(CH$_2$)$_{12}$—CH$_3$ (Remark)

EpEt: Epoxyethyl (MM-89 to MM-95)

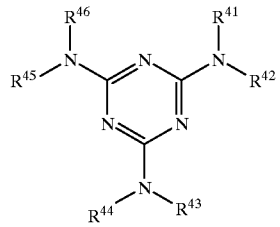

MM-89: $R^{41}, R^{42}, R^{43}, R^{44}, R^{45}, R^{46}$: —$(CH_2)_9$—$CH_3$
MM-90: $R^{41}, R^{43}, R^{45}$: —$H_3$; $R^{42}, R^{44}, R^{46}$: —$(CH_2)_{17}$—$CH_3$
MM-91: $R^{41}, R^{42}, R^{43}, R^{44}$: —$(CH_2)_7$—$CH_3$; $R^{45}, R^{46}$: —$(CH_2)_5$—$CH_3$
MM-92: $R^{41}, R^{42}, R^{43}, R^{44}, R^{45}, R^{46}$: -CyHx
MM-93: $R^{41}, R^{42}, R^{43}, R^{44}, R^{45}, R^{46}$: —$(CH_2)_2$—O—$C_2H_5$
MM-94: $R^{41}, R^{43}, R^{45}$: —$CH_3$; $R^{42}, R^{44}, R^{46}$: —$(CH_2)_{12}$—O—CO—CH=$CH_2$
MM-95: $R^{41}, R^{42}, R^{43}, R^{44}, R^{45}, R^{46}$: —$(CH_2)_8$—O—CO—CH=$CH_2$ (Remark)

CyHx: Cyclohexyl (MM-96)

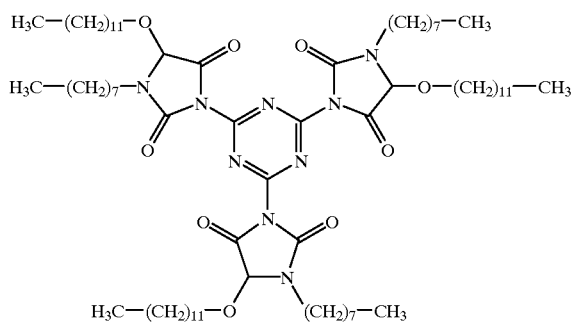

A melamine polymer can be used as the melamine compound. The melamine polymer is preferably synthesized from a melamine compound and a carbonyl compound by a reaction represented by the formula (V).

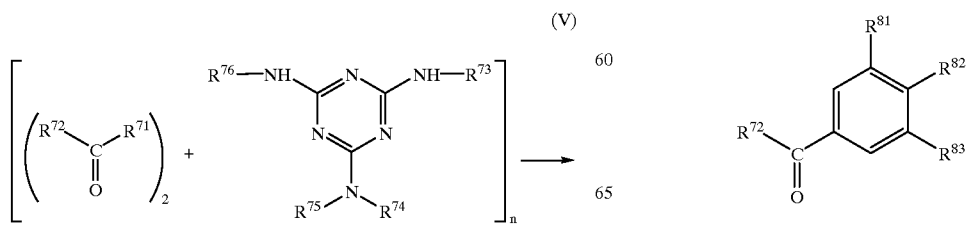

-continued

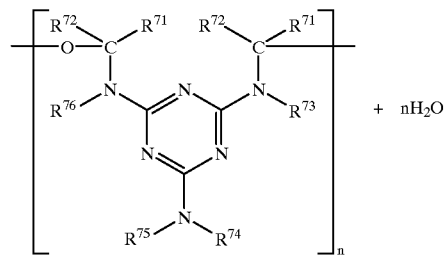

in which each of $R^{71}, R^{72}, R^{73}, R^{74}, R^{75}$ and $R^{76}$ independently is hydrogen, an alkyl group, an alkenyl group, an aryl group or a heterocyclic group.

The definitions and the substituent groups of the alkyl group, the alkenyl group, the aryl group and the heterocyclic group are the same as those described in the formula (III).

The polymerization reaction of the melamine compound and the carbonyl compound is the same as the synthesizing reaction of a conventional melamine resin (e.g., melamine formaldehyde resin). A commercially available melamine polymer (melamine resin) can be used in the present invention.

The melamine polymer has a molecular weight preferably in the range of 2,000 to 400,000.

At least one of $R^{71}, R^{72}, R^{73}, R^{74}, R^{75}$ and $R^{76}$ preferably contains an alkylene moiety having 9 to 30 carbon atoms or an alkenylene moiety having 9 to 30 carbon atoms. The alkylene moiety or the alkenylene moiety preferably has a straight chain structure. The alkylene moiety or the alkenylene moiety is preferably contained in a substituent group of an aryl group.

At least one of $R^{71}, R^{72}, R^{73}, R^{74}, R^{75}$ and $R^{76}$ preferably contains a polymerizable group as a substituent group. The polymerizable group is preferably positioned at the end of $R^{71}, R^{72}, R^{73}, R^{74}, R^{75}$ or $R^{76}$.

Where the polymerizable group is introduced into the melamine polymer, the discotic liquid crystal molecules and the melamine polymer can be polymerized in the optical anisotropic layer.

Examples of $R^{71}, R^{72}, R^{73}, R^{74}, R^{75}$ and $R^{76}$ having a polymerizable group as a substituent group are the same as the groups represented by the formula (Rp).

The polymerizable group may be introduced into a carbonyl moiety ($R^{71}, R^{72}$) or a melamine moiety ($R^{73}, R^{74}, R^{75}, R^{76}$). Where the melamine compound has a polymerizable group, the carbonyl compound preferably is a compound of a simple chemical structure such as formaldehyde. Where the carbonyl compound has a polymerizable group, the melamine compound preferably is a compound of a simple chemical structure such as (not substituted) melamine.

Examples of the carbonyl compounds having polymerizable groups are shown below.

(CO-1 to CO-11)

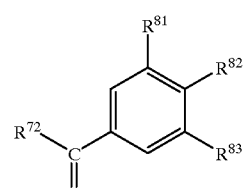

CO-1: $R^{72}$: —H; $R^{82}$: —O—$(CH_2)_9$—O—CO—CH=$CH_2$
CO-2: $R^{72}$: —H; $R^{81}$, $R^{82}$: —O—$(CH_2)_9$—O—CO—CH=$CH_2$
CO-3: $R^{72}$: —H; $R^{82}$: —O—$(CH_2)_4$—CH=CH—$(CH_2)_4$—O—CO—CH=$CH_2$
CO-4: $R^{72}$: —H; $R^{81}$, $R^{82}$: —O—$(CH_2)_4$—CH=CH—$(CH_2)_4$—O—CO—CH=$CH_2$
CO-5: $R^{72}$: —H; $R^{81}$, $R^{83}$: —O—$(CH_2)_9$—O—CO—CH=$CH_2$
CO-6: $R^{72}$: —H; $R^{81}$, $R^{82}$, $R^{83}$: —O—$(CH_2)_9$—O—CO—CH=$CH_2$
CO-7: $R^{72}$: —$CH_3$; $R^{82}$: —O—$(CH_2)_9$—O—CO—CH=$CH_2$
CO-8: $R^{72}$: —$(CH_2)_{11}$—$CH_3$; $R^{82}$: —O—$(CH_2)_4$—O—CO—CH=$CH_2$
CO-9: $R^{72}$: —$(CH_2)_9$—O—CO—CH=$CH_2$; $R^{82}$: —O—$(CH_2)_4$—O—CO—CH=$CH_2$
CO-10: $R^{72}$: —$(CH_2)_9$—O—CO-EpEt; $R^{82}$: —O—$(CH_2)_4$—O—CO—CH=$CH_2$
CO-11: $R^{72}$: —O—$(CH_2)_4$—O—CO—CH=$CH_2$; $R^{81}$, $R^{83}$: —O—$(CH_2)_{12}$—$CH_3$
(Remark)
Not defined R: Hydrogen
EpEt: Epoxyethyl (CO-12 to CO-13)

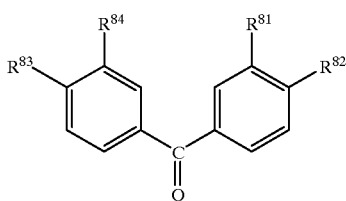

CO-12: $R^{81}$, $R^{82}$, $R^{83}$, $R^{84}$: —O—$(CH_2)_6$—O—CO—CH=$CH_2$
CO-13: $R^{82}$, $R^{83}$: —O—$(CH_2)_9$—O—CO—CH=$CH_2$
(Remark)
Not defined R: Hydrogen (CO-14 to CO-26)

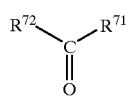

CO-14: $R^{71}$: —$(CH_2)_9$—O—CO—CH=$CH_2$; $R^{72}$: —H
CO-15: $R^{71}$: —$(CH_2)_4$—CH=CH—$(CH_2)_4$—O—CO—CH=$CH_2$; $R^{72}$: —H
CO-16: $R^{71}$: —$(CH_2)_9$—O—CO—CH=$CH_2$; $R^{72}$: —$CH_3$
CO-17: $R^{71}$: —$(CH_2)_4$—CH=CH—$(CH_2)_4$—O—CO—CH=$CH_2$; $R^{72}$: —$CH_3$
CO-18: $R^{71}$: —$(CH_2)_9$—O—CO—CH=$CH_2$; $R^{72}$: —Ph
CO-19: $R^{71}$: —$(CH_2)_4$—CH=CH—$(CH_2)_4$—O—CO—CH=$CH_2$; $R^{72}$: —Ph
CO-20: $R^{71}$: —$(CH_2)_4$—O—CO—CH=$CH_2$; $R^{72}$: —$(CH_2)_9$—O—CO—CH=$CH_2$
CO-21: $R^{71}$: —$(CH_2)_4$—O—CO—CH=$CH_2$; $R^{72}$: —$(CH_2)_{12}$—$CH_3$
CO-22: $R^{71}$: —$(CH_2)_9$—O-EpEt; $R^{72}$: —H
CO-23: $R^{71}$: —$(CH_2)_4$—CH=CH—$(CH_2)_4$—O-EpEt; $R^{72}$: —H
CO-24: $R^{71}$, $R^{72}$: —$(CH_2)_9$—O-EpEt
CO-25: $R^{71}$, $R^{72}$: —$(CH_2)_9$—O—CO—CH=$CH_2$
CO-25: $R^{71}$, $R^{72}$: —$(CH_2)_4$—CH=CH—$(CH_2)_4$—O—CO—CH=$CH_2$ (Remark)
Ph: Phenyl
EpEt: Epoxyethyl Examples of the melamine polymers having polymerizable groups in their melamine moieties are shown below.

(MP-1 to MP-14)

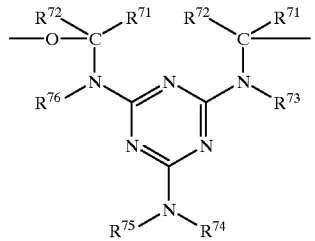

MP-1: $R^{73}$, $R^{75}$, $R^{76}$: —$CH_2$—NH—CO—CH=$CH_2$; $R^{74}$: —$CH_2$—NH—CO—$(CH_2)_8$—$CH_3$
MP-2: $R^{71}$: —$CH_3$; $R^{73}$, $R^{75}$, $R^{76}$: —$CH_2$—NH—CO—CH=$CH_2$; $R^{74}$: —$CH_2$—NH—CO—$(CH_2)_3$—$CH_3$
MP-3: $R^{71}$, $R^{72}$: —$CH_3$; $R^{73}$, $R^{75}$, $R^{76}$: —$CH_2$—NH—CO—CH=$CH_2$; $R^{74}$: —$CH_2$—NH—CO—$(CH_2)_8$—$CH_3$
MP-4: $R^{71}$: —Ph; $R^{73}$, $R^{75}$, $R^{76}$: —$CH_2$—NH—CO—CH=$CH_2$; $R^{74}$: —$CH_2$—NH—CO—$(CH_2)_8$—$CH_3$
MP-5: $R^{73}$, $R^{76}$: —$CH_2$—NH—CO—CH=$CH_2$; $R^{74}$: —$CH_2$—NH—CO—$(CH_2)_7$—CH=CH—$(CH_2)_7$—$CH_3$; $R^{75}$: —$CH_2$—O—$CH_3$
MP-6: $R^{73}$, $R^{76}$: —$CH_2$—NH—CO—CH=$CH_2$; $R^{74}$: —$CH_2$—NH—CO—$(CH_2)_7$—CH=CH—$(CH_2)_7$—$CH_3$; $R^{75}$: —$CH_2$—OH
MP-7: $R^{73}$, $R^{76}$: —$CH_2$—NH—CO—$C_2H_5$; $R^{74}$: —$CH_2$—NH—CO—$(CH_2)_{16}$—$CH_3$; $R^{75}$: —$CH_2$—O—$CH_3$
MP-8: $R^{73}$, $R^{76}$: —$CH_2$—NH—CO—$C_2H_5$; $R^{74}$: —$CH_2$—NH—CO—$(CH_2)_{16}$—$CH_3$; $R^{75}$: —$CH_2$—OH
MP-9: $R^{73}$, $R^{76}$: —$CH_2$—O—CO—CH=$CH_2$; $R^{74}$: —$CH_2$—O—CO—$(CH_2)_7$—CH=CH—$(CH_2)_7$—$CH_3$; $R^{75}$: —$CH_2$—O—$CH_3$
MP-10: $R^{73}$, $R^{76}$: —$CH_2$—O—CO—CH=$CH_2$; $R^{74}$: —$CH_2$—O—CO—$(CH_2)_7$—CH=CH—$(CH_2)_7$—$CH_3$; $R^{75}$: —$CH_2$—OH
MP-11: $R^{73}$, $R^{76}$: —$CH_2$—O—CO—$(CH_2)_7$—CH=CH—$(CH_2)_7$—$CH_3$; $R^{74}$: —$CH_2$—NH—CO—$(CH_2)_7$—CH=CH—$(CH_2)_7$—$CH_3$; $R^{75}$: —$CH_2$—O—$CH_3$
MP-12: $R^{73}$, $R^{76}$: —$CH_2$—O—CO—$(CH_2)_7$—CH=CH—$(CH_2)_7$—$CH_3$; $R^{74}$: —$CH_2$—NH—CO—$(CH_2)_7$—CH=CH—$(CH_2)_7$—$CH_3$; $R^{75}$: —$CH_2$—OH
MP-13: $R^{73}$, $R^{74}$, $R^{75}$, $R^{76}$: —$CH_2$—O—$(CH_2)_{11}$—O—CO—CH=$CH_2$
MP-14: $R^{73}$, $R^{75}$, $R^{76}$: —$CH_2$—NH—CO—CH=$CH_2$; $R^{74}$: —$CH_2$—O—$(CH_2)_{16}$—$CH_3$
(Remark)
Not defined R: Hydrogen
Ph: Phenyl Two or more 1,3,5-triazine compounds (including melamine compounds and melamine polymers) can be used in combination.

The 1,3,5-triazine compound is used in an amount of 1 to 1,000 mg/m², preferably in the range of 2 to 300 mg/m², and more preferably in the range of 3 to 100 mg/m².

The 1,3,5-triazine compound is also preferably used in an amount of 0.01 to 20 wt. % based on the amount of the discotic liquid crystal molecules. The amount is more preferably in the range of 0.1 to 15 wt. %, and most preferably in the range of 0.5 to 10 wt. %.

An optically anisotropic layer can be formed by coating a solution containing the discotic liquid crystal molecule, the above-mentioned additive (a cellulose ester of a lower fatty acid, a fluorine containing surface active agent, a 1,3,5-triazine compound), a polymerization initiator and other optional components on a transparent substrate or an orientation layer.

A solvent for the preparation of the solution preferably is an organic solvent. Examples of the organic solvents include amides (e.g., dimethylformamide), sulfoxides (e.g., dimethylsulfoxide), heterocyclic compounds (e.g., pyridine), hydrocarbons (e.g., benzene, hexane), alkyl halides (e.g., chloroform, dichloromethane), esters (e.g., methyl acetate, butyl acetate), ketones (e.g., acetone, methyl ethyl ketone), ethers (e.g., tetrahydrofuran, 1,2-dimethoxyethane). Alkyl halides and ketones are preferred. Two or more organic solvents can be used in combination.

The solution can be coated according to a conventional coating method such as a curtain coating method, an extrusion coating method, a roll coating method, a spin coating method, a dip coating method, a print coating method, a spray coating method, a slide coating method and a bar coating method. The optically anisotropic layer is preferably coated continuously. The layer can be continuously coated according to the curtain coating method, the roll coating method or the slide coating method.

The aligned discotic liquid crystal molecules are preferably fixed while keeping the alignment. The discotic liquid crystal molecules are fixed preferably by a polymerization reaction. The polymerization reaction can be classified a thermal reaction using a thermal polymerization initiator and a photo reaction using a photo polymerization initiator. A photo polymerization reaction is preferred.

Examples of the photo polymerization initiators include α-carbonyl compounds (described in U.S. Pat. Nos. 2,367,661, 2,367,670), acyloin ethers (described in U.S. Pat. No. 2,448,828), α-hydrocarbon substituted acyloin compounds (described in U.S. Pat. No. 2,722,512), polycyclic quinone compounds (described in U.S. Pat. Nos. 2,951,758, 3,046,127), combinations of triarylimidazoles and p-aminophenyl ketones (described in U.S. Pat. No. 3,549,367), acridine or phenazine compounds (described in Japanese Patent Provisional Publication No. 60(1985)-105667 and U.S. Pat. No. 4,239,850) and oxadiazole compounds (described in U.S. Pat. No. 4,212,970).

The amount of the photo polymerization initiator is preferably in the range of 0.01 to 20 wt. %, and more preferably in the range of 0.5 to 5 wt. % based on the solid content of the coating solution of the layer.

The light irradiation for the photo polymerization is preferably conducted by an ultraviolet ray. The exposure energy is preferably in the range of 20 to 5,000 mJ per $cm^2$, and more preferably in the range of 100 to 800 mJ per $cm^2$. The light irradiation can be conducted while heating the layer to accelerate the photo polymerization reaction.

The optically anisotropic layer has a thickness preferably in the range of 0.5 to 10 $\mu$m, more preferably 0.5 to 5 $\mu$m, and most preferably in the range of 1 to 5 $\mu$m.

[Second optically anisotropic layer]

The optical compensatory sheet may have a second optically anisotropic layer. The second optically anisotropic layer is also preferably formed from discotic liquid crystal molecules. The discotic liquid crystal molecules are preferably so aligned in the second optically anisotropic layer that an average inclined angle between discotic planes of the discotic liquid crystal molecules and a surface of the transparent substrate is not less than 5°. The inclined angle preferably increases or decreases with increase of a distance from the surface of the transparent substrate to the discotic plane of the discotic liquid crystal molecule.

Japanese Patent Provisional Publication No. 7(1995)-287120 discloses an optical compensatory sheet having an optically anisotropic layer in which discotic liquid crystal molecules are aligned as is described above (hybrid alignment). The optical compensatory sheet disclosed in the publication comprises a transparent substrate of planar alignment and the an optically anisotropic layer. The optical compensatory sheet is used to improve a viewing angle of a liquid crystal display of a TN mode. The transparent substrate of planar alignment is also effective in a liquid crystal display of a bend alignment mode or a vertical alignment mode (particularly a bend alignment mode). A polycarbonate film is usually used as the transparent substrate of planar alignment. However, the polycarbonate film has a problem with dimensional stability. Further, a polymer film needs a thickness of about 100 $\mu$m. Furthermore, it is difficult to control the planar alignment of a polymer film.

The effect of the optical compensatory sheet disclosed in Japanese Patent Provisional Publication No. 7(1995)-287120 can also be obtained according the present invention by using the above-described (first) optically anisotropic layer in combination with the second optically anisotropic layer. The (first) optically anisotropic layer can function as a transparent substrate of planar alignment. The dimensional stability of the (first) optically anisotropic layer is superior to the stability of a polymer film. The (first) optically anisotropic layer can be formed as a thin layer (preferably 0.5 to 10 $\mu$m as is described above). Further, the planar alignment of about 1,000 nm can be controlled by some nm by adjusting a coating amount of discotic liquid crystal molecules contained in the optically anisotropic layer.

The details of the second optically anisotropic layer are the same as those of the (first) optically anisotropic layer, except that the additives decreasing the inclined angle of the discotic planes (a cellulose ester of a lower fatty acid, a fluorine containing surface active agent, a 1,3,5-triazine compound) are not used.

There is no specific limitation about the arrangement of the (first) optically anisotropic layer and the second optically anisotropic layer. The second optically anisotropic layer rather than the (first) optically anisotropic layer requires an orientation layer (described below). Accordingly, if only one orientation layer is used, the second optically anisotropic layer rather than the (first) optically anisotropic layer is preferably arranged on the orientation layer.

[Orientation layer]

The orientation layer has a function of aligning discotic liquid crystal molecules.

The orientation layer can be formed by rubbing treatment of an organic compound (preferably a polymer), oblique evaporation of an inorganic compound, formation of a micro groove layer, or stimulation of an organic compound (e.g., ω-tricosanoic acid, dioctadecylmethylammonium chloride, methyl stearate) according to a Langmuir-Blodgett method. Further, the aligning function of the orientation layer can be activated by applying an electric or magnetic field to the layer or irradiating the layer with light.

The orientation layer is preferably formed by rubbing a polymer. The polymer preferably is polyvinyl alcohol. A denatured polyvinyl alcohol having a hydrophobic group is particularly preferred. The discotic compound can uniformly be aligned by introducing the hydrophobic group into polyvinyl alcohol because the hydrophobic group has an affinity with the discotic compound. The hydrophobic group is attached to the side chain or the end of the main chain of polyvinyl alcohol.

The hydrophobic group preferably is an aliphatic group (more preferably an alkyl group or an alkenyl group) having 6 or more carbon atoms or an aromatic group.

The rubbing treatment can be conducted by rubbing the layer with a paper or cloth several times along a certain direction.

After aligning discotic liquid crystal compounds of the optically anisotropic layer by the orientation layer, the alignment of the discotic compounds can be kept even if the orientation layer is removed. Therefore, the orientation layer is not essential in a prepared optical compensatory sheet, while the orientation layer is essential in the preparation of the optical compensatory sheet.

If the (first) optically anisotropic layer does not require a small (0° to 50) inclined angle, the rubbing treatment or the orientation layer itself is not necessary. Even if the orientation layer is not necessary, an adhesive orientation layer may be provided between a transparent substrate and the (first) optically anisotropic layer. The adhesive orientation layer (described in Japanese Patent Provisional Publication No. 9(1997)-152509) has a function of forming a chemical bond with discotic liquid crystal molecule to improve the adhesion. If the orientation layer is used to improve the adhesion, the rubbing treatment is not necessary.

[Transparent substrate]

A transparent substrate is made of a polymer film or a glass plate, and preferably is a polymer film. The transparent substrate means that light transmittance is not less than 80%.

Examples of the polymers include polycarbonate, polyarylate, polysulfone, polyethersulfone, cellulose ester (e.g., diacetyl cellulose, triacetyl cellulose) and a cyclo-olefin polymer. Cyclo-olefin polymer and cellulose ester are preferred. The cyclo-olefin polymer is commercially available (e.g., ZEONEX, Japan Zeon Co., Ltd.; ZEONOA, Japan Zeon Co., Ltd.; and ARTON, JSR Co., Ltd.). The polymer film is formed preferably according to a solvent casting method.

The optical characteristics of the transparent substrate can be controlled by adjusting stretching (preferably biaxially stretching) conditions or shrinkage ratios in length and width.

The transparent substrate preferably is optically uniaxial or optically biaxial. In the case that the transparent substrate is optically uniaxial, the substrate can be optically positive (wherein the refractive index along the optical axis is larger than the refractive index along the direction perpendicular to the optical axis) or optically negative (wherein the refractive index along the optical axis is smaller than the refractive index along the direction perpendicular to the optical axis). In the case that the transparent substrate is optically biaxial, the refractive indices (nx, ny, nz) of the substrate are different from each other (nx≠ny≠nz).

The optically uniaxial or biaxial substrate has a Re retardation value preferably in the range of 10 to 1,000 nm, more preferably in the range of 15 to 300 nm, and most preferably in the range of 20 to 200 nm. The Re retardation value is defined by the following formula:

$$Re=(nx-ny)\times d$$

in which each of nx and ny is a refractive index in plane of the transparent substrate; and d is the thickness of the transparent substrate.

The optically uniaxial or biaxial substrate has a Rth retardation value preferably in the range of 10 to 1,000 nm, more preferably in the range of 15 to 300 nm, and most preferably in the range of 20 to 200 nm. The Rth retardation value is defined by the following formula in the range of 10 to 1,000 nm:

$$Rth=[\{(nx+ny)/2\}-nz]\times d$$

in which each of nx and ny is a refractive index in plane of the transparent substrate; nz is a refractive index along the thickness direction of the transparent substrate; and d is the thickness of the transparent substrate.

The optically uniaxial or biaxial (optically anisotropic) substrate is usually made of a synthetic polymer (e.g., polycarbonate, polysulfone, polyethersulfone, polyacrylate, polymethacrylate, norbornene resin) film. Further, an optically anisotropic cellulose ester film can be prepared by (1) using a retardation increasing agent, (2) lowering an acetic acid content, or (3) preparing the film according to a cooling dissolution method, as is described in European Patent No. 0911656A2.

The optically anisotropic polymer film is also preferably formed according to a solvent casting method.

The polymer film is preferably stretched to obtain an optically uniaxial or biaxial substrate.

An optically uniaxial substrate can be prepared by a conventional uniaxially or biaxially stretching process.

An optically biaxial substrate is preferably prepared by an unbalanced biaxially stretching process. According to the unbalanced biaxially stretching process, a polymer film is stretched along a certain direction at a certain percent of stretch (for example 3 to 100%, preferably 5 to 30%), and then stretched along a perpendicular direction at a larger percent of stretch (for example 6 to 200%, preferably 10 to 90%). The polymer film can be stretched along the two directions simultaneously.

The stretching direction (the direction of the largest percent of stretch in the case of the unbalanced biaxially stretching process) is preferably parallel to the slow axis of the film after the stretching process. The angle between the stretching direction and the slow axis is preferably less than 10°, more preferably less than 5, and most preferably less than 3°.

The optically uniaxial or biaxial substrate can be laminated with an optically isotropic substrate (e.g., cellulose acetate film).

In the case that the optically uniaxial or biaxial substrate is used in the optically compensatory sheet, the optical compensatory sheet has a Re retardation value preferably in the range of 20 to 200 nm, more preferably in the range of 20 to 100 nm, and most preferably in the range of 20 to 70 nm. The Re retardation value is defined by the following formula:

$$Re=(nx-ny)\times d$$

in which each of nx and ny is a refractive index in plane of the optical compensatory sheet; and d is the thickness of the optical compensatory sheet.

In the case that the optically uniaxial or biaxial substrate is used in the optically compensatory sheet, the optical compensatory sheet has a Rth retardation value preferably in the range of 70 to 500 nm, more preferably in the range of 70 to 300 nm, and most preferably in the range of 70 to 200 nm. The Rth retardation value is defined by the following formula:

$$Rth=[\{(nx+ny)/2\}-nz]\times d$$

in which each of nx and ny is a refractive index in plane of the optical compensatory sheet; nz is a refractive index along the thickness direction of the optical compensatory sheet; and d is the thickness of the optical compensatory sheet.

The transparent substrate has a thickness preferably in the range of 10 to 500 μm, more preferably in the range of 20 to 500 μm, and most preferably in the range of 50 to 200 μm.

The transparent substrate can be subjected to a surface treatment (e.g., glow discharge treatment, corona discharge treatment, ultraviolet (UV) treatment, flame treatment, acid treatment and alkali treatment) to improve adhesion to a layer formed on the substrate (e.g., adhesive layer, orientation layer, optically anisotropic layer). A glow discharge treatment, a corona discharge treatment or an alkali treatment is preferred. Two or more surface treatments can be used in combination.

An adhesive layer (undercoating layer) can be provided on the transparent substrate. The adhesive layer is preferably formed by coating a hydrophilic polymer (e.g., gelatin) on the transparent substrate. The adhesive layer has a thickness preferably in the range of 0.1 to 2 μm, and more preferably in the range of 0.2 to 1 μm.

[Liquid crystal cell]

The optical compensatory sheet of the present invention is particularly effective in a liquid crystal display of a vertical alignment mode or a bend alignment mode.

In a liquid crystal cell of a vertical alignment mode, rod-like liquid crystal molecules are essentially vertically aligned while not applying voltage to the cell, and are essentially horizontally aligned while applying voltage to the cell, as is shown in FIG. 1.

The liquid crystal cells of the vertical alignment mode include not only (1) a conventional VA cell shown in FIG. 1, but also (2) a multi domain liquid crystal cell of VA (MVA) mode improved in the viewing angle (described in SID97, Digest of tech. Papers, 28(1997) 845), (3) a cell of n-ASM mode in which rod-like liquid crystal molecules are essentially vertically aligned while not applying voltage to the cell, and are subjected to twisted multi domain alignment while applying voltage to the cell (described in Japan Liquid Crystal Forum, Digest of Papers, 58–59(1998)), and (4) a cell of a SURVAIVAL mode (announced at LCD International 98).

In a liquid crystal cell of a bend alignment mode, rod-like liquid crystal molecules are essentially symmetrically aligned, as is shown in FIG. 2.

[Liquid crystal display]

A liquid crystal display comprises a liquid crystal cell, a pair of optical compensatory sheets arranged on both sides of the cell, or one optical compensatory sheet arranged on one side of the cell, and a pair of polarizing elements arranged on the liquid crystal cell or the optical compensatory sheet.

The liquid crystal displays include a direct looking type, a projection type and a modulation type. The present invention is also effective in a liquid crystal display having an active matrix such as TFT, MIM having three or two terminals.

EXAMPLE 1

A triacetyl cellulose film (thickness: 100 μm, size: 270 mm×100 mm, Fuji Tac, Fuji Photo Film Co., Ltd.) was used as a transparent substrate.

An alkyl denatured polyvinyl alcohol (MP-203, Kuraray Co., Ltd.) was coated on the transparent substrate, and dried to form an orientation layer (thickness: 0.5 μm) The surface of the orientation layer was subjected to a rubbing treatment.

The following coating solution was coated on the orientation layer by using a wire bar coater.

| Coating solution for optically anisotropic layer | |
|---|---|
| Cellulose acetate butyrate (acetic acid content: 3.0%, butyric acid content: 50.0%, CAB-381-0.5, Eastman Chemical) | 0.3 weight part |
| The following discotic liquid crystal compound (1) | 100 weight parts |
| A photopolymerization initiator (Irgacure 907, Ciba-Geigy) | 0.2 weight part |
| Methyl ethyl ketone | 400 weight parts |

Discotic liquid crystal compound (1)

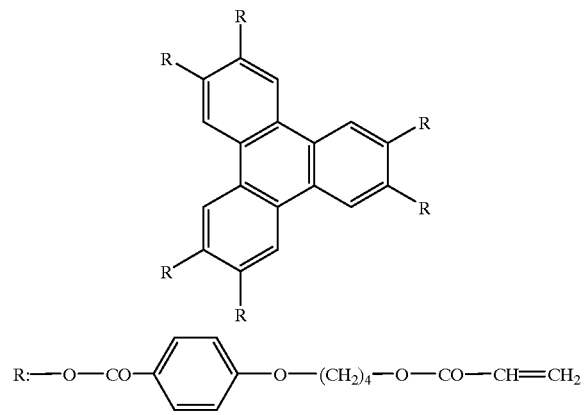

The coated layer was heated at 106° C. to align the discotic liquid crystal compound. The layer was irradiated with an ultraviolet ray of 2 J to polymerize the liquid crystal compound and to fix the alignment. Thus an optical compensatory sheet was prepared.

COMPARISON EXAMPLE 1

An optical compensatory sheet was prepared in the same manner as in Example 1, except that 0.3 weight part of polyvinyl butyral (#3000-1, Denki Kagaku Kogyo K.K.) was used in place of cellulose acetate butyrate (CAB-381-0.5).

COMPARISON EXAMPLE 2

An optical compensatory sheet was prepared in the same manner as in Example 1, except that cellulose acetate butyrate (CAB-381-0.5) was not used.

COMPARISON EXAMPLE 3

An optical compensatory sheet was prepared in the same manner as in Example 1, except that the amount of cellulose acetate butyrate (CAB-381-0.5) was 3.0 weight parts.

EXAMPLE 2

An optical compensatory sheet was prepared in the same manner as in Example 1, except that 0.3 weight part of cellulose acetate butyrate (acetic acid content: 17.5%, butyric acid content: 32.5%, CAB-321-0.1, Eastman Chemical) was used in place of cellulose acetate butyrate (CAB-381-0.5), and the heating temperature for the layer was 123° C.

COMPARISON EXAMPLE 4

An optical compensatory sheet was prepared in the same manner as in Example 2, except that cellulose acetate butyrate (CAB-321-0.1) was not used.

EXAMPLE 3

An optical compensatory sheet was prepared in the same manner as in Example 1, except that 0.3 weight part of cellulose acetate butyrate (acetic acid content: 2.0%, butyric acid content: 52.0%, CAB-553-0.4, Eastman Chemical) was used in place of cellulose acetate butyrate (CAB-381-0.5), the heating temperature for the layer was 112° C., and the exposure of the ultraviolet ray was 1J.

COMPARISON EXAMPLE 5

An optical compensatory sheet was prepared in the same manner as in Example 3, except that cellulose acetate butyrate (CAB-553-0.4) was not used.

EXAMPLE 4

An optical compensatory sheet was prepared in the same manner as in Example 1, except that 0.5 weight part of cellulose acetate butyrate (acetic acid content: 2.5%, butyric acid content: 45.0%, CAB-482-0.5, Eastman Chemical) was used in place of cellulose acetate butyrate (CAB-381-0.5), the heating temperature for the layer was 145° C., and the exposure of the ultraviolet ray was 3J.

COMPARISON EXAMPLE 6

An optical compensatory sheet was prepared in the same manner as in Example 4, except that 0.5 weight part of polyvinyl butyral (#3000-1, Denki Kagaku Kogyo K.K.) was used in place of cellulose acetate butyrate (CAB-482-0.5).

COMPARISON EXAMPLE 7

An optical compensatory sheet was prepared in the same manner as in Example 4, except that cellulose acetate butyrate (CAB-482-0.5) was not used.

EXAMPLE 5

An optical compensatory sheet was prepared in the same manner as in Example 1, except that 100 weight parts of the following discotic liquid crystal compound (2) were used in place of the discotic liquid crystal compound (1), and the heating temperature for the layer was 85° C.
Discotic liquid crystal compound (2)

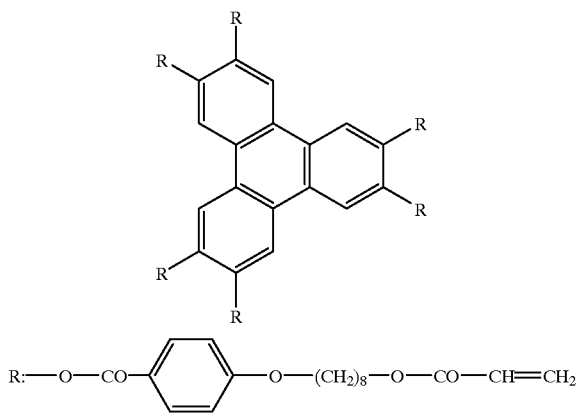

COMPARISON EXAMPLE 8

An optical compensatory sheet was prepared in the same manner as in Example 5, except that cellulose acetate butyrate (CAB-381-0.5) was not used.

EXAMPLE 6

An optical compensatory sheet was prepared in the same manner as in Example 1, except that 100 weight parts of the following discotic liquid crystal compound (3) were used in place of the discotic liquid crystal compound (1), the heating temperature for the layer was 124° C., and the exposure of the ultraviolet ray was 1J.
Discotic liquid crystal compound (3)

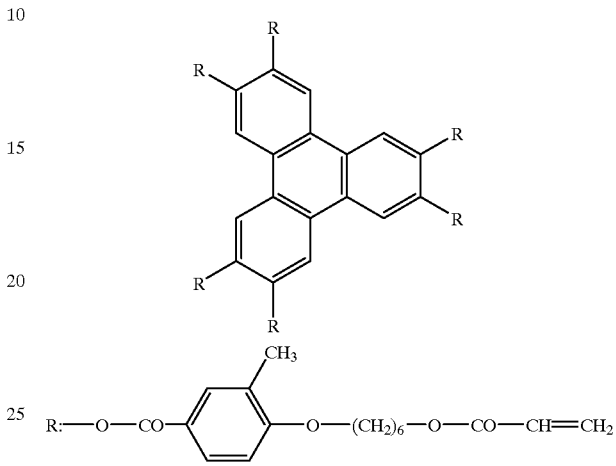

COMPARISON EXAMPLE 9

An optical compensatory sheet was prepared in the same manner as in Example 6, except that cellulose acetate butyrate (CAB-381-0.5) was not used.

EXAMPLE 7

An optical compensatory sheet was prepared in the same manner as in Example 1, except that 100 weight parts of the following discotic liquid crystal compound (4) were used in place of the discotic liquid crystal compound (1), the heating temperature for the layer was 90° C., and the exposure of the ultraviolet ray was 5J.
Discotic liquid crystal compound (4).

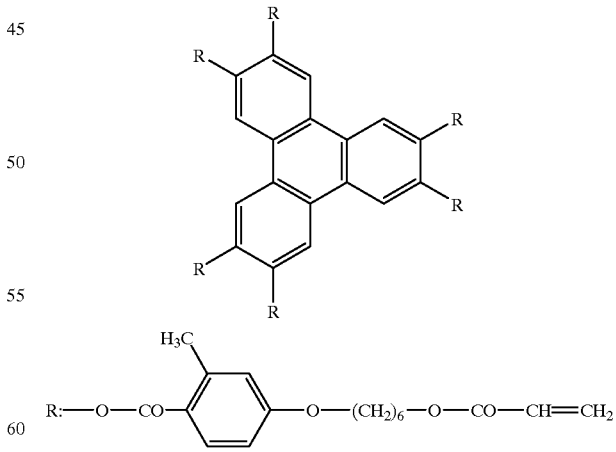

COMPARISON EXAMPLE 10

An optical compensatory sheet was prepared in the same manner as in Example 7, except that cellulose acetate butyrate (CAB-381-0.5) was not used.

Evaluation of Optical Compensatory Sheets

The optical characteristics of the optical compensatory sheets were measured at the wavelength of 632.8 nm by using an ellipsometer (AEP-100, Shimazu Seisakusho, Ltd.). The results are set forth in Table 1.

TABLE 1

| Sample | Optically anisotropic layer | | | | | Optical char. | |
|---|---|---|---|---|---|---|---|
| No. | DLC | Poly. | Amount | Temp. | Expo. | Angle | Δnd |
| Ex. 1 | (1) | 381 | 0.3 | 106° C. | 2 J | 2° | −148 nm |
| Comp. 1 | (1) | PVB | 0.3 | 106° C. | 2 J | 27° | −152 nm |
| Comp. 2 | (1) | None | | 106° C. | 2 J | 33° | −153 nm |
| Comp. 3 | (1) | 381 | 3.0 | 106° C. | 2 J | Not aligned | |
| Ex. 2 | (1) | 321 | 0.3 | 123° C. | 2 J | 2° | −151 nm |
| Comp. 4 | (1) | None | | 123° C. | 2 J | 35° | −146 nm |
| Ex. 3 | (1) | 553 | 0.3 | 112° C. | 1 J | 1° | −153 nm |
| Comp. 5 | (1) | None | | 112° C. | 1 J | 28° | −147 nm |
| Ex. 4 | (1) | 482 | 0.5 | 141° C. | 3 J | 1° | −150 nm |
| Comp. 6 | (1) | PVB | 0.5 | 141° C. | 3 J | 31° | −151 nm |
| Comp. 7 | (1) | None | | 141° C. | 3 J | 36° | −145 nm |
| Ex. 5 | (2) | 381 | 0.3 | 85° C. | 2 J | 1° | −149 nm |
| Comp. 8 | (2) | None | | 85° C. | 2 J | 30° | −147 nm |
| Ex. 6 | (3) | 381 | 0.3 | 124° C. | 1 J | 2° | −161 nm |
| Comp. 9 | (3) | None | | 124° C. | 1 J | 25° | −163 nm |
| Ex. 7 | (4) | 381 | 0.3 | 90° C. | 5 J | 0° | −151 nm |
| Comp. 10 | (4) | None | | 90° C. | 5 J | 28° | −160 nm |

(Remark)
381: Cellulose acetate butyrate (CAB-381-0.5)
PVB: Polyvinyl butyral
321: Cellulose acetate butyrate (CAB-321-0.1)
553: Cellulose acetate butyrate (CAB-553-0.4)
482: Cellulose acetate butyrate (CAB-482-0.5)
Angle: Inclined angle of an optical axis (a direction having the minimum retardation value) corresponding to average inclined angle between discotic planes and a surface of the transparent substrate
Δnd: Rth retardation value defined by the following formula: Rth = [{(n1 + n2)/2} − n3]× d in which each of n1, n2 and n3 is the principal refractive index of the optically anisotropic layer, n3 is the minimum index, and d is the thickness of the optically anisotropic layer.

EXAMPLE 8

A triacetyl cellulose film (thickness: 100 μm, size: 270 mm×100 mm, Fuji Tac, Fuji Photo Film Co., Ltd.) was used as a transparent substrate.

An aqueous solution of an alkyl denatured polyvinyl alcohol (MP-203, Kuraray Co., Ltd.) was coated on the transparent substrate by using a bar coater, and dried to form an orientation layer (thickness: 0.65 μm). The surface of the orientation layer was subjected to a rubbing treatment.

The following coating solution was coated on the orientation layer by using a wire bar coater, and dried at the room temperature. The thickness of the formed layer was 1.7 μm.

Coating Solution for Optically Anisotropic Layer

| | |
|---|---|
| Fluorine containing surface active agent (FS-3) | 3 weight parts |
| The discotic liquid crystal compound (1) used in Example 1 | 100 weight parts |
| A photopolymerization initiator (Irgacure 907, Ciba-Geigy) | 0.2 weight part |
| Methyl ethyl ketone | 400 weight parts |

(FS-3)

$$\text{n-}C_8F_{17}\text{—}SO_2\text{—}\underset{\underset{C_3H_7}{|}}{N}\text{—}(CH_2CH_2O)_{16}\text{—}H$$

The coated layer was heated at 115° C. to align the discotic liquid crystal compound. The layer was irradiated with an ultraviolet ray of 600 mJ per cm² to polymerize the liquid crystal compound and to fix the alignment. Thus an optical compensatory sheet was prepared.

EXAMPLES 9 TO 19 AND COMPARISON EXAMPLES 11 TO 15

Optical compensatory sheets were prepared in the same manner as in Example 8, except that the kind or amount of the fluorine containing surface active agent was changed as is shown in Table 2.

Evaluation of Optical Compensatory Sheets

The optical characteristics of the optical compensatory sheets were measured at the wavelength of 632.8 nm by using an ellipsometer (AEP-100, Shimazu Seisakusho, Ltd.). The results are set forth in Table 2.

TABLE 2

| Sample | Surface active agent | | Optical characteristic | |
|---|---|---|---|---|
| No. | Kind | Amount | Angle | Δnd |
| Example 8 | FS-3 | 3 parts | 0.8° | −143 nm |
| Example 9 | FS-3 | 5 parts | 1.9° | −139 nm |
| Example 10 | FS-3 | 10 parts | 2.2° | −130 nm |
| Example 11 | FS-3 | 30 parts | 2.8° | −129 nm |
| Example 12 | FS-7 | 5 parts | 0.9° | −125 nm |
| Example 13 | FS-19 | 5 parts | 2.1° | −137 nm |
| Example 14 | FS-22 | 5 parts | 1.5° | −140 nm |
| Example 15 | FS-26 | 5 parts | 1.2° | −151 nm |
| Example 16 | FS-37 | 5 parts | 1.0° | −125 nm |
| Example 17 | FS-57 | 5 parts | 0.5° | −130 nm |
| Example 18 | FS-67 | 5 parts | 0.1° | −141 nm |
| Example 19 | FS-70 | 5 parts | 2.7° | −148 nm |
| Comp. 11 | None | | 25° | −125 nm |
| Comp. 12 | FS-3 | 1 part | 51° | −131 nm |
| Comp. 13 | FS-3 | 35 parts | Not crystalline phase | |
| Comp. 14 | FS-7 | 1 part | 47° | −135 nm |
| Comp. 15 | FS-7 | 35 parts | Not crystalline phase | |

(Remark)
Angle: Inclined angle of an optical axis (a direction having the minimum retardation value) corresponding to average inclined angle between discotic planes and a surface of the transparent substrate
Δnd: Rth retardation value
(FS-7)

$$\text{n-}C_8F_{17}\text{—}SO_2\text{—}\underset{\underset{C_2H_5}{|}}{N}\text{—}(CH_2CH_2O)_{21}\text{—}H$$

(FS-19)

$$H\text{—}(CF_2)_8\text{—}CO\text{—}\underset{\underset{C_3H_7}{|}}{N}\text{—}(CH_2CH_2O)_{19}\text{—}H$$

(FS-22)
H—(CF$_2$)$_{10}$—CH$_2$—O—(CH$_2$CH$_2$O)$_{15}$H

TABLE 2-continued

| Sample No. | Surface active agent | | Optical characteristic | |
|---|---|---|---|---|
| | Kind | Amount | Angle | Δnd |

(FS-26)

n-C$_9$F$_{19}$—⌬—O—(CH$_2$CH$_2$O)$_{17}$—H (FS-37)

F$_5$—⌬—CO—O—(CH$_2$CH$_2$O)$_{13}$—H (perfluorinated phenyl)

(FS-57)
Cl—(CF$_2$—CFCl)$_3$—CF$_2$—COOH (FS-67)
n-C$_8$F$_{17}$—SO$_2$—N(C$_3$H$_7$)—(CH$_2$CH$_2$O)$_{15}$—CH$_2$CH$_2$CH$_2$—SO$_3$Na (FS-70)
n-C$_8$F$_{17}$—SO$_2$—NH—CH$_2$CH$_2$CH$_2$—$\overset{\oplus}{N}$(CH$_3$)$_3$·I$^{\ominus}$

EXAMPLE 20

A glass plate (thickness: 0.85 mm) was used as a transparent substrate.

An aqueous solution of polyvinyl alcohol denatured with methacryloyloxyethyl isocyanate (Polymer No. 1 of Japanese Patent Provisional Publication No. 8(1996)-48197) was coated on the transparent substrate by using a bar coater, and dried to form an orientation layer (thickness: 0.63 μm). The surface of the orientation layer was subjected to a rubbing treatment.

The following coating solution was coated on the orientation layer by using a spin coater of 1,000 rpm, and dried at the room temperature. The thickness of the formed layer was 1.9 μm.

| Coating solution for optically anisotropic layer | |
|---|---|
| Fluorine containing surface active agent (FS-3) | 3 weight parts |
| The following discotic liquid crystal compound (5) | 100 weight parts |
| A photopolymerization initiator (Irgacure 907, Ciba-Geigy) | 0.2 weight part |
| Methyl ethyl ketone | 400 weight parts |

Discotic liquid crystal compound (5)

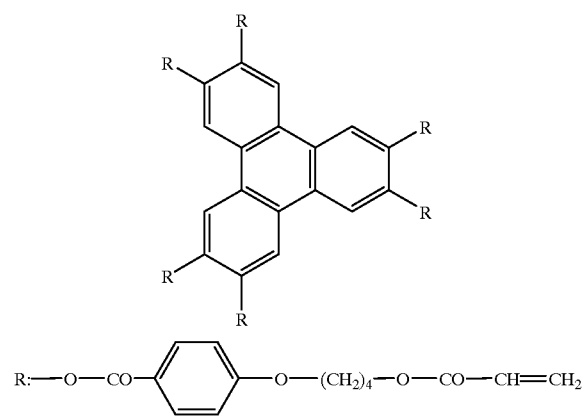

R:—O—CO—⌬—O—(CH$_2$)$_4$—O—CO—CH=CH$_2$

The coated layer was heated at 180° C. to align the discotic liquid crystal compound. The layer was irradiated with an ultraviolet ray of 600 mJ per cm$^2$ to polymerize the liquid crystal compound and to fix the alignment. Thus an optical compensatory sheet was prepared.

EXAMPLES 21 TO 31 AND COMPARISON EXAMPLES 16 TO 18

Optical compensatory sheets were prepared in the same manner as in Example 20, except that the kind of the discotic liquid crystal compound, the kind or amount of the fluorine containing surface active agent or the heating temperature for the layer was changed as is shown in Table 3.

Evaluation of Optical Compensatory Sheets

The optical characteristics of the optical compensatory sheets were measured at the wavelength of 632.8 nm by using an ellipsometer (AEP-100, Shimazu Seisakusho, Ltd.). The results are set forth in Table 3.

TABLE 3

| Sample No. | Optically anisotropic layer | | | | Optical char. | |
|---|---|---|---|---|---|---|
| | DLC | Agent | Amount | Temp. | Angle | Δnd |
| Ex. 20 | (5) | FS-3 | 4 | 180° C. | 2.3° | −133 nm |
| Ex. 21 | (5) | FS-3 | 10 | 180° C. | 2.0° | −125 nm |
| Ex. 22 | (5) | FS-3 | 20 | 180° C. | 1.5° | −110 nm |
| Comp. 16 | (5) | None | | 180° C. | 42° | −135 nm |
| Comp. 17 | (5) | FS-3 | 35 | 180° C. | Not crystal | |
| Ex. 23 | (5) | FS-6 | 4 | 180° C. | 1.8° | −127 nm |
| Ex. 24 | (5) | FS-42 | 5 | 180° C. | 1.0° | −122 nm |
| Ex. 25 | (5) | FS-50 | 10 | 180° C. | 1.1° | −125 nm |
| Ex. 26 | (5) | FS-52 | 7 | 180° C. | 0.8° | −130 nm |
| Ex. 27 | (6) | FS-3 | 5 | 80° C. | 0.7° | −218 nm |
| Ex. 28 | (6) | FS-26 | 10 | 80° C. | 1.9° | −230 nm |
| Ex. 29 | (6) | FS-48 | 7 | 80° C. | 2.9° | −225 nm |
| Ex. 30 | (7) | FS-3 | 5 | 175° C. | 3.1° | −144 nm |
| Ex. 31 | (7) | FS-3 | 10 | 175° C. | 2.8° | −150 nm |
| Comp. 18 | (7) | None | | 175° C. | 21° | −145 nm |

(Remark)
Angle: Inclined angle of an optical axis (a direction having the minimum retardation value) corresponding to average inclined angle between discotic planes and a surface of the transparent substrate
Δnd: Rth retardation value Discotic liquid crystal compound (6)

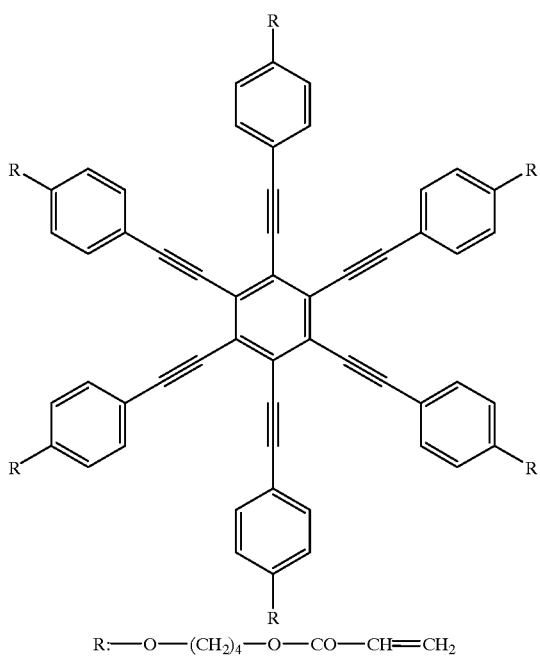

R: —O—(CH$_2$)$_4$—O—CO—CH=CH$_2$

Discotic liquid crystal compound (7)

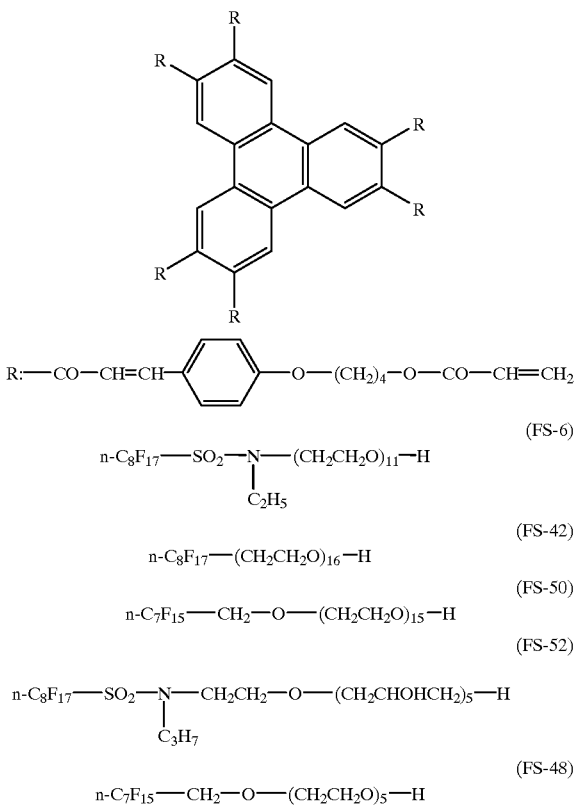

R: —CO—CH=CH—⟨⟩—O—(CH$_2$)$_4$—O—CO—CH=CH$_2$ (FS-6) n-C$_8$F$_{17}$—SO$_2$—N(C$_2$H$_5$)—(CH$_2$CH$_2$O)$_{11}$—H (FS-42) n-C$_8$F$_{17}$—(CH$_2$CH$_2$O)$_{16}$—H (FS-50) n-C$_7$F$_{15}$—CH$_2$—O—(CH$_2$CH$_2$O)$_{15}$—H (FS-52) n-C$_8$F$_{17}$—SO$_2$—N(C$_3$H$_7$)—CH$_2$CH$_2$—O—(CH$_2$CHOHCH$_2$)$_5$—H (FS-48) n-C$_7$F$_{15}$—CH$_2$—O—(CH$_2$CH$_2$O)$_5$—H

EXAMPLE 32

A triacetyl cellulose film (thickness: 100 μm, size: 270 mm×100 mm, Fuji Tac, Fuji Photo Film Co., Ltd.) was used as a transparent substrate.

An alkyl denatured polyvinyl alcohol (MP-203, Kuraray Co., Ltd.) was coated on the transparent substrate, and dried (without conducting a rubbing treatment) to form an orientation layer (thickness: 0.5 μm).

The coating solution used in Example 1 was coated on the orientation layer by using a wire bar coater.

The coated layer was heated at 106° C. to align the discotic liquid crystal compound. The layer was irradiated with an ultraviolet ray of 2 J to polymerize the liquid crystal compound and to fix the alignment. Thus an optical compensatory sheet was prepared.

EXAMPLE 33

A triacetyl cellulose film (thickness: 100 μm, size: 270 mm×100 mm, Fuji Tac, Fuji Photo Film Co., Ltd.) was used as a transparent substrate.

The coating solution used in Example 1 was coated on the transparent substrate by using a wire bar coater.

The coated layer was heated at 106° C. to align the discotic liquid crystal compound. The layer was irradiated with an ultraviolet ray of 2 J to polymerize the liquid crystal compound and to fix the alignment. Thus an optical compensatory sheet was prepared.

EXAMPLE 34

A triacetyl cellulose film (thickness: 100 μm, size: 270 mm×100 mm, Fuji Tac, Fuji Photo Film Co., Ltd.) was used as a transparent substrate.

An aqueous solution of an alkyl denatured polyvinyl alcohol (MP-203, Kuraray Co., Ltd.) was coated on the transparent substrate by using a bar coater, and dried (without conducting a rubbing treatment) to form an orientation layer (thickness: 0.65 μm).

The coating solution used in Example 8 was coated on the orientation layer by using a wire bar coater, and dried at the room temperature. The thickness of the formed layer was 1.7 μm.

The coated layer was heated at 115° C. to align the discotic liquid crystal compound. The layer was irradiated with an ultraviolet ray of 600 mJ per cm$^2$ to polymerize the liquid crystal compound and to fix the alignment. Thus an optical compensatory sheet was prepared.

EXAMPLE 35

A triacetyl cellulose film (thickness: 100 μm, size: 270 mm×100 mm, Fuji Tac, Fuji Photo Film Co., Ltd.) was used as a transparent substrate.

The coating solution used in Example 8 was coated on the transparent substrate by using a wire bar coater, and dried at the room temperature. The thickness of the formed layer was 1.7 μm.

The coated layer was heated at 115° C. to align the discotic liquid crystal compound. The layer was irradiated with an ultraviolet ray of 600 mJ per cm$^2$ to polymerize the liquid crystal compound and to fix the alignment. Thus an optical compensatory sheet was prepared.

EXAMPLE 36

A glass plate (thickness: 0.85 mm) was used as a transparent substrate.

An aqueous solution of polyvinyl alcohol denatured with methacryloyloxyethyl isocyanate (Polymer No. 1 of Japanese Patent Provisional Publication No. 8(1996)-48197) was coated on the transparent substrate by using a bar coater, and dried (without conducting a rubbing treatment) to form an orientation layer (thickness: 0.63 μm).

The coating solution used in Example 20 was coated on the orientation layer by using a spin coater of 1,000 rpm, and dried at the room temperature. The thickness of the formed layer was 1.9 μm.

The coated layer was heated at 180° C. to align the discotic liquid crystal compound. The layer was irradiated with an ultraviolet ray of 600 mJ per cm² to polymerize the liquid crystal compound and to fix the alignment. Thus an optical compensatory sheet was prepared.

EXAMPLE 37

A glass plate (thickness: 0.85 mm) was used as a transparent substrate.

The coating solution used in Example 20 was coated on the transparent substrate by using a spin coater of 1,000 rpm, and dried at the room temperature. The thickness of the formed layer was 1.9 μm.

The coated layer was heated at 180° C. to align the discotic liquid crystal compound. The layer was irradiated with an ultraviolet ray of 600 mJ per cm² to polymerize the liquid crystal compound and to fix the alignment. Thus an optical compensatory sheet was prepared.

Evaluation of Optical Compensatory Sheets

The optical characteristics of the optical compensatory sheets were measured at the wavelength of 632.8 nm by using an ellipsometer (AEP-100, Shimazu Seisakusho, Ltd.). The results are set forth in Table 4.

TABLE 4

| Sample | Optically anisotropic layer | | | | | Orien. layer | Angle | $\Delta$nd |
|---|---|---|---|---|---|---|---|---|
| | DLC | Agent | Amount | Temp. | Expo. | | | |
| Ex. 32 | (1) | 381 | 0.3 | 106° C. | 2 J | NR | 2° | −133 |
| Ex. 33 | (1) | 381 | 0.3 | 106° C. | 2 J | None | 1° | −125 |
| Ex. 34 | (1) | FS-3 | 3 | 115° C. | 0.6 J | NR | 2° | −110 |
| Ex. 35 | (1) | FS-3 | 3 | 115° C. | 0.6 J | None | 2° | −127 |
| Ex. 36 | (5) | FS-3 | 10 | 180° C. | 0.6 J | NR | 1° | −122 |
| Ex. 37 | (5) | FS-3 | 10 | 180° C. | 0.6 J | None | 0° | −125 |

(Remark)
381: Cellulose acetate butyrate (CAB-381-0.5)
NR: Not subjected to rubbing treatment
Angle: Inclined angle of an optical axis (a direction having the minimum retardation value) corresponding to average inclined angle between discotic planes and a surface of the transparent substrate
$\Delta$nd: Rth retardation value

COMPARISON EXAMPLE 19

A glass plate (thickness: 0.85 mm) was used as a transparent substrate.

An aqueous solution of polyvinyl alcohol denatured with methacryloyloxyethyl isocyanate (Polymer No. 1 of Japanese Patent Provisional Publication No. 8(1996)-48197) was coated on the transparent substrate by using a bar coater, and dried (without conducting a rubbing treatment) to form an orientation layer (thickness: 0.54 μm). The surface of the orientation layer was subjected to a rubbing treatment.

The following coating solution was coated on the orientation layer by using a spin coater of 1,000 rpm, and dried at the room temperature. The thickness of the formed layer was 1.34 μm.

| Coating solution for (second) optically anistropic layer | |
|---|---|
| The discotic liquid crystal compound (1) used in Example 1 | 100 weight parts |
| A photopolymerization initiator (Irgacure 907, Ciba-Geigy) | 0.2 weight part |
| Methyl ethyl ketone | 400 weight parts |

The coated layer was heated at 135° C. to align the discotic liquid crystal compound. The layer was irradiated with an ultraviolet ray of 600 mJ per cm² to polymerize the liquid crystal compound and to fix the alignment. Thus an optical compensatory sheet was prepared.

EXAMPLE 38

A second optically anisotropic layer was formed in the same manner as in Comparison Example 19.

The following coating solution was coated on the second optically anisotropic layer by using a bar coater, and dried at the room temperature.

| Coating solution for (first) optically anisotropic layer | |
|---|---|
| Cellulose acetate butyrate (acetic acid content: 3.0%, butyric acid content: 50.0%, CAB-381-0.5, Eastman Chemical) | 0.3 weight part |
| The discotic liquid crystal compound (1) used in Example 1 | 100 weight parts |
| A photopolymerization initiator (Irgacure 907, Ciba-Geigy) | 0.2 weight part |
| Methyl ethyl ketone | 400 weight parts |

The coated layer was heated at 106° C. to align the discotic liquid crystal compound. The layer was irradiated with an ultraviolet ray of 2 J per cm² to polymerize the liquid crystal compound and to fix the alignment. Thus an optical compensatory sheet was prepared.

Evaluation of Optical Compensatory Sheets

Two optical compensatory sheets prepared in Comparison Example 19 or Example 38 were attached to each side of a liquid crystal cell of a bend alignment mode. The product of the difference in-refractive index (between ordinary ray and extraordinary ray) and the gap size of the cell was 350 nm. A voltage (0 to 5 V) of a square wave (40 Hz) was applied to the liquid crystal cell, and the angle dependency of the transmittance (T) was measured.

The angle between the normal line of the liquid crystal cell surface and the direction showing a contrast ratio ($T_{1V}/T_{5V}$) of 10 was determined as the viewing angle. The upward, downward, leftward and rightward viewing angles were measured. The results are set forth in Table 5.

TABLE 5

| Sample No. | Optically anisotropic layer | Viewing angle | | | |
|---|---|---|---|---|---|
| | | Up | Down | Left | Right |
| Comp. 19 | Only second layer | 30° | 25° | 45° | 50° |
| Ex. 38 | Second and first | 60° | 70° | 65° | 65° |

EXAMPLE 39

A triacetyl cellulose film (thickness: 100 μm, size: 270 mm×100 mm, Fuji Tac, Fuji Photo Film Co., Ltd.) was used as a transparent substrate.

An aqueous solution of an alkyl denatured polyvinyl alcohol (MP-203, Kuraray Co., Ltd.) was coated on the transparent substrate by using a bar coater, and dried to form an orientation layer (thickness: 0.65 μm). The surface of the orientation layer was subjected to a rubbing treatment.

The following coating solution was coated on the orientation layer by using a wire bar coater, and dried at the room temperature. The thickness of the formed layer was 1.7 μm.

Coating Solution for Optically Anisotropic Layer

| | |
|---|---|
| Melamine compound (MM-2) | 0.5 weight part |
| The discotic liquid crystal compound (1) used in Example 1 | 100 weight parts |
| A photopolymerization initiator (Irgacure 907, Ciba-Geigy) | 0.2 weight part |
| Methyl ethyl ketone | 400 weight parts |

(MM-2)

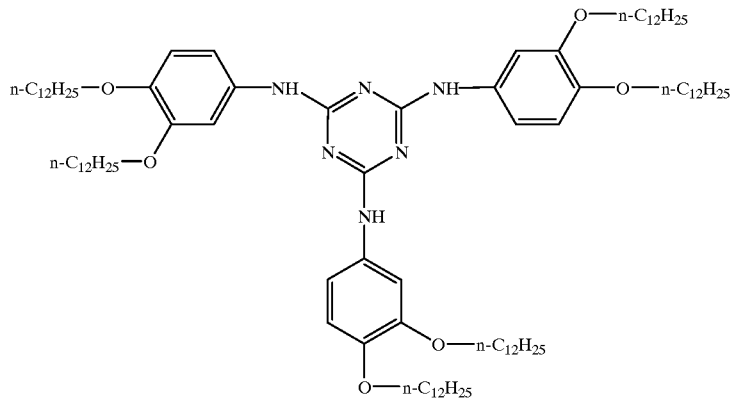

The coated layer was heated at 120° C. to align the discotic liquid crystal compound. The layer was irradiated with an ultraviolet ray of 600 mJ per cm² to polymerize the liquid crystal compound and to fix the alignment. Thus an optical compensatory sheet was prepared.

EXAMPLES 40 TO 59 AND COMPARISON EXAMPLES 20, 21

Optical compensatory sheets were prepared in the same manner as in Example 39, except that the kind or amount of the melamine compound was changed as is shown in Table 5.

Evaluation of Optical Compensatory Sheets

The optical characteristics of the optical compensatory sheets were measured at the wavelength of 632.8 nm by using an ellipsometer (AEP-100, Shimazu Seisakusho, Ltd.). The results are set forth in Table 5.

TABLE 5

| Sample | Melamine compound | | Optical characteristic | |
|---|---|---|---|---|
| No. | Kind | Amount | Angle | Δnd |
| Example 39 | MM-2 | 0.5 part | 1.8° | −124 nm |
| Example 40 | MM-2 | 1 part | 2.1° | −130 nm |
| Example 41 | MM-2 | 5 parts | 1.1° | −115 nm |
| Example 42 | MM-2 | 10 parts | 0.3° | −119 nm |
| Example 43 | MM-2 | 15 parts | 0.9° | −131 nm |
| Comp. 20 | MM-2 | 30 parts | Not crystalline phase | |
| Comp. 21 | None | | 25° | −125 nm |
| Example 44 | MM-1 | 5 parts | 1.3° | −121 nm |
| Example 45 | MM-3 | 5 parts | 2.0° | −129 nm |
| Example 46 | MM-5 | 5 parts | 1.1° | −130 nm |
| Example 47 | MM-17 | 5 parts | 3.0° | −124 nm |
| Example 48 | MM-19 | 5 parts | 1.9° | −128 nm |

TABLE 5-continued

| Example 49 | MM-26 | 5 parts | 0.5° | −130 nm |
| Example 50 | MM-50 | 5 parts | 2.1° | −111 nm |
| Example 51 | MM-54 | 5 parts | 1.2° | −119 nm |
| Example 52 | MM-62 | 5 parts | 2.4° | −125 nm |
| Example 53 | MM-89 | 5 parts | 0.8° | −123 nm |
| Example 54 | MM-96 | 5 parts | 1.9° | −119 nm |
| Example 55 | MM-27 | 5 parts | 1.3° | −121 nm |
| Example 56 | MM-31 | 5 parts | 0.9° | −118 nm |
| Example 57 | MM-33 | 5 parts | 1.5° | −123 nm |
| Example 58 | MM-94 | 5 parts | 1.9° | −120 nm |
| Example 59 | MM-95 | 5 parts | 0.7° | −117 nm |

(Remark)
Angle: Inclined angle of an optical axis (a direction having the minimum retardation value)
corresponding to average inclined angle between discotic planes and a surface of the transparent substrate
Δnd: Rth retardation value (MM-1)

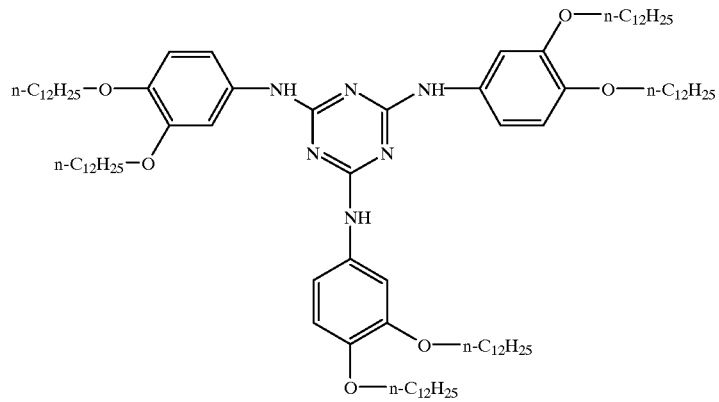

(MM-3)

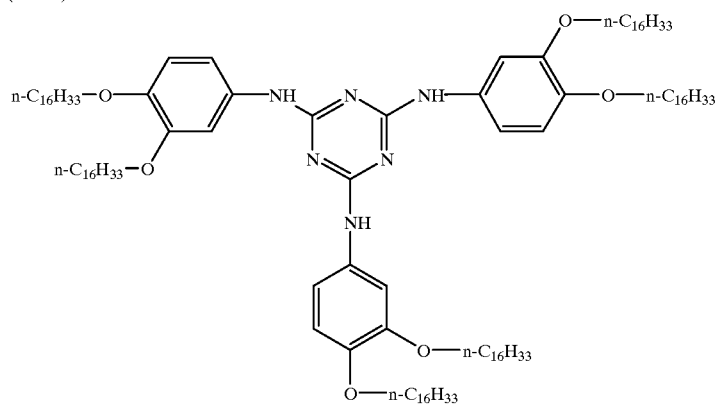

(MM-5)

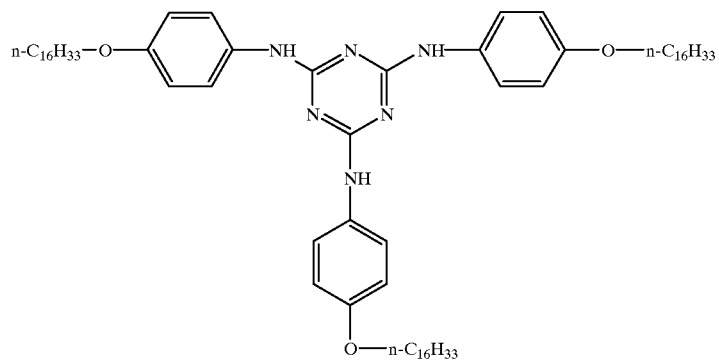

TABLE 5-continued
(MM-17)
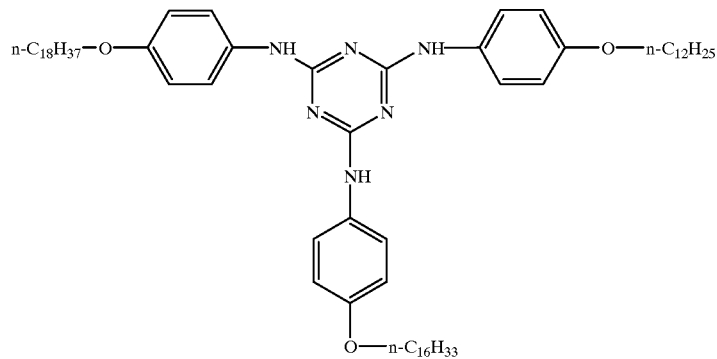
(MM-19)
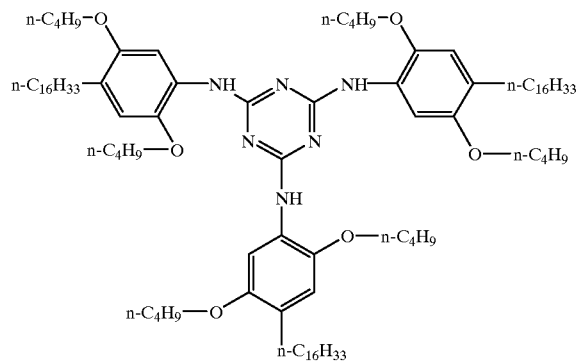
(MM-26)
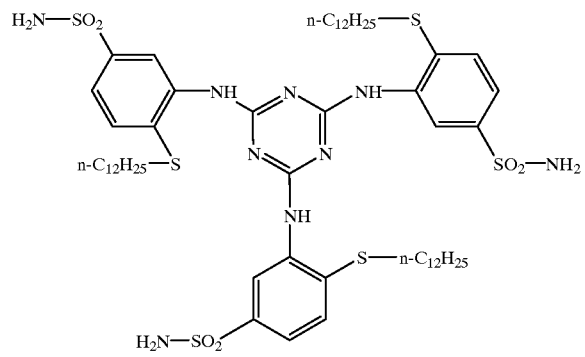

TABLE 5-continued
(MM-50)
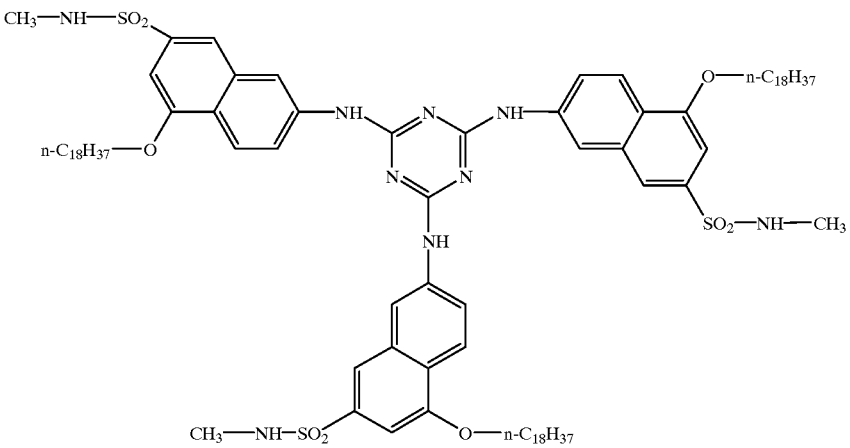
(MM-54)
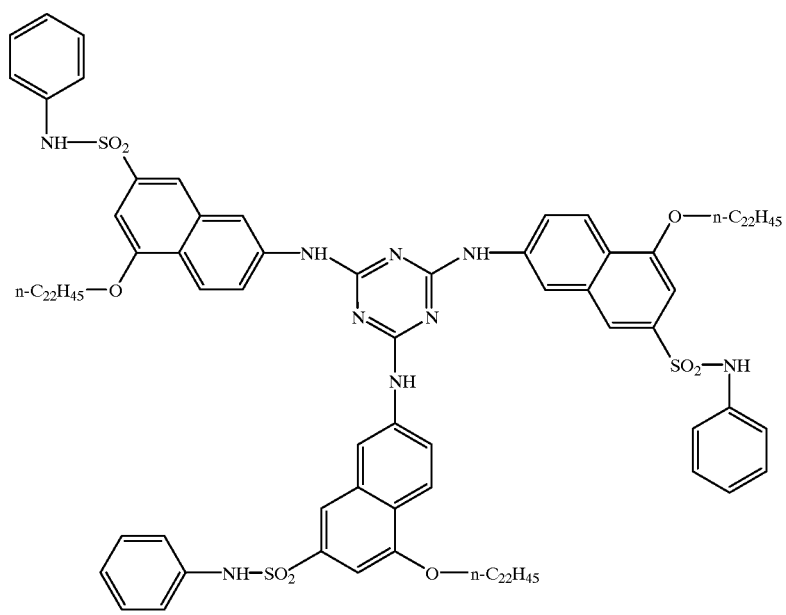
(MM-62)
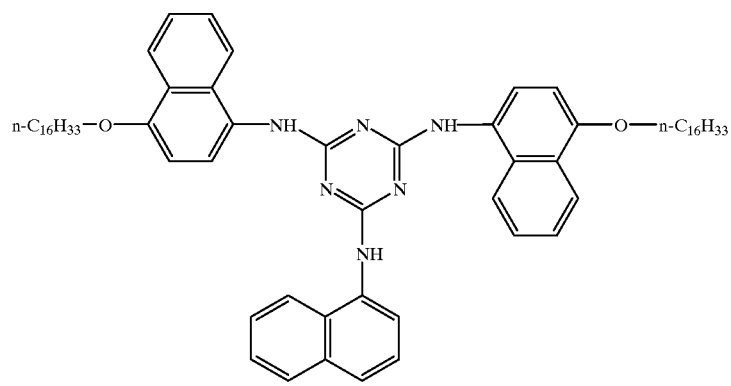

TABLE 5-continued
(MM-89)
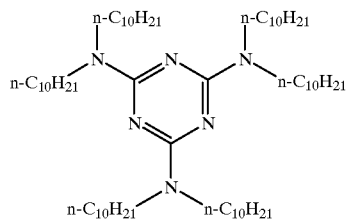
(MM-96)
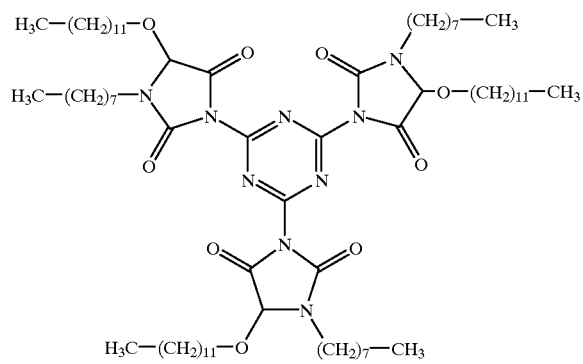
(MM-27)
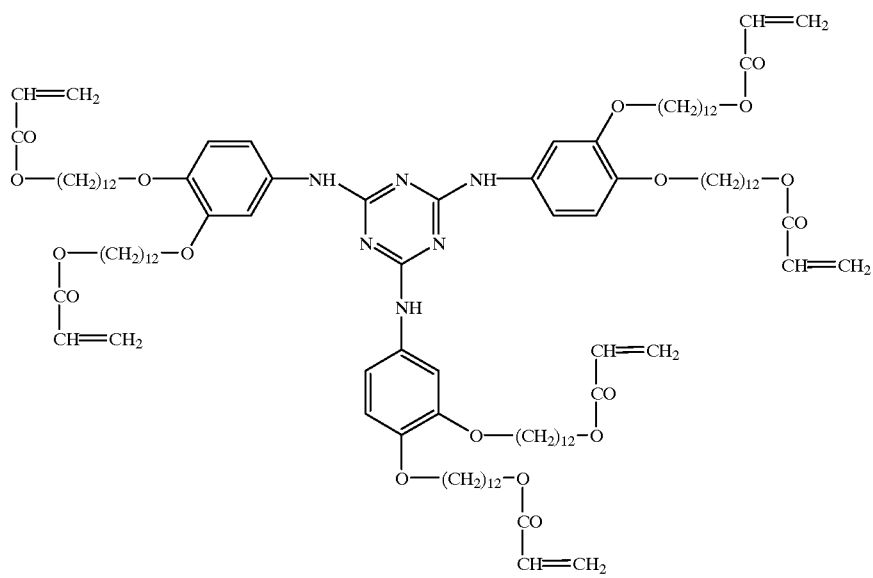

TABLE 5-continued (MM-31)

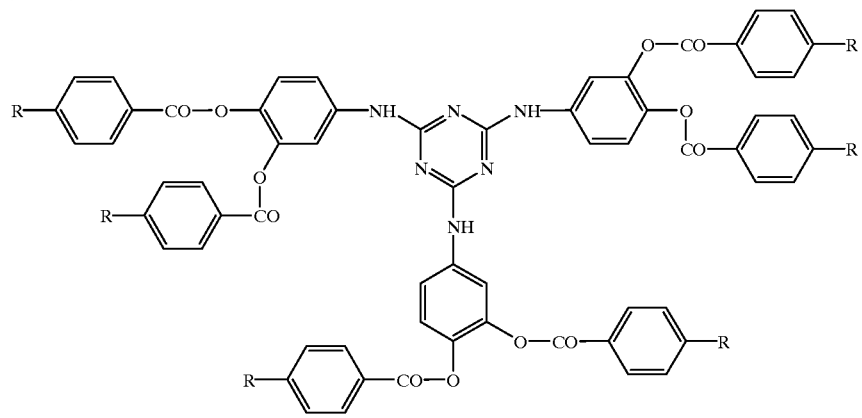

(MM-33)

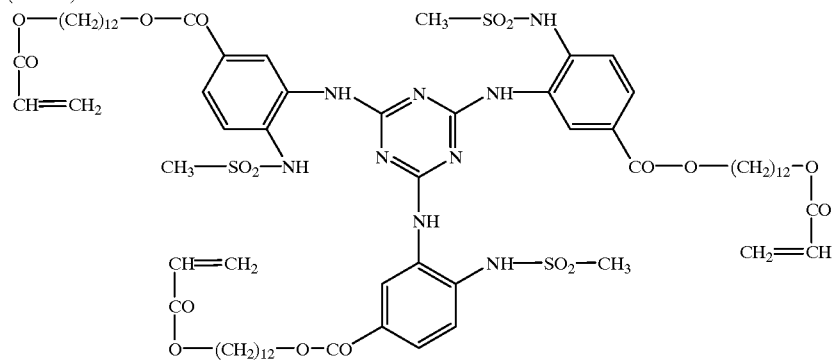

(MM-94)

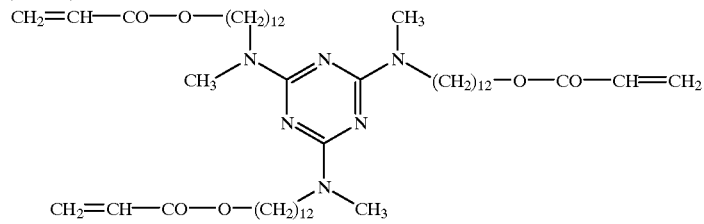

(MM-95)

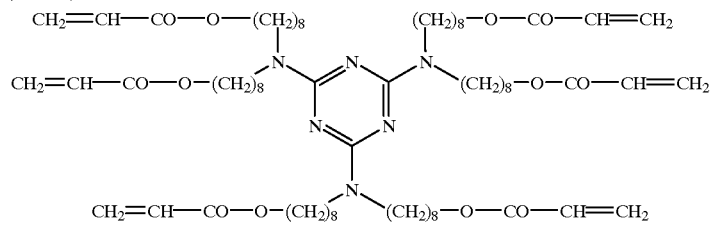

EXAMPLE 60

A glass plate (thickness: 0.85 mm) was used as a transparent substrate.

An aqueous solution of polyvinyl alcohol denatured with methacryloyloxyethyl isocyanate (Polymer No. 1 of Japanese Patent Provisional Publication No. 8(1996)-48197) was coated on the transparent substrate by using a bar coater, and dried to form an orientation layer (thickness: 0.63 μm). The surface of the orientation layer was subjected to a rubbing treatment.

The following coating solution was coated on the orientation layer by using a spin coater of 1,000 rpm, and dried at the room temperature. The thickness of the formed layer was 1.9 μm.

| Coating solution for optically anisotropic layer | |
|---|---|
| Melamine compound (MM-2) | 0.5 weight part |
| The discotic liquid crystal compound (5) used in Example 20 | 100 weight parts |
| A photopolymerization initiator (Irgacure 907, Ciba-Geigy) | 0.2 weight part |
| Methyl ethyl ketone | 400 weight parts |

The coated layer was heated at 180° C. to align the discotic liquid crystal compound. The layer was irradiated with an ultraviolet ray of 600 mJ per cm² to polymerize the liquid crystal compound and to fix the alignment. Thus an optical compensatory sheet was prepared.

EXAMPLES 61 TO 85 AND COMPARISON EXAMPLES 22, 23

Optical compensatory sheets were prepared in the same manner as in Example 60, except that the kind of the discotic liquid crystal compound, the kind or amount of the melamine compound or the heating temperature for the layer was changed as is shown in Table 6.

Evaluation of Optical Compensatory Sheets

The optical characteristics of the optical compensatory sheets were measured at the wavelength of 632.8 nm by using an ellipsometer (AEP-100, Shimazu Seisakusho, Ltd.). The results are set forth in Table 6.

TABLE 6

| Sample No. | Optically anisotropic layer | | | | Optical char. | |
|---|---|---|---|---|---|---|
| | DLC | Compound | Amount | Temp. | Angle | Δnd |
| Ex. 60 | (5) | MM-2 | 0.5 | 180° C. | 1.9° | −145 nm |
| Ex. 61 | (5) | MM-2 | 1 | 180° C. | 1.5° | −150 nm |
| Ex. 62 | (5) | MM-2 | 5 | 180° C. | 1.8° | −144 nm |
| Ex. 63 | (5) | MM-2 | 10 | 180° C. | 1.1° | −121 nm |
| Comp. 22 | (5) | | None | 180° C. | 42° | −135 nm |
| Ex. 64 | (5) | MM-1 | 5 | 180° C. | 0.7° | −130 nm |
| Ex. 65 | (5) | MM-3 | 7 | 180° C. | 2.9° | −121 nm |
| Ex. 66 | (5) | MM-19 | 5 | 180° C. | 2.8° | −130 nm |
| Ex. 67 | (5) | MM-50 | 4 | 180° C. | 1.1° | −134 nm |
| Ex. 68 | (5) | MM-62 | 2 | 180° C. | 1.5° | −131 nm |
| Ex. 69 | (5) | MM-72 | 10 | 180° C. | 0.8° | −135 nm |
| Ex. 70 | (6) | MM-2 | 15 | 80° C. | 0.7° | −229 nm |
| Ex. 71 | (6) | MM-1 | 7 | 80° C. | 1.1° | −215 nm |
| Ex. 72 | (6) | MM-3 | 1 | 80° C. | 1.5° | −228 nm |
| Ex. 73 | (7) | MM-2 | 1 | 175° C. | 1.4° | −140 nm |
| Ex. 74 | (7) | MM-1 | 3 | 175° C. | 1.8° | −148 nm |
| Ex. 75 | (7) | MM-50 | 5 | 175° C. | 3.0° | −143 nm |
| Comp. 23 | (7) | | None | 175° C. | 21° | −145 nm |
| Ex. 76 | (5) | MM-28 | 5 | 180° C. | 1.2° | −134 nm |
| Ex. 77 | (5) | MM-31 | 10 | 180° C. | 1.9° | −130 nm |
| Ex. 78 | (5) | MM-57 | 7 | 180° C. | 2.1° | −141 nm |
| Ex. 79 | (5) | MM-59 | 8 | 180° C. | 2.5° | −129 nm |
| Ex. 80 | (6) | MM-29 | 9 | 80° C. | 2.1° | −230 nm |
| Ex. 81 | (6) | MM-30 | 5 | 80° C. | 1.3° | −219 nm |
| Ex. 82 | (6) | MM-69 | 5 | 80° C. | 1.1° | −221 nm |
| Ex. 83 | (7) | MM-30 | 6 | 175° C. | 2.0° | −149 nm |
| Ex. 84 | (7) | MM-58 | 10 | 175° C. | 1.9° | −143 nm |
| Ex. 85 | (7) | MM-71 | 15 | 175° C. | 1.3° | −140 nm |

(Remark)
Angle: Inclined angle of an optical axis (a direction having the minimum retardation value) corresponding to average inclined angle between discotic planes and a surface of the transparent substrate
Δnd: Rth retardation value TABLE 6-continued
| Sample | Optically anisotropic layer | | | | Optical char. | |
|---|---|---|---|---|---|---|
| No. | DLC | Compound | Amount | Temp. | Angle | Δnd |
(MM-72)
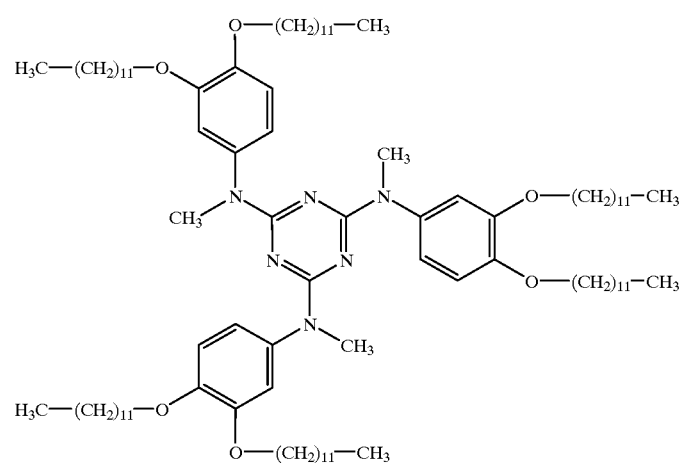
(MM-28)
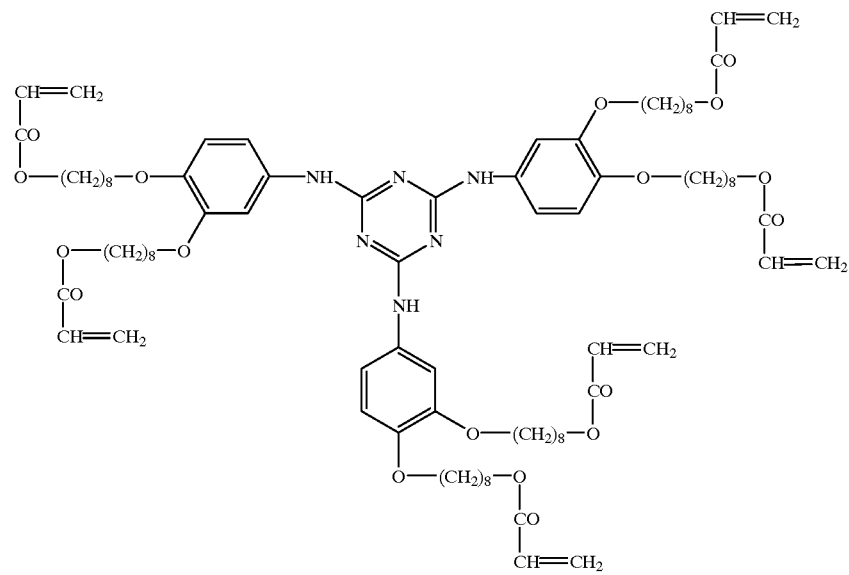

TABLE 6-continued
| Sample | Optically anisotropic layer | | | | Optical char. | |
|---|---|---|---|---|---|---|
| No. | DLC | Compound | Amount | Temp. | Angle | Δnd |
(MM-57)
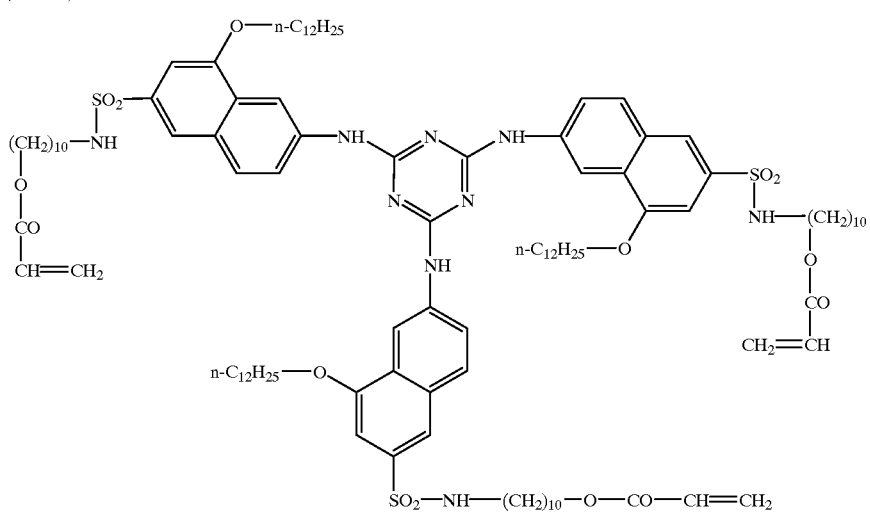
(MM-59)
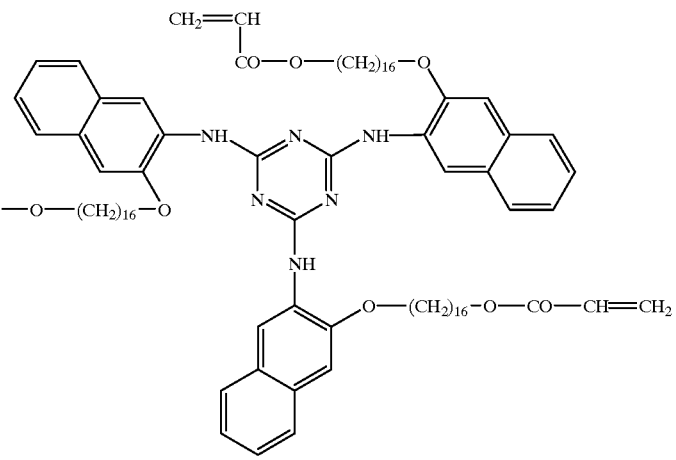
(MM-29)
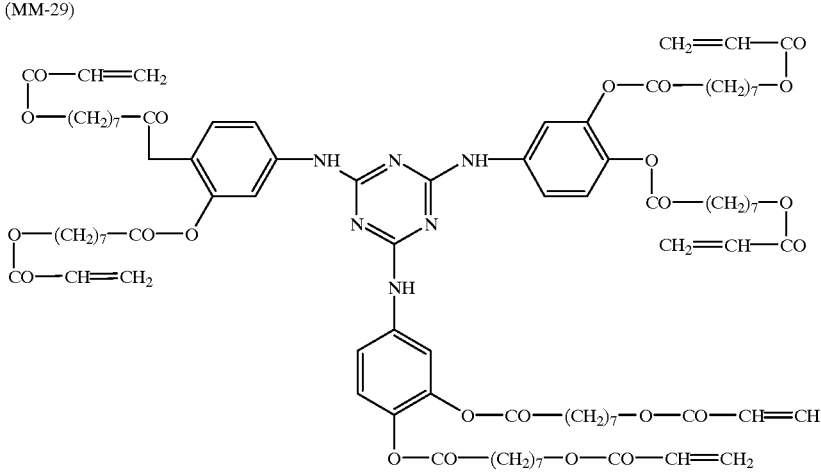

TABLE 6-continued

| Sample | Optically anisotropic layer | | | | Optical char. | |
|---|---|---|---|---|---|---|
| No. | DLC | Compound | Amount | Temp. | Angle | Δnd |

(MM-30)

(MM-69)

(MM-58)

TABLE 6-continued

| Sample | Optically anisotropic layer | | | | Optical char. | |
|---|---|---|---|---|---|---|
| No. | DLC | Compound | Amount | Temp. | Angle | Δnd |

(MM-71)

[Chemical structure of MM-71]

PRELIMINARY EXPERIMENT 1

A glass plate was used as a transparent substrate.

An alkyl denatured polyvinyl alcohol (MP-203, Kuraray Co., Ltd.) was coated on the transparent substrate, and dried to form an orientation layer.

The following coating solution was coated on the orientation layer by using a spin coater, and dried at the room temperature.

Coating Solution

| | |
|---|---|
| Melamine polymer (MP-5) | 1 weight part |
| The discotic liquid crystal compound (1) used in Example 1 | 100 weight parts |
| Methyl ethyl ketone | 400 weight parts |

(MP-5)

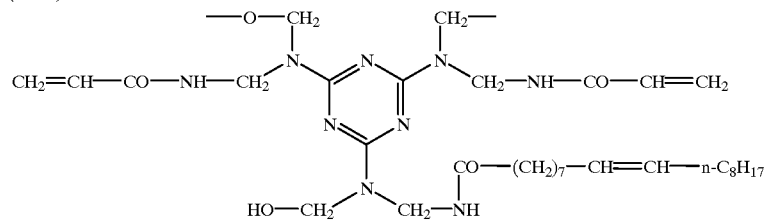

The coated sample was gradually heated, and the change of the liquid crystal phase was observed with a polarizing microscope. As a result, a liquid crystal phase was served in the range of 116 to 180° C.

The sample was quickly cooled to the room temperature. The inclined angle of the optic axis was measured by using an ellipsometer (AEP-100, Shimazu Seisakusho, Ltd.). The angle was 2.9±0.40.

PRELIMINARY EXPERIMENT 2

The experiment was conducted in the same manner as in Preliminary Experiment 1, except that 10 weight parts of the melamine polymer (MP-5) were used.

As a result, a liquid crystal phase was observed in the range of 111 to 151° C., and the inclined angle of the optic axis was 2.9±0.70.

PRELIMINARY EXPERIMENT 3

The experiment was conducted in the same manner as in Preliminary Experiment 1, except that the melamine polymer (MP-5) was not used.

As a result, a liquid crystal phase was observed in the range of 126 to 183° C. However, a schlieren texture was observed in the liquid crystal phase. Accordingly, the liquid crystal molecules were not uniformly aligned.

EXAMPLE 86

A triacetyl cellulose film (thickness: 100 μm, Fuji Tac, Fuji Photo Film Co., Ltd.) was used as a transparent substrate.

An aqueous solution of an alkyl denatured polyvinyl alcohol (MP-203, Kuraray Co., Ltd.) was coated on the transparent substrate, and dried to form an orientation layer.

The following coating solution was coated on the orientation layer by using a wire bar coater, and dried at the room temperature.

| Coating solution for optically anisotropic layer | |
|---|---|
| Melamine polymer (MP-5) | 1 weight part |
| The discotic liquid crystal compound (1) used in Example 1 | 100 weight parts |
| A photopolymerization initiator (Irgacure 907, Ciba-Geigy) | 3 weight part |
| Methyl ethyl ketone | 400 weight parts |

The coated layer was heated at 130° C. to align the discotic liquid crystal compound. The layer was irradiated with an ultraviolet ray of 600 mJ per cm² to polymerize the liquid crystal compound and to fix the alignment. Thus an optical compensatory sheet was prepared.

The alignment of the optically anisotropic layer was kept after polymerizing the discotic liquid crystal compound and cooling the layer. After heating the layer at 130° C., the optically anisotropic layer was not changed to the liquid crystal state. The inclined angle of the optic axis was measured by using an ellipsometer (AEP-100, Shimazu Seisakusho, Ltd.). As a result, the angle was less than 5°.

EXAMPLE 87

An optical compensatory sheet was prepared in the same manner as in Example 86, except that 1 weight part of the following melamine polymer (MP-7) was used in place of the melamine polymer (MP-5).

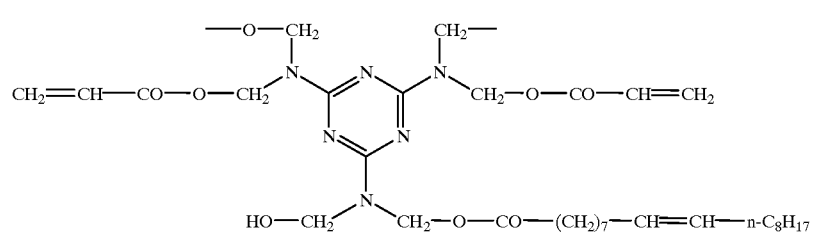

(MP-7)

The alignment of the optically anisotropic layer was kept after polymerizing the discotic liquid crystal compound and cooling the layer. After heating the layer at 130° C., the optically anisotropic layer was not changed to the liquid crystal state. The inclined angle of the optic axis was measured by using an ellipsometer (AEP-100, Shimazu Seisakusho, Ltd.). As a result, the angle was less than 5°.

EXAMPLE 88

A triacetyl cellulose film (thickness: 100 μm) was used as a transparent substrate. The Rth retardation value of the transparent substrate was 40 nm.

A gelatin thin layer (thickness: 0.1 μm) was coated as an undercoating layer on the transparent substrate.

An aqueous solution of the following alkyl denatured polyvinyl alcohol was coated on the undercoating layer by using a bar coater, and dried to form an orientation layer (thickness: 0.5 μm).

(Denatured polyvinyl alcohol)

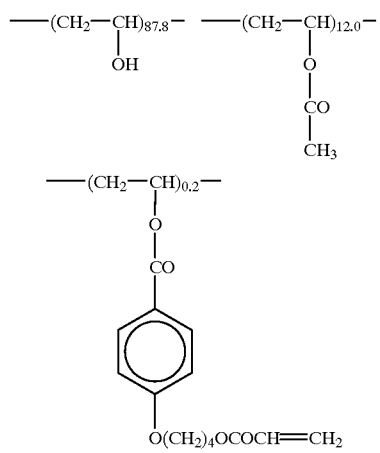

The following coating solution was coated on the orientation layer by using a bar coater of #2.5.

| Coating solution for optically anisotropic layer | |
|---|---|
| The discotic liquid crystal compound (1) used in Example 1 | 374 weight parts |
| Trimethylolpropane triacrylate denatured with ethylene oxide (Viscoat 360, Osaka Organic Chemicals Ltd.) | 42 weight parts |
| A photopolymerization initiator (Irgacure 907, Ciba-Geigy) | 12.6 weight parts |
| A photopolymerization sensitizer (Kayacure DETX, Nippon Kayaku Co., Ltd.) | 4.2 weight parts |

-continued

| Coating solution for optically anisotropic layer | |
|---|---|
| 80 Wt. % methyl ethyl ketone solution of melamine polymer (MP-5) | 7.5 weight parts |
| Methyl ethyl ketone | 3581.15 weight parts |

The coated layer was heated at 130° C. for 1 minute to align the discotic liquid crystal compound. The layer was irradiated with an ultraviolet ray of 500 mJ per cm² to polymerize the liquid crystal compound and to fix the alignment. Thus an optically anisotropic layer was formed to prepare an optical compensatory sheet.

The optically anisotropic layer was observed to examine whether the layer was uniformly coated or not (disturbed by repellency of the orientation layer), and whether the liquid crystal compound was uniformly aligned or not. The results are set forth in Table 7.

The angle dependency of the retardation of the optical compensatory sheet at the wavelength of 632.8 nm was measured by using an ellipsometer (M-150, Japan Spectrum Co., Ltd.). The Rth retardation value was calculated from the results of the angle dependency. The results are set forth in Table 7.

An optical compensatory sheet was prepared in the same manner as is described above, except that a glass plate was used as the transparent substrate. The angle ($\theta$) between the discotic plane of the discotic liquid crystal compound and the surface of the transparent substrate was measured according to a crystal rotation method. The results are set forth in Table 7.

EXAMPLE 89

A triacetyl cellulose film (thickness: 100 $\mu$m) was used as a transparent substrate. The Rth retardation value of the transparent substrate was 80 nm.

A gelatin thin layer (thickness: 0.1 $\mu$m) was coated as an undercoating layer on the transparent substrate.

An aqueous solution of the alkyl denatured polyvinyl alcohol used in Example 88 was coated on the undercoating layer by using a bar coater, and dried to form an orientation layer (thickness: 0.5 $\mu$m).

The following coating solution was coated on the orientation layer by using a bar coater of #4.

| Coating solution for optically anisotropic layer | |
| --- | --- |
| The discotic liquid crystal compound (1) used in Example 1 | 378 weight parts |
| Trimethylolpropane triacrylate denatured with ethylene oxide (Viscoat 360, Osaka Organic Chemicals Ltd.) | 42 weight parts |
| A photopolymerization initiator (Irgacure 907, Ciba-Geigy) | 12.6 weight parts |
| A photopolymerization sensitizer (Kayacure DETX, Nippon Kayaku Co., Ltd.) | 4.2 weight parts |
| 80 Wt. % methyl ethyl ketone solution of melamine polymer (MP-5) | 2.62 weight parts |
| Methyl ethyl ketone | 1186.21 weight parts |

The coated layer was heated at 130° C. for 1 minute to align the discotic liquid crystal compound. The layer was irradiated with an ultraviolet ray of 500 mJ per cm$^2$ to polymerize the liquid crystal compound and to fix the alignment. Thus an optically anisotropic layer was formed to prepare an optical compensatory sheet.

The optically anisotropic layer was observed to examine whether the layer was uniformly coated or not (disturbed by repellency of the orientation layer), and whether the liquid crystal compound was uniformly aligned or not. The results are set forth in Table 7.

The angle dependency of the retardation of the optical compensatory sheet at the wavelength of 632.8 nm was measured by using an ellipsometer (M-150, Japan Spectrum Co., Ltd.). The Rth retardation value was calculated from the results of the angle dependency. The results are set forth in Table 7.

An optical compensatory sheet was prepared in the same manner as is described above, except that a glass plate was used as the transparent substrate. The angle ($\theta$) between the discotic plane of the discotic liquid crystal compound and the surface of the transparent substrate was measured according to a crystal rotation method. The results are set forth in Table 7.

EXAMPLE 90

A gelatin thin layer and an orientation layer were formed on a transparent substrate in the same manner as in Example 88.

The following coating solution was coated on the orientation layer by using a bar coater of #5.

| Coating solution for optically anisotropic layer | |
| --- | --- |
| The discotic liquid crystal compound (1) used in Example 1 | 378 weight parts |
| Trimethylolpropane triacrylate denatured with ethylene oxide (Viscoat 360, Osaka Organic Chemicals Ltd.) | 42 weight parts |
| A photopolymerization initiator (Irgacure 907, Ciba-Geigy) | 12.6 weight parts |
| A photopolymerization sensitizer (Kayacure DETX, Nippon Kayaku Co., Ltd.) | 4.2 weight parts |
| 80 Wt. % methyl ethyl ketone solution of melamine polymer (MP-5) | 2.62 weight parts |
| Methyl ethyl ketone | 1186.21 weight parts |

The coated layer was heated at 130° C. for 1 minute to align the discotic liquid crystal compound. The layer was irradiated with an ultraviolet ray of 500 mJ per cm$^2$ to polymerize the liquid crystal compound and to fix the alignment. Thus an optically anisotropic layer was formed to prepare an optical compensatory sheet.

The optically anisotropic layer was observed to examine whether the layer was uniformly coated or not (disturbed by repellency of the orientation layer), and whether the liquid crystal compound was uniformly aligned or not. The results are set forth in Table 7.

The angle dependency of the retardation of the optical compensatory sheet at the wavelength of 632.8 nm was measured by using an ellipsometer (M-150, Japan Spectrum Co., Ltd.). The Rth retardation value was calculated from the results of the angle dependency. The results are set forth in Table 7.

An optical compensatory sheet was prepared in the same manner as is described above, except that a glass plate was used as the transparent substrate. The angle ($\theta$) between the discotic plane of the discotic liquid crystal compound and the surface of the transparent substrate was measured according to a crystal rotation method. The results are set forth in Table 7.

EXAMPLE 91

A gelatin thin layer and an orientation layer were formed on a transparent substrate in the same manner as in Example 88.

The following coating solution was coated on the orientation layer by using a bar coater of #10.

| Coating solution for optically anisotropic layer | |
| --- | --- |
| The discotic liquid crystal compound (1) used in Example 1 | 378 weight parts |
| Trimethylolpropane triacrylate denatured with ethylene oxide (Viscoat 360, Osaka Organic Chemicals Ltd.) | 42 weight parts |

| Coating solution for optically anisotropic layer | |
| --- | --- |
| A photopolymerization initiator (Irgacure 907, Ciba-Geigy) | 12.6 weight parts |
| A photopolymerization sensitizer (Kayacure DETX, Nippon Kayaku Co., Ltd.) | 4.2 weight parts |
| 80 Wt. % methyl ethyl ketone solution of melamine polymer (MP-5) | 2.62 weight parts |
| Methyl ethyl ketone | 877.79 weight parts |

The coated layer was heated at 130° C. for 1 minute to align the discotic liquid crystal compound. The layer was irradiated with an ultraviolet ray of 500 mJ per cm$^2$ to polymerize the liquid crystal compound and to fix the alignment. Thus an optically anisotropic layer was formed to prepare an optical compensatory sheet.

The optically anisotropic layer was observed to examine whether the layer was uniformly coated or not (disturbed by repellency of the orientation layer), and whether the liquid crystal compound was uniformly aligned or not. The results are set forth in Table 7.

The angle dependency of the retardation of the optical compensatory sheet at the wavelength of 632.8 nm was measured by using an ellipsometer (M-150, Japan Spectrum Co., Ltd.). The Rth retardation value was calculated from the results of the angle dependency. The results are set forth in Table 7.

An optical compensatory sheet was prepared in the same manner as is described above, except that a glass plate was used as the transparent substrate. The angle (θ) between the discotic plane of the discotic liquid crystal compound and the surface of the transparent substrate was measured according to a crystal rotation method. The results are set forth in Table 7.

EXAMPLE 92

A gelatin thin layer and an orientation layer were formed on a transparent substrate in the same manner as in Example 89.

The following coating solution was coated on the orientation layer by using a bar coater of #4.

| Coating solution for optically anisotropic layer | |
| --- | --- |
| The discotic liquid crystal compound (1) used in Example 1 | 378 weight parts |
| Trimethylolpropane triacrylate denatured with ethylene oxide (Viscoat 360, Osaka Organic Chemicals Ltd.) | 42 weight parts |
| A photopolymerization initiator (Irgacure 907, Ciba-Geigy) | 12.6 weight parts |
| A photopolymerization sensitizer (Kayacure DETX, Nippon Kayaku Co., Ltd.) | 4.2 weight parts |
| 80 Wt. % methyl ethyl ketone solution of melamine polymer (MP-5) | 35 weight parts |
| Methyl ethyl ketone | 819.31 weight parts |

The coated layer was heated at 130° C. for 1 minute to align the discotic liquid crystal compound. The layer was irradiated with an ultraviolet ray of 500 mJ per cm$^2$ to polymerize the liquid crystal compound and to fix the alignment. Thus an optically anisotropic layer was formed to prepare an optical compensatory sheet.

The optically anisotropic layer was observed to examine whether the layer was uniformly coated or not (disturbed by repellency of the orientation layer), and whether the liquid crystal compound was uniformly aligned or not. The results are set forth in Table 7.

The angle dependency of the retardation of the optical compensatory sheet at the wavelength of 632.8 nm was measured by using an ellipsometer (M-150, Japan Spectrum Co., Ltd.). The Rth retardation value was calculated from the results of the angle dependency. The results are set forth in Table 7.

An optical compensatory sheet was prepared in the same manner as is described above, except that a glass plate was used as the transparent substrate. The angle (θ) between the discotic plane of the discotic liquid crystal compound and the surface of the transparent substrate was measured according to a crystal rotation method. The results are set forth in Table 7.

EXAMPLE 93

A gelatin thin layer and an orientation layer were formed on a transparent substrate in the same manner as in Example 89.

The following coating solution was coated on the orientation layer by using a bar coater of #4.

| Coating solution for optically anisotropic layer | |
| --- | --- |
| The discotic liquid crystal compound (1) used in Example 1 | 378 weight parts |
| Trimethylolpropane triacrylate denatured with ethylene oxide (Viscoat 360, Osaka Organic Chemicals Ltd.) | 42 weight parts |
| A photopolymerization initiator (Irgacure 907, Ciba-Geigy) | 12.6 weight parts |
| A photopolymerization sensitizer (Kayacure DETX, Nippon Kayaku Co., Ltd.) | 4.2 weight parts |
| 80 Wt. % methyl ethyl ketone solution of melamine polymer (MP-5) | 60 weight parts |
| Methyl ethyl ketone | 657.49 weight parts |

The coated layer was heated at 130° C. for 1 minute to align the discotic liquid crystal compound. The layer was irradiated with an ultraviolet ray of 500 mJ per cm$^2$ to polymerize the liquid crystal compound and to fix the alignment. Thus an optically anisotropic layer was formed to prepare an optical compensatory sheet.

The optically anisotropic layer was observed to examine whether the layer was uniformly coated or not (disturbed by repellency of the orientation layer), and whether the liquid crystal compound was uniformly aligned or not. The results are set forth in Table 7.

The angle dependency of the retardation of the optical compensatory sheet at the wavelength of 632.8 nm was measured by using an ellipsometer (M-150, Japan Spectrum Co., Ltd.). The Rth retardation value was calculated from the results of the angle dependency. The results are set forth in Table 7.

An optical compensatory sheet was prepared in the same manner as is described above, except that a glass plate was used as the transparent substrate. The angle (θ) between the discotic plane of the discotic liquid crystal compound and the surface of the transparent substrate was measured according to a crystal rotation method. The results are set forth in Table 7.

COMPARISON EXAMPLE 24

A gelatin thin layer and an orientation layer were formed on a transparent substrate in the same manner as in Example 88.

The following coating solution was coated on the orientation layer by using a bar coater of #2.5.

| Coating solution for optically anisotropic layer | |
|---|---|
| The discotic liquid crystal compound (1) used in Example 1 | 378 weight parts |
| Trimethylolpropane triacrylate denatured with ethylene oxide (Viscoat 360, Osaka Organic Chemicals Ltd.) | 42 weight parts |
| A photopolymerization initiator (Irgacure 907, Ciba-Geigy) | 12.6 weight parts |
| A photopolymerization sensitizer (Kayacure DETX, Nippon Kayaku Co., Ltd.) | 4.2 weight parts |
| 80 Wt. % methyl ethyl ketone solution of melamine polymer (MP-5) | 0.7 weight parts |
| Methyl ethyl ketone | 3538.5 weight parts |

The coated layer was heated at 130° C. for 1 minute to align the discotic liquid crystal compound. The layer was irradiated with an ultraviolet ray of 500 mJ per cm² to polymerize the liquid crystal compound and to fix the alignment. Thus an optically anisotropic layer was formed to prepare an optical compensatory sheet.

The optically anisotropic layer was observed to examine whether the layer was uniformly coated or not (disturbed by repellency of the orientation layer), and whether the liquid crystal compound was uniformly aligned or not. The results are set forth in Table 7.

The angle dependency of the retardation of the optical compensatory sheet at the wavelength of 632.8 nm was measured by using an ellipsometer (M-150, Japan Spectrum Co., Ltd.). The Rth retardation value was calculated from the results of the angle dependency. The results are set forth in Table 7.

An optical compensatory sheet was prepared in the same manner as is described above, except that a glass plate was used as the transparent substrate. The angle (θ) between the discotic plane of the discotic liquid crystal compound and the surface of the transparent substrate was measured according to a crystal rotation method. The results are set forth in Table 7.

COMPARISON EXAMPLE 25

A gelatin thin layer and an orientation layer were formed on a transparent substrate in the same manner as in Example 88.

The following coating solution was coated on the orientation layer by using a bar coater of #5.

| Coating solution for optically anisotropic layer | |
|---|---|
| The discotic liquid crystal compound (1) used in Example 1 | 378 weight parts |
| Trimethylolpropane triacrylate denatured with ethylene oxide (Viscoat 360, Osaka Organic Chemicals Ltd.) | 42 weight parts |
| A photopolymerization initiator (Irgacure 907, Ciba-Geigy) | 12.6 weight parts |
| A photopolymerization sensitizer (Kayacure DETX, Nippon Kayaku Co., Ltd.) | 4.2 weight parts |
| 80 Wt. % methyl ethyl ketone solution of melamine polymer (MP-5) | 0.1 weight parts |
| Methyl ethyl ketone | 743.86 weight parts |

The coated layer was heated at 130° C. for 1 minute to align the discotic liquid crystal compound. The layer was irradiated with an ultraviolet ray of 500 mJ per cm² to polymerize the liquid crystal compound and to fix the alignment. Thus an optically anisotropic layer was formed to prepare an optical compensatory sheet.

The optically anisotropic layer was observed to examine whether the layer was uniformly coated or not (disturbed by repellency of the orientation layer), and whether the liquid crystal compound was uniformly aligned or not. The results are set forth in Table 7.

The angle dependency of the retardation of the optical compensatory sheet at the wavelength of 632.8 nm was measured by using an ellipsometer (M-150, Japan Spectrum Co., Ltd.). The Rth retardation value was calculated from the results of the angle dependency. The results are set forth in Table 7.

An optical compensatory sheet was prepared in the same manner as is described above, except that a glass plate was used as the transparent substrate. The angle (θ) between the discotic plane of the discotic liquid crystal compound and the surface of the transparent substrate was measured according to a crystal rotation method. The results are set forth in Table 7.

COMPARISON EXAMPLE 26

A gelatin thin layer and an orientation layer were formed on a transparent substrate in the same manner as in Example 88.

The following coating solution was coated on the orientation layer by using a bar coater of #4.

| Coating solution for optically anisotropic layer | |
|---|---|
| The discotic liquid crystal compound (1) used in Example 1 | 378 weight parts |
| Trimethylolpropane triacrylate denatured with ethylene oxide (Viscoat 360, Osaka Organic Chemicals Ltd.) | 42 weight parts |
| A photopolymerization initiator (Irgacure 907, Ciba-Geigy) | 12.6 weight parts |
| A photopolymerization sensitizer (Kayacure DETX, Nippon Kayaku Co., Ltd.) | 4.2 weight parts |
| 80 Wt. % methyl ethyl ketone solution of melamine polymer (MP-5) | 340 weight parts |
| Methyl ethyl ketone | 910.82 weight parts |

The coated layer was heated at 130° C. for 1 minute to align the discotic liquid crystal compound. The layer was irradiated with an ultraviolet ray of 500 mJ per cm² to polymerize the liquid crystal compound and to fix the alignment. Thus an optically anisotropic layer was formed to prepare an optical compensatory sheet.

The optically anisotropic layer was observed to examine whether the layer was uniformly coated or not (disturbed by repellency of the orientation layer), and whether the liquid crystal compound was uniformly aligned or not. The results are set forth in Table 7.

TABLE 7

| Optically compensatory sheet | Coating amount of melamine polymer | Optically anisotropic layer | Rth retardation value | Average inclined angle of DLC |
|---|---|---|---|---|
| Example 88 | 8.0 mg/m² | No problem | 70 nm | 0.2° |
| Example 89 | 15.3 mg/m² | No problem | 240 nm | 0.1° |

TABLE 7-continued

| Optically compensatory sheet | Coating amount of melamine polymer | Optically anisotropic layer | Rth retardation value | Average inclined angle of DLC |
|---|---|---|---|---|
| Example 90 | 19.1 mg/m² | No problem | 240 nm | 0.2° |
| Example 91 | 29.8 mg/m² | No problem | 585 nm | 0.3° |
| Example 92 | 141 mg/m² | No problem | 240 nm | 0.2° |
| Example 93 | 286 mg/m² | No problem | 240 nm | 0.2° |
| Comp. Ex. 24 | 0.76 mg/m² | Repellency | 70 nm | 0.1° |
| Comp. Ex. 25 | 0.73 mg/m² | Repellency | 240 nm | 0.2° |
| Comp. Ex. 26 | 1112 mg/m² | Defect | Unmeasured | Unmeasured |

(Remark)
Repellency: The optically anisotropic layer was not uniformly coated because of repellency of the orientation layer.
Defect: Alignment defects were observed in the alignment discotic liquid crystal compound.

EXAMPLE 94

A polarizing membrane and a triacetyl cellulose film (Fuji TAC TD80UF, Fuji Photo Film Co., Ltd.) as a transparent protective film were attached in this order to the transparent substrate of the optical compensatory sheet prepared in Example 89 by using an epoxy adhesive to prepare a polarizing plate.

Two polarizing plates were separated from a commercially available liquid crystal monitor (Vt-1520, Fujitsu Limited) having a liquid crystal cell of a vertical alignment mode. The above-prepared polarizing plate was attached to the front surface of the monitor. A commercially available polarizing plate (HLC2-5618HCS, Sunrits Co., Ltd.) was attached to the back surface of the monitor.

The viewing angle of the prepared liquid crystal display was measured by using a machine (EZ Contrast 160D, ELDIM). The results are set forth in Table 8.

A black image viewed from a slant angle was evaluated. The results are set forth in Table 8.

EXAMPLE 95

A liquid crystal display was prepared and evaluated in the same manner as in Example 94, except that the optical compensatory sheet prepared in Example 90 was used.

EXAMPLE 96

A liquid crystal display was prepared and evaluated in the same manner as in Example 94, except that the optical compensatory sheet prepared in Example 92 was used.

EXAMPLE 97

A liquid crystal display was prepared and evaluated in the same manner as in Example 94, except that the optical compensatory sheet prepared in Example 93 was used.

COMPARISON EXAMPLE 27

A liquid crystal display was prepared and evaluated in the same manner as in Example 94, except that the optical compensatory sheet prepared in Comparison Example 26 was used.

TABLE 8

| Liquid crystal display | Viewing angle | | Evaluation of black image |
|---|---|---|---|
| | Direction of polarizing axis | 45° from polarizing axis | |
| Example 94 | 80° or more | 60° | Completely |
| Example 95 | 80° or more | 60° | Completely |
| Example 96 | 80° or more | 60° | Completely |
| Example 97 | 80° or more | 60° | Completely |
| Comp. Ex. 27 | 80° or more | 60° | Partially |

(Remark)
Completely: A completely black image was observed as a whole.
Partially: Light was partially emitted from a black image.

EXAMPLE 98

Preparation of Optical Compensatory Sheet

A cellulose diacetate solution was coated on one surface of a triacetyl cellulose film, and dried to form an undercoating layer (dry thickness: 0.5 μm) corresponding to an orientation layer which was not subjected to a rubbing treatment.

In methyl ethyl ketone, 90 weight parts of the following discotic liquid crystal compound (8), 10 weight parts of the trimethylolpropane triacrylate denatured with ethylene oxide (V#360, Osaka Organic Chemicals Ltd.), 0.6 weight part of a melamine formaldehyde/acrylic acid copolymer (Aldrich agent), 3.0 weight parts of a photopolymerization initiator (Irgacure 907, Ciba-Geigy) and 1.0 weight part of a photopolymerization sensitizer (Kayacure DETX, Nippon Kayaku Co., Ltd.) were dissolved to prepare 38 wt. % (solid content) solution.

Discotic liquid crystal compound (8)

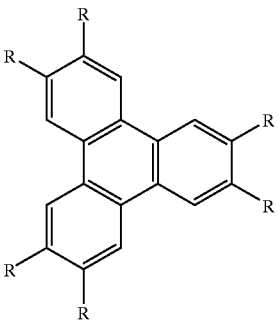

R: 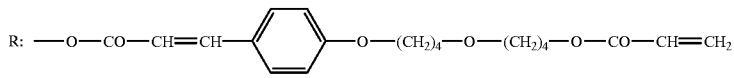

The solution was coated on the undercoating layer, and dried. The coated layer was heated at 130° C. for 2 minutes to align the discotic liquid crystal compound. The layer was immediately cooled to the room temperature, and irradiated with an ultraviolet ray of 500 mJ per cm² to polymerize the liquid crystal compound and to fix the alignment. Thus an optically anisotropic layer (thickness: 1.7 μm) was formed.

The angle dependency of the retardation of the optically anisotropic layer was measured by using an ellipsometer (M-150, Japan Spectrum Co., Ltd.). As a result, the average inclined angle of the discotic liquid crystal compound was 0.2°, and the Rth retardation value was 88 nm.

An optically uniaxial polycarbonate film was attached to the cellulose triacetate film by using an adhesive to prepare an optical compensatory sheet. The optically uniaxial polycarbonate film has an optical axis in its plane. The Re retardation value of the film was 50 nm.

The Re retardation value of the prepared optical compensatory sheet was 50 nm, and the Rth retardation value was 100 nm.

Preparation of Polarizing Plate

A polarizing membrane and a transparent protective film were attached in this order to the transparent substrate (polycarbonate film) of the optical compensatory sheet to prepare a polarizing plate. The polarizing membrane and the optical compensatory sheet was so arranged that the slow axis of the transparent substrate was parallel to the polarizing axis of the polarizing membrane.

Preparation of Liquid Crystal Display

Polarizing plates were separated from a commercially available liquid crystal display of a VA mode (LCD5000). The above-prepared polarizing plates were attached to the display.

The contrast ratio of the prepared liquid crystal display of the VA mode was measured at various viewing points. As a result, the viewing angle showing the contrast ratio of 20:1 was 160 ° between upward and downward or between leftward and rightward. On the other hand, the viewing angle of the commercially available liquid crystal display of a VA mode (LCD5000) was 120°.

EXAMPLE 99

Preparation of Optically Biaxial Transparent Substrate

In methylene chloride, 87 weight parts of cellulose triacetate, 10 weight parts of triphenyl phosphate and 3 weight parts of an ultraviolet absorbing agent (TM165, Sumitomo Chemical Co., Ltd.) were dissolved to prepare 18 wt. % (solid content) solution. The solution was cast on a glass plate, and dried at 40° C. for 10 minutes. The formed film (thickness: 100 μm) was separated from the glass plate.

A pressure of 20 Kg/mm² was applied to the formed film at 145° C. for 20 minutes. Thus an optically biaxial transparent substrate was prepared. The Re retardation of the transparent substrate was 20 nm, and the Rth retardation was 80 nm.

Preparation of Optical Compensatory Sheet

The coating solution of the optically anisotropic layer used in Example 98 was coated on the optically biaxial transparent substrate (coating amount: 3 ml/m²), and dried at the room temperature. The coated layer was heated at 130° C. for 1 minute to align the discotic liquid crystal compound. The layer was irradiated with an ultraviolet ray to polymerize the liquid crystal compound and to fix the alignment.

The angle dependency of the retardation of the optically anisotropic layer was measured by using an ellipsometer (M-150, Japan Spectrum Co., Ltd.). As a result, the average inclined angle of the discotic liquid crystal compound was 0.1°.

The Re retardation value of the prepared optical compensatory sheet was 20 nm, and the Rth retardation value was 140 nm.

Preparation of Polarizing Plate

A polarizing membrane and a transparent protective film were attached in this order to the transparent substrate of the optical compensatory sheet to prepare a polarizing plate. The polarizing membrane and the optical compensatory sheet was so arranged that the slow axis of the transparent substrate was parallel to the polarizing axis of the polarizing membrane.

Preparation of Liquid Crystal Display

Polarizing plates were separated from a commercially available liquid crystal display of a VA mode (LCD5000). The above-prepared polarizing plates were attached to the display.

The contrast ratio of the prepared liquid crystal display of the VA mode was measured at various viewing points. As a result, the viewing angle showing the contrast ratio of 20:1 was 160° between upward and downward or between leftward and rightward.

EXAMPLE 100

Preparation of Optically Biaxial Transparent Substrate

In methylene chloride, 85 weight parts of cellulose triacetate, 10 weight parts of triphenyl phosphate and 5 weight parts of an ultraviolet absorbing agent (TM165, Sumitomo Chemical Co., Ltd.) were dissolved to prepare 18 wt. % (solid content) solution. The solution was cast on a glass plate, and dried at 40° C. for 20 minutes. The formed film (thickness: 100 μm) was separated from the glass plate.

A pressure of 20 Kg/mm² was applied to the formed film at 145° C. for 10 minutes. Thus an optically biaxial transparent substrate was prepared. The Re retardation of the transparent substrate was 50 nm, and the Rth retardation was 120 nm.

Preparation of Optical Compensatory Sheet

The coating solution of the optically anisotropic layer used in Example 98 was coated on the optically biaxial transparent substrate (coating amount: 6 ml/m²), and dried at the room temperature. The coated layer was heated at 130° C. for 1 minute to align the discotic liquid crystal compound. The layer was irradiated with an ultraviolet ray to polymerize the liquid crystal compound and to fix the alignment.

The angle dependency of the retardation of the optically anisotropic layer was measured by using an ellipsometer (M-150, Japan Spectrum Co., Ltd.). As a result, the average inclined angle of the discotic liquid crystal compound was 0.5°.

The Re retardation value of the prepared optical compensatory sheet was 50 nm, and the Rth retardation value was 250 nm.

Preparation of Polarizing Plate

A polarizing membrane and a transparent protective film were attached in this order to the transparent substrate of the optical compensatory sheet to prepare a polarizing plate. The polarizing membrane and the optical compensatory sheet was so arranged that the slow axis of the transparent substrate was parallel to the polarizing axis of the polarizing membrane.

Preparation of Liquid Crystal Display

Polarizing plates were separated from a commercially available liquid crystal display of a VA mode (LCD5000). The above-prepared polarizing plates were attached to the display.

The contrast ratio of the prepared liquid crystal display of the VA mode was measured at various viewing points. As a result, the viewing angle showing the contrast ratio of 20:1 was 160° between upward and downward or between leftward and rightward.

EXAMPLE 101

Preparation of Optically Biaxial Transparent Substrate

In 232.75 weight parts of methylene chloride, 42.57 weight parts of methanol and 8.50 weight parts of n-butanol, 45 weight parts of cellulose acetate (average acetic acid content: 60.9%), 2.35 weight parts of the following retardation increasing agent, 2.75 weight parts of triphenyl phosphate and 2.20 weight parts of biphenyldiphenyl phosphate were dissolved. The solution was cast in a drum casting machine, and dried to form a cellulose acetate film (thickness: 105 μm).
(Retardation increasing agent)

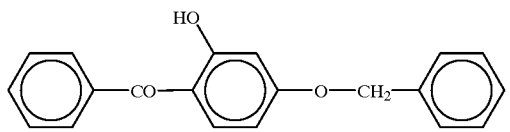

The cellulose acetate film was stretched (actual percent of stretch: 20%) to prepare an optically biaxial transparent substrate.

The retardation values of the transparent substrate was measured at the wavelength of 633 nm by using an ellipsometer (M-150, Japan Spectrum Co., Ltd.). As a result, the Rth retardation was 85 nm, and the Re retardation was 40 nm.

Preparation of Optical Compensatory Sheet

Gelatin was coated on one surface of the transparent substrate to form an undercoating layer.

An aqueous solution containing 2 wt. % of the alkyl denatured polyvinyl alcohol used in Example 88 and 0.1 wt. % of glutaraldehyde was coated on the undercoating layer, and dried to form an orientation layer (thickness: 0.5 μm).

In 170 weight parts of methyl ethyl ketone, 90 weight parts of the discotic liquid crystal compound (8) used in Example 98, 10 weight parts of the trimethylolpropane triacrylate denatured with ethylene oxide (V#360, Osaka Organic Chemicals Ltd.), 0.6 weight part of a melamine formaldehyde/acrylic acid copolymer (Aldrich agent), 3.0 weight parts of a photopolymerization initiator (Irgacure 907, Ciba-Geigy) and 1.0 weight part of a photopolymerization sensitizer (Kayacure DETX, Nippon Kayaku Co., Ltd.) were dissolved to prepare a coating solution.

The solution was coated on the orientation layer, and dried. The coated layer was heated at 130° C. for 1 minute to align the discotic liquid crystal compound. The layer was irradiated with an ultraviolet ray to polymerize the liquid crystal compound and to fix the alignment. Thus an optically anisotropic layer (thickness: 1.2 μm) was formed.

The retardation values of the optical compensatory sheet was measured at the wavelength of 633 nm by using an ellipsometer (M-150, Japan Spectrum Co., Ltd.). As a result, the Re retardation was 40 nm, and the Rth retardation was 160 nm.

Preparation of Polarizing Plate

A polarizing membrane and a transparent protective film were attached in this order to the transparent substrate of the optical compensatory sheet to prepare a polarizing plate. The polarizing membrane and the optical compensatory sheet was so arranged that the slow axis of the transparent substrate was parallel to the polarizing axis of the polarizing membrane.

Preparation of Liquid Crystal Display

Polarizing plates were separated from a commercially available MVA liquid crystal display (VL-1530S, Fujitsu Limited). The above-prepared polarizing plates were attached to the display.

The viewing angle showing the contrast ratio of 10:1 without causing a gradation inversion was measured. The results are set forth in Table 9.

EXAMPLE 102

Preparation of Optically Biaxial Transparent Substrate

In 70 weight parts of methylene chloride, 30 weight parts of norbornene resin (Arton, JSR Co., Ltd.) was dissolved. The solution was cast in a band casting machine, and dried to form a norbornene film (thickness: 100 μm).

The norbornene film was stretched (actual percent of stretch 15%) along a machine direction, and stretched (actual percent of stretch 7%) along a cross direction to prepare an optically biaxial transparent substrate.

The retardation values of the transparent substrate was measured at the wavelength of 633 nm by using an ellipsometer (M-150, Japan Spectrum Co., Ltd.). As a result, the Rth retardation was 45 nm, and the Re retardation was 40 nm.

Preparation of Optical Compensatory Sheet

One surface of the transparent substrate was subjected to a corona discharge treatment.

An aqueous solution containing 2 wt. % of the alkyl denatured polyvinyl alcohol used in Example 88 and 0.1 wt. % of glutaraldehyde was coated on the treated surface of the substrate, and dried to form an orientation layer (thickness: 0.5 μm).

In 170 weight parts of methyl ethyl ketone, 90 weight parts of the discotic liquid crystal compound (8) used in Example 98, 10 weight parts of the trimethylolpropane triacrylate denatured with ethylene oxide (V#360, Osaka Organic Chemicals Ltd.), 0.6 weight part of a melamine formaldehyde/acrylic acid copolymer (Aldrich agent), 3.0 weight parts of a photopolymerization initiator (Irgacure 907, Ciba-Geigy) and 1.0 weight part of a photopolymerization sensitizer (Kayacure DETX, Nippon Kayaku Co., Ltd.) were dissolved to prepare a coating solution.

The solution was coated on the orientation layer, and dried. The coated layer was heated at 130° C. for 1 minute to align the discotic liquid crystal compound. The layer was irradiated with an ultraviolet ray to polymerize the liquid crystal compound and to fix the alignment. Thus an optically anisotropic layer (thickness: 1.4 μm) was formed.

The retardation values of the optical compensatory sheet was measured at the wavelength of 633 nm by using an ellipsometer (M-150, Japan Spectrum Co., Ltd.). As a result, the Re retardation was 30 nm, and the Rth retardation was 120 nm.

Preparation of Polarizing Plate

A polarizing membrane and a transparent protective film were attached in this order to the transparent substrate of the optical compensatory sheet to prepare a polarizing plate. The polarizing membrane and the optical compensatory sheet was so arranged that the slow axis of the transparent substrate was parallel to the polarizing axis of the polarizing membrane.

Preparation of Liquid Crystal Display

Polarizing plates were separated from a commercially available MVA liquid crystal display (VL-1530S, Fujitsu Limited). The above-prepared polarizing plates were attached to the display.

The viewing angle showing the contrast ratio of 10:1 without causing a gradation inversion was measured. The results are set forth in Table 9.

EXAMPLE 103

Preparation of Optically Biaxial Transparent Substrate

A commercially available polycarbonate film (Teijin Ltd.) was stretched (actual percent of stretch 40%) along a machine direction, and stretched (actual percent of stretch 15%) along a cross direction to prepare an optically biaxial transparent substrate.

The retardation values of the transparent substrate was measured at the wavelength of 633 nm by using an ellipsometer (M-150, Japan Spectrum Co., Ltd.). As a result, the Rth retardation was 100 nm, and the Re retardation was 200 nm.

Preparation of Optical Compensatory Sheet

One surface of the transparent substrate was subjected to a corona discharge treatment.

An aqueous solution containing 2 wt. % of the alkyl denatured polyvinyl alcohol used in Example 88 and 0.1 wt. % of glutaraldehyde was coated on the treated surface of the substrate, and dried to form an orientation layer (thickness: 0.5 μm).

In 170 weight parts of methyl ethyl ketone, 90 weight parts of the discotic liquid crystal compound (8) used in Example 98, 10 weight parts of the trimethylolpropane triacrylate denatured with ethylene oxide (V#360, Osaka Organic Chemicals Ltd.), 0.6 weight part of a melamine formaldehyde/acrylic acid copolymer (Aldrich agent), 3.0 weight parts of a photopolymerization initiator (Irgacure 907, Ciba-Geigy) and 1.0 weight part of a photopolymerization sensitizer (Kayacure DETX, Nippon Kayaku Co., Ltd.) were dissolved to prepare a coating solution.

The solution was coated on the orientation layer, and dried. The coated layer was heated at 130° C. for 1 minute to align the discotic liquid crystal compound. The layer was irradiated with an ultraviolet ray to polymerize the liquid crystal compound and to fix the alignment. Thus an optically anisotropic layer (thickness: 3.5 μm) was formed.

The retardation values of the optical compensatory sheet was measured at the wavelength of 633 nm by using an ellipsometer (M-150, Japan Spectrum Co., Ltd.). As a result, the Re retardation was 200 nm, and the Rth retardation was 300 nm.

Preparation of Polarizing Plate

A polarizing membrane and a transparent protective film were attached in this order to the transparent substrate of the optical compensatory sheet to prepare a polarizing plate. The polarizing membrane and the optical compensatory sheet was so arranged that the slow axis of the transparent substrate was parallel to the polarizing axis of the polarizing membrane.

Preparation of Liquid Crystal Display

Polarizing plates were separated from a commercially available MVA liquid crystal display (VL-1530S, Fujitsu Limited). The above-prepared polarizing plates were attached to the display.

The viewing angle showing the contrast ratio of 10:1 without causing a gradation inversion was measured. The results are set forth in Table 9.

REFERENCE EXAMPLE 1

The viewing angle showing the contrast ratio of 10:1 without causing a gradation inversion was measured about a commercially available MVA liquid crystal display (VL-1530S, Fujitsu Limited). The results are set forth in Table 9.

TABLE 9

| MVA liquid crystal display | Retardation of optical compensatory sheet | | Viewing angle | |
| --- | --- | --- | --- | --- |
| | Re | Rth | UD or LR | Slant |
| Ex. 101 | 40 nm | 160 nm | 80° | 80° |
| Ex. 102 | 30 nm | 120 nm | 80° | 75° |
| Ex. 103 | 200 nm | 300 nm | 80° | 60° |
| Ref. Ex. 1 | No optical compensatory sheet | | 80° | 45° |

(Remark)
UD: Angle between upward and downward
LR: Angle between leftward and rightward
Slant: Angle measured from a slanted direction

What is claimed is:

1. An optical compensatory sheet comprising an optically anisotropic layer formed of discotic liquid crystal molecules provided on a transparent substrate, wherein the discotic liquid crystal molecules are horizontally aligned in the optically anisotropic layer, an average inclined angle between discotic planes of said discotic liquid crystal molecules and a surface of said transparent substrate being less than 5°, and said discotic liquid crystal molecules being fixed in the optically anisotropic layer while keeping the horizontal alignment, and wherein the optically anisotropic layer further contains a melamine compound.

2. The optical compensatory sheet as defined in claim 1, wherein the discotic liquid crystal molecules are polymerized.

3. The optical compensatory sheet as defined in claim 2, wherein the discotic liquid crystal molecules and the melamine compound are polymerized in the optically anisotropic layer.

4. The optical compensatory sheet as defined in claim 1, wherein the optically anisotropic layer contains the melamine compound in an amount of 1 to 1,000 mg/m$^2$.

5. The optical compensatory sheet as defined in claim 1, wherein the melamine compound is a melamine polymer.

6. The optical compensatory sheet as defined in claim 1, wherein the optical compensatory sheet further comprises a second optically anisotropic layer formed of discotic liquid crystal molecules, said discotic liquid crystal molecules being aligned in the second optically anisotropic layer, and wherein an average inclined angle between discotic planes of the discotic liquid crystal molecules and a surface of the transparent substrate is not less than 5°, said inclined angle increasing or decreasing with increase of a distance from the surface of the transparent substrate to the discotic plane of the discotic liquid crystal molecule.

7. The optical compensatory sheet as defined in claim 1, wherein the transparent substrate is optically uniaxial or optically biaxial.

8. The optical compensatory sheet as defined in claim 7, wherein the transparent substrate has a Re retardation value defined by the following formula in the range of 10 to 1,000 nm:

$$Re=(nx-ny)\times d$$

in which each of nx and ny is a refractive index in plane of the transparent substrate; and d is the thickness of the transparent substrate.

9. The optical compensatory sheet as defined in claim 7, wherein the transparent substrate has a Rth retardation value defined by the following formula in the range of 10 to 1,000 nm:

$$Rth=[\{(nx+ny)/2\}-nz]\times d$$

in which each of nx and ny is a refractive index in plane of the transparent substrate; nz is a refractive index along the thickness direction of the transparent substrate; and d is the thickness of the transparent substrate.

10. The optical compensatory sheet as defined in claim 7, wherein the optical compensatory sheet has a Re retardation value defined by the following formula in the range of 20 to 200 nm:

$$Re=(nx-ny)\times d$$

in which each of nx and ny is a refractive index in plane of the optical compensatory sheet; and d is the thickness of the optical compensatory sheet.

11. The optical compensatory sheet as defined in claim 7, wherein the optical compensatory sheet has a Rth retardation value defined by the following formula in the range of 70 to 500 nm:

$$Rth=[\{(nx+ny)/2\}-nz]\times d$$

in which each of nx and ny is a refractive index in plane of the optical compensatory sheet; nz is a refractive index along the thickness direction of the optical compensatory sheet; and d is the thickness of the optical compensatory sheet.

12. A liquid crystal display comprising a liquid crystal cell of a vertical alignment mode, two polarizing elements and one or two optical compensatory sheets, each of said polarizing elements being arranged on each side of the liquid crystal cell, each of said optical compensatory sheets being arranged between the liquid crystal cell and each polarizing element, wherein the optical compensatory sheet comprises an optically anisotropic layer formed of discotic liquid crystal molecules provided on a transparent substrate, said discotic liquid crystal molecules being horizontally aligned in the optically anisotropic layer, and wherein an average inclined angle between discotic planes of the discotic liquid crystal molecules and a surface of the transparent substrate is less than 5°, said discotic liquid crystal molecules being fixed in the optically anisotropic layer while keeping the horizontal alignment, and wherein the optically anisotropic layer further contains a melamine compound.

13. A liquid crystal display comprising a liquid crystal cell of a bend alignment mode, two polarizing elements and one or two optical compensatory sheets, each of said polarizing elements being arranged on each side of the liquid crystal cell, each of said optical compensatory sheets being arranged between the liquid crystal cell and each polarizing element, wherein the optical compensatory sheet comprises an optically anisotropic layer formed of discotic liquid crystal molecules provided on a transparent substrate, said discotic liquid crystal molecules being horizontally aligned in the optically anisotropic layer, and wherein an average inclined angle between discotic planes of the discotic liquid crystal molecules and a surface of the transparent substrate is less than 5°, said discotic liquid crystal molecules being fixed in the optically anisotropic layer while keeping the horizontal alignment, and wherein the optically anisotropic layer further contains a melamine compound.

14. The liquid crystal display as defined in claim 13, wherein the optical compensatory sheet further comprises a second optically anisotropic layer formed of discotic liquid crystal molecules, said discotic liquid crystal molecules being aligned in the second optically anisotropic layer, and wherein an average inclined angle between discotic planes of the discotic liquid crystal molecules and a surface of the transparent substrate is not less than 5°, said inclined angle increasing or decreasing with increase of a distance from the surface of the transparent substrate to the discotic plane of the discotic liquid crystal molecule.

* * * * *